(12) United States Patent
Wang et al.

(10) Patent No.: US 12,335,600 B2
(45) Date of Patent: Jun. 17, 2025

(54) METHOD FOR CAPTURING IMAGE DURING VIDEO RECORDING AND ELECTRONIC DEVICE

(71) Applicant: HONOR DEVICE CO., LTD., Shenzhen (CN)

(72) Inventors: Yu Wang, Shenzhen (CN); Congchao Zhu, Shenzhen (CN); Bin Xiao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/015,583

(22) PCT Filed: Aug. 22, 2022

(86) PCT No.: PCT/CN2022/113982
§ 371 (c)(1),
(2) Date: Jan. 11, 2023

(87) PCT Pub. No.: WO2023/035920
PCT Pub. Date: Mar. 16, 2023

(65) Prior Publication Data
US 2024/0205533 A1  Jun. 20, 2024

(30) Foreign Application Priority Data

Sep. 7, 2021 (CN) .......................... 202111045872.6
Jan. 29, 2022 (CN) .......................... 202210111700.2

(51) Int. Cl.
*H04N 23/63* (2023.01)
*G06T 3/4053* (2024.01)
(Continued)

(52) U.S. Cl.
CPC ......... *H04N 23/632* (2023.01); *G06T 3/4053* (2013.01); *G06T 7/0002* (2013.01); *G06T 9/00* (2013.01); *G06T 2207/30168* (2013.01)

(58) Field of Classification Search
CPC ............ H04N 1/212; H04N 5/00; H04N 5/76; H04N 5/9201; H04N 23/57; H04N 23/631;
(Continued)

(56) References Cited

U.S. PATENT DOCUMENTS 8,427,547 B1  4/2013  Linzer et al.
9,307,211 B2  4/2016  Hayashi et al.
(Continued)

FOREIGN PATENT DOCUMENTS

CN          1984296 A     6/2007
CN        103685933 A     3/2014
(Continued)

*Primary Examiner* — Lin Ye
*Assistant Examiner* — Chriss S Yoder, III
(74) *Attorney, Agent, or Firm* — WOMBLE BOND DICKINSON (US) LLP

(57) ABSTRACT

Disclosed in this application are a method for capturing an image during video recording and an electronic device, so that image quality of a captured image is improved. The method includes: displaying a viewfinder screen, where the viewfinder screen displays a preview image stream, the preview image stream includes n frames of preview images obtained based on n frames of first images collected by a camera, the viewfinder screen includes a snapshot shutter, and the n frames of first images are stored in a first buffer queue; stopping recording a video; saving the video; when the camera collects a $q^{th}$ frame of first image in the n frames of first images, receiving a third operation performed by the user on the snapshot shutter; and performing image processing on the $q^{th}$ frame of first image saved in the first buffer queue to obtain a captured image.

17 Claims, 33 Drawing Sheets

(51) Int. Cl.
*G06T 7/00* (2017.01)
*G06T 9/00* (2006.01)

(58) Field of Classification Search
CPC .... H04N 23/632; H04N 23/667; H04N 23/84; H04N 23/95; H04N 23/951; H04M 1/02; H04M 1/72439; G06T 3/4053; G06T 7/0002; G06T 9/00; G06T 2207/30168
See application file for complete search history.

(56) References Cited

U.S. PATENT DOCUMENTS

| | | |
|---|---|---|
| 2010/0259645 A1 | 10/2010 | Kaplan et al. |
| 2010/0295966 A1 | 11/2010 | Furlan |
| 2013/0208143 A1* | 8/2013 | Chou .................. H04N 23/667 |
| | | 348/231.99 |
| 2013/0222629 A1 | 8/2013 | Burian et al. |
| 2014/0078343 A1 | 3/2014 | Dai et al. |
| 2016/0028964 A1 | 1/2016 | Lee et al. |
| 2016/0227092 A1 | 8/2016 | Ikeda et al. |
| 2017/0244897 A1 | 8/2017 | Jung et al. |
| 2020/0118598 A1 | 4/2020 | Shimokawa et al. |
| 2020/0221008 A1 | 7/2020 | Gandhi et al. |

FOREIGN PATENT DOCUMENTS

| | | |
|---|---|---|
| CN | 104365090 A | 2/2015 |
| CN | 104394319 A | 3/2015 |
| CN | 105376495 A | 3/2016 |
| CN | 105407282 A | 3/2016 |
| CN | 205510224 U | 8/2016 |
| CN | 108769537 A | 11/2018 |
| CN | 109104633 A | 12/2018 |
| CN | 110086985 A | 8/2019 |
| CN | 110493507 A | 11/2019 |
| CN | 110933289 A | 3/2020 |
| CN | 111970440 A | 11/2020 |
| CN | 112449085 A | 3/2021 |
| CN | 112738414 A | 4/2021 |
| WO | 2015117397 A1 | 8/2015 |
| WO | 2021036536 A1 | 3/2021 |
| WO | 2021169394 A1 | 9/2021 |

* cited by examiner

METHOD FOR CAPTURING IMAGE DURING VIDEO RECORDING AND ELECTRONIC DEVICE

CROSS-REFERENCE TO RELATED APPLICATIONS

This application is a national stage of International Application No. PCT/CN2022/113982, filed on Aug. 22, 2022, which claims priority to Chinese Patent Application No. 202111045872.6 filed on Sep. 7, 2021, and Chinese Patent Application No. 202210111700.2 filed on Jan. 29, 2022. All of the aforementioned applications are hereby incorporated by reference in their entireties.

TECHNICAL FIELD

This application relates to the field of photographing technologies, and in particular, to a method for capturing an image during video recording and an electronic device.

BACKGROUND

Existing mobile phones generally have photographing and video recording functions, and a growing quantity of people use the mobile phones to take photos and videos to record every bits and pieces of life. In a process of recording a video (namely, video recording), the mobile phone may collect some wonderful images. In the video recording process of the mobile phone, a user may expect the mobile phone to capture the wonderful images and save the wonderful images as photos for displaying to the user. Therefore, a solution in which an image can be captured in a video recording process is urgently needed.

SUMMARY

This application provides a method for capturing an image during video recording and an electronic device, so that an image can be captured in a video recording process and image quality of a captured image can be improved.

To achieve the foregoing objective, the following technical solutions are used in the embodiments of this application:

According to a first aspect, this application provides a method for capturing an image during video recording, applied to an electronic device, where the electronic device includes a camera. The method includes: The electronic device receives a first operation of a user, where the first operation is used to trigger the electronic device to start recording a video. The electronic device displays a viewfinder screen in response to the first operation, where the viewfinder screen displays a preview image stream, the preview image stream includes n frames of preview images, the preview images are obtained based on n frames of first images collected by the camera of the electronic device after the electronic device receives the first operation, the viewfinder screen further includes a snapshot shutter, the snapshot shutter is configured to trigger the electronic device to take a snapshot, the n frames of first images are stored in a first buffer queue of the electronic device, n≥1, and n is an integer. The electronic device receives a second operation of the user. The electronic device stops recording the video in response to the second operation. The electronic device saves the video, and when the camera collects a $q^{th}$ frame of first image in the n frames of first images, receives a third operation performed by the user on the snapshot shutter. The electronic device performs, in response to the third operation, image processing on the $q^{th}$ frame of first image saved in the first buffer queue to obtain a captured image.

In this solution, the user can use the snapshot shutter to capture the image in a video recording process of the electronic device. The electronic device may buffers, in the first buffer queue, the n frames of first images collected by the camera. In this case, even if there is delay duration from receiving a capture operation (namely, the third operation) of the user to receiving a capture instruction by a snapshot program, when the capture operation of the user is received, the first image output by an image sensor (Sensor) can be further buffered in the first buffer queue. The electronic device may select a captured frame (namely: the $q^{th}$ frame of first image collected by the camera when the user inputs the capture operation) from the first buffer queue. In this way, the electronic device can obtain, from the first buffer queue, the image collected by the camera when the user inputs the capture operation. In addition, the electronic device may further perform the image processing on the $q^{th}$ frame of first image to obtain the captured image, thereby improving image quality of the captured image.

In conclusion, according to the method in this embodiment of this application, an image that meets a user requirement can be captured in the video recording process, and the image quality of the captured image can be improved.

In a possible implementation of the first aspect, n≥2. In other words, a plurality of frames of first images may be buffered in the first buffer queue. In this case, even if there is the delay duration (for example, 120 ms-160 ms) from receiving the capture operation of the user to receiving the capture instruction by the snapshot program, in the delay duration, a frame output by the sensor can be buffered in the Buffer. Therefore, when the electronic device receives the capture operation of the user, a Bayer image output by the sensor can be further buffered in the first buffer queue. In addition, image content of the frame output by the sensor will not change much in a short time. In this case, a frame selection module of the electronic device may select, as the captured image, one frame of image with good image quality from the Buffer based on additional information of the image buffered in the Buffer. In this way, the image quality of the captured image can be improved.

In another possible implementation of the first aspect, the performing image processing on the $q^{th}$ frame of first image saved in the first buffer queue to obtain a captured image includes: The electronic device performs image processing on the m frames of first images to obtain the captured image, where the m frames of first images include the $q^{th}$ frame of first image, m≥1, and m is an integer.

In this implementation, the electronic device may perform the image processing on one or more frames of first images. When m≥2, the electronic device may perform the image processing on a plurality of frames of first images. Images in the m frames of first images other than the $q^{th}$ frame of first image may play a role of image quality enhancement on the captured frame (namely, the $q^{th}$ frame of first image, which is also referred to as a reference frame). This makes it easy to obtain information such as noise and a texture, to further improve the image quality of the captured image.

In another possible implementation of the first aspect, the image processing includes image processing in a RAW domain and ISP image processing, the image processing in the RAW domain is image processing performed in RAW color space, the ISP image processing is image processing performed by using an image signal processor ISP of the electronic device, and the image quality of the captured image is better than image quality of the $q^{th}$ frame of first image; or the image processing includes the image processing in the RAW domain, the ISP image processing, and encoding processing, and the image quality of the captured image is better than the image quality of the $q^{th}$ frame of first image.

The image processing in the RAW domain may be implemented by using a preset RAW domain image processing algorithm. The ISP image processing may be implemented by using the ISP of the electronic device.

In another possible implementation of the first aspect, that the electronic device performs image processing on the m frames of first images to obtain the captured image includes: The electronic device runs the preset raw RAW domain image processing algorithm by using the m frames of first images as an input to obtain a second image, where the preset RAW domain image processing algorithm has a function of improving the image quality, and the preset RAW domain image processing algorithm integrates at least one of image processing functions in the RAW domain, an RGB domain, or a YUV domain, to improve the image quality before the ISP performs the image processing. The electronic device processes the second image by using the ISP, and encodes a processed image to obtain the captured image.

In this implementation, algorithm processing of the preset RAW domain image processing algorithm is added. Compared with the image processing in the RAW domain, the image processing in the RGB domain, and the image processing in the YUV domain in which only ISP hardware is used, a combination of the preset RAW domain image processing algorithm and the ISP has a better processing effect, which improves the image quality of the captured image.

In another possible implementation of the first aspect, a format of an input image of the preset RAW domain image processing algorithm is a Bayer format, and a format of an output image thereof is also the Bayer format.

Specifically, that the electronic device runs the preset RAW domain image processing algorithm by using the m frames of first images as an input to obtain a second image includes: The electronic device runs the preset RAW domain image processing algorithm by using the m frames of first images in the Bayer Bayer format as the input to obtain the second image in the Bayer format, where the preset RAW domain image processing algorithm integrates some of the image processing functions in at least one of the RAW domain, the RGB domain, or the YUV domain, to improve the image quality before the ISP performs the image processing.

Correspondingly, that the electronic device processes the second image by using the ISP, and encodes a processed image to obtain the captured image includes: The electronic device sequentially performs the image processing in the RAW domain, the image processing in the RGB domain, and the image processing in the YUV domain on the second image by using the ISP, and encodes the processed image to obtain the captured image.

In this implementation, the image processing performed by the electronic device by using the ISP may also include converting the Bayer format to an RGB format, and converting the RGB format to a YUV format.

In another possible implementation of the first aspect, a format of an input image of the preset RAW domain image processing algorithm is the Bayer format, and a format of an output image thereof is the RGB format. The preset RAW domain image processing algorithm converts the Bayer format to the RGB format.

Specifically, that the electronic device runs the preset RAW domain image processing algorithm by using the m frames of first images as an input to obtain a second image includes: The electronic device runs the preset RAW domain image processing algorithm by using the m frames of first images in the Bayer format as the input to obtain the second image in the RGB format, where the preset RAW domain image processing algorithm integrates the image processing functions in the RAW domain, to improve the image quality before the ISP performs the image processing in the RGB domain and the image processing in the YUV domain on the image.

Correspondingly, that the electronic device processes the second image by using the ISP, and encodes a processed image to obtain the captured image includes: The electronic device sequentially performs the image processing in the RGB domain and the image processing in the YUV domain on the second image by using the ISP, and encodes the processed image to obtain the captured image.

In this implementation, the image processing performed by the electronic device by using the ISP may also include converting an RGB format to a YUV format.

In another possible implementation of the first aspect, the preset RAW domain image processing algorithm further integrates some of the image processing functions in at least one of the RAW domain, the RGB domain, or the YUV domain, to improve the image quality before the ISP performs the image processing in the RGB domain.

In another possible implementation of the first aspect, a format of an input image of the preset RAW domain image processing algorithm is the Bayer format, and a format of an output image thereof is the YUV format. The preset RAW domain image processing algorithm converts the Bayer format to the RGB format, and converts the RGB format to the YUV format.

Specifically, that the electronic device runs the preset RAW domain image processing algorithm by using the m frames of first images as an input to obtain a second image includes: The electronic device runs the preset RAW domain image processing algorithm by using the m frames of first images in the Bayer format as the input to obtain the second image in the YUV format, where the preset RAW domain image processing algorithm integrates the image processing functions in the RAW domain and the image processing functions in the RGB domain, to improve the image quality before the ISP performs the image processing in the YUV domain on the image.

Correspondingly, that the electronic device processes the second image by using the ISP, and encodes a processed image to obtain the captured image includes: The electronic device performs the image processing in the YUV domain on the second image by using the ISP, and encodes the processed image to obtain the captured image.

In another possible implementation of the first aspect, the preset RAW domain image processing algorithm further integrates some of the image processing functions in the YUV domain, to improve the image quality before the ISP performs the image processing in the YUV domain.

In another possible implementation of the first aspect, after the camera of the electronic device collects the first image and before the electronic device displays the viewfinder screen, the electronic device may sequentially perform the image processing in the RAW domain, the image processing in the RGB domain, and the image processing in the YUV domain on the first image by using the ISP of the electronic device to obtain the preview image.

That the electronic device processes the first image to obtain the preview image is not affected by that "the electronic device processes the first image to obtain the captured image".

In another possible implementation of the first aspect, the electronic device processes the first image and the second image by using the ISP in a time division multiplexing manner. That is, that the electronic device processes the second image by using the ISP to obtain the captured image does not affect that the electronic device processes the first image by using the ISP to obtain the preview image. In other words, that the electronic device processes the captured image does not affect that the electronic device processes the preview image stream and a video recording file.

According to a second aspect, this application provides a method for capturing an image during video recording, applied to an electronic device, where the electronic device includes a camera. The method includes: The electronic device receives a first operation of a user, where the first operation is used to trigger the electronic device to start recording a video. The electronic device displays a viewfinder screen in response to the first operation, where the viewfinder screen displays a preview image stream, the preview image stream includes n frames of preview images, the preview images are obtained based on n frames of first images collected by the camera of the electronic device after the electronic device receives the first operation, the viewfinder screen further includes a snapshot shutter, the snapshot shutter is configured to trigger the electronic device to take a snapshot, the n frames of first images are stored in a first buffer queue of the electronic device, $n \geq 1$, and n is an integer. The electronic device periodically performs image processing on k frames of first images buffered in the first buffer queue to obtain a second image, where $k \geq 1$, and k is an integer. The electronic device receives a second operation of the user. The electronic device stops recording the video in response to the second operation. The electronic device saves the video, and when the camera collects a $q^{th}$ frame of first image in the n frames of first images, receives a third operation performed by the user on the snapshot shutter. The electronic device performs, in response to the third operation, image quality enhancement on a fourth image by using a latest frame of second image obtained when the electronic device receives the third operation, to obtain a captured image, where the fourth image is one frame of image in the video whose time information is the same as time information of the $q^{th}$ frame of first image.

Compared with the solution provided in the first aspect, the solution provided in the second aspect can reduce a quantity of image frames buffered in the first buffer queue. Specifically, it is assumed that delay duration from receiving a capture operation of the user to receiving a capture instruction by a snapshot program is 330 milliseconds (ms), and a sensor of a mobile phone exposes one frame of first image every 30 milliseconds (ms). In the solution provided in the first aspect, to ensure that a frame selection module of the mobile phone can select, from the first buffer queue, a first image exposed by the sensor at a moment at which the mobile phone receives the third operation, at least 10 frames of images need to be buffered in the first buffer queue. In the solution provided in the second aspect, the second image is only used to enhance the fourth image that the user needs to capture. In this case, there is no need to buffer many image frames to generate the second image.

In another possible implementation of the second aspect, $n \geq 2$. For beneficial effect analysis of $n \geq 2$ in any possible implementation of the second aspect, refer to the description in the implementation of the first aspect. Details are not described herein again.

In another possible implementation of the second aspect, $k \geq 2$. For beneficial effect analysis of $k \geq 2$ in any possible implementation of the second aspect, refer to the description of $m \geq 2$ in the implementation of the first aspect. Details are not described herein again.

In another possible implementation of the second aspect, the image quality enhancement includes image super-resolution. That is, the electronic device performs the image quality enhancement on the fourth image by using the third image, which can further improve resolution of the fourth image. Resolution of the third image and the captured image is higher than the resolution of the fourth image.

In another possible implementation of the second aspect, the image processing includes image processing in a RAW domain and an image signal processor ISP image processing, the image processing in the RAW domain is image processing performed in RAW color space, the ISP image processing is image processing performed by using an image signal processor ISP of the electronic device, and image quality of the second image is better than image quality of the k frames of first images; or the image processing includes the image processing in the RAW domain, the ISP image processing, and encoding processing, and the image quality of the second image is better than the image quality of the k frames of first images. For beneficial effects of this implementation, refer to the detailed description in the possible implementation of the first aspect. Details are not described herein again.

In another possible implementation of the second aspect, that the electronic device periodically performs image processing on k frames of first images buffered in the first buffer queue to obtain a second image includes: The electronic device periodically runs a preset RAW domain image processing algorithm by using the k frames of first images buffered in the first buffer queue as an input to obtain a third image, where the preset RAW domain image processing algorithm has a function of improving the image quality. The electronic device processes the third image by using the ISP of the electronic device to obtain the second image. For beneficial effects of this implementation, refer to the detailed description in the possible implementation of the first aspect. Details are not described herein again.

According to a third aspect, this application provides an electronic device, where the electronic device includes a touchscreen, a memory, a display: one or more cameras, and one or more processors. The memory, the display, and the camera are coupled to the processor. The camera is configured to collect an image. The display is configured to display the image collected by the camera or an image generated by the processor. The memory stores computer program code, and the computer program code includes computer instructions. When the computer instructions are executed by the processor, the electronic device is enabled to perform the method according to any one of the first aspect or the second aspect, and the possible implementations thereof.

According to a fourth aspect, this application provides an electronic device, where the electronic device includes a touchscreen, a memory, a display: one or more cameras, and one or more processors. The memory, the display; and the camera are coupled to the processor. The camera is configured to collect an image. The display is configured to display the image captured by the camera or an image generated by the processor. The memory stores computer program code, and the computer program code includes computer instructions. When the computer instructions are executed by the processor, the electronic device is enabled to perform the following steps: receiving a first operation of a user, where the first operation is used to trigger the electronic device to start recording a video: displaying a viewfinder screen in response to the first operation, where the viewfinder screen displays a preview image stream, the preview image stream includes n frames of preview images, the preview images are obtained based on n frames of first images collected by the camera of the electronic device after the electronic device receives the first operation, the viewfinder screen further includes a snapshot shutter, the snapshot shutter is configured to trigger the electronic device to take a snapshot, the n frames of first images are stored in a first buffer queue of the electronic device, n≥1, and n is an integer: receiving a second operation of the user: stopping recording the video in response to the second operation: saving the video, and when the camera collects a $q^{th}$ frame of first image in the n frames of first images, receiving a third operation performed by the user on the snapshot shutter; and performing, in response to the third operation, image processing on the $q^{th}$ frame of first image saved in the first buffer queue to obtain a captured image.

In a possible implementation of the fourth aspect, n≥2.

In another possible implementation of the fourth aspect, m≥2.

In another possible implementation of the fourth aspect, when the computer instructions are executed by the processor, the electronic device is enabled to further perform the following step: performing image processing on the m frames of first images to obtain the captured image, where the m frames of first images include the $q^{th}$ frame of first image, m≥1, and m is an integer.

In another possible implementation of the fourth aspect, the m frames of first images are adjacent m frames of images.

In another possible implementation of the fourth aspect, the image processing includes image processing in a RAW domain and ISP image processing, the image processing in the RAW domain is image processing performed in RAW color space, the ISP image processing is image processing performed by using an image signal processor ISP of the electronic device, and image quality of the captured image is better than image quality of the $q^{th}$ frame of first image; or the image processing includes the image processing in the RAW domain, the ISP image processing, and encoding processing, and the image quality of the captured image is better than the image quality of the $q^{th}$ frame of first image.

In another possible implementation of the fourth aspect, when the computer instructions are executed by the processor, the electronic device is enabled to further perform the following steps: running a preset raw RAW domain image processing algorithm by using the m frames of first images as an input to obtain a second image, where the preset RAW domain image processing algorithm has a function of improving the image quality, and the preset RAW domain image processing algorithm h at least one of image processing functions in the RAW domain, an RGB domain, or a YUV domain, to improve the image quality before the ISP performs the image processing; and processing the second image by using the ISP, and encoding a processed image to obtain the captured image.

In another possible implementation of the fourth aspect, when the computer instructions are executed by the processor, the electronic device is enabled to further perform the following steps: running the preset RAW domain image processing algorithm by using the m frames of first images in a Bayer Bayer format as an input to obtain the second image in the Bayer format, where the preset RAW domain image processing algorithm integrates some of the image processing functions in at least one of the RAW domain, the RGB domain, or the YUV domain, to improve the image quality before the ISP performs the image processing; and sequentially performing the image processing in the RAW domain, the image processing in the RGB domain, and the image processing in the YUV domain on the second image by using the ISP, and encoding the processed image to obtain the captured image.

In another possible implementation of the fourth aspect, when the computer instructions are executed by the processor, the electronic device is enabled to further perform the following steps: running the preset RAW domain image processing algorithm by using the m frames of first images in a Bayer format as an input to obtain the second image in an RGB format, where the preset RAW domain image processing algorithm integrates the image processing functions in the RAW domain, to improve the image quality before the ISP performs the image processing in the RGB domain and the image processing in the YUV domain on the image; and sequentially performing the image processing in the RGB domain and the image processing in the YUV domain on the second image by using the ISP, and encoding the processed image to obtain the captured image.

In another possible implementation of the fourth aspect, the preset RAW domain image processing algorithm further integrates some of the image processing functions in at least one of the RGB domain or the YUV domain, to improve the image quality before the ISP performs the image processing in the RGB domain.

In another possible implementation of the fourth aspect, when the computer instructions are executed by the processor, the electronic device is enabled to further perform the following steps: running the preset RAW domain image processing algorithm by using the m frames of first images in a Bayer format as an input to obtain the second image in a YUV format, where the preset RAW domain image processing algorithm integrates the image processing functions in the RAW domain and the image processing functions in the RGB domain, to improve the image quality before the ISP performs image processing in the YUV domain on the image; and performing the image processing in the YUV domain on the second image by using the ISP, and encoding the processed image to obtain the captured image.

In another possible implementation of the fourth aspect, the preset RAW domain image processing algorithm further integrates some of the image processing functions in the YUV domain, to improve the image quality before the ISP performs the image processing in the YUV domain.

In another possible implementation of the fourth aspect, when the computer instructions are executed by the processor, the electronic device is enabled to further perform the following steps: sequentially performing the image processing in the RAW domain, the image processing in the RGB domain, and the image processing in the YUV domain on the first image by using the ISP of the electronic device to obtain the preview image; and processing, in a time division multiplexing manner by using the ISP, the first image to obtain the preview image, and processing the second image to obtain the captured image.

According to a fifth aspect, this application provides an electronic device, where the electronic device includes a touchscreen, a memory, a display, one or more cameras, and one or more processors. The memory, the display, and the camera are coupled to the processor. The camera is configured to collect an image. The display is configured to display the image captured by the camera or an image generated by the processor. The memory stores computer program code, and the computer program code includes computer instructions. When the computer instructions are executed by the processor, the electronic device is enabled to perform the following steps: receiving a first operation of a user, where the first operation is used to trigger the electronic device to start recording a video: displaying a viewfinder screen in response to the first operation, where the viewfinder screen displays a preview image stream, the preview image stream includes n frames of preview images, the preview images are obtained based on n frames of first images collected by the camera of the electronic device after the electronic device receives the first operation, the viewfinder screen further includes a snapshot shutter, the snapshot shutter is configured to trigger the electronic device to take a snapshot, the n frames of first images are stored in a first buffer queue of the electronic device, n≥1, and n is an integer: periodically performing image processing on k frames of first images buffered in the first buffer queue to obtain a second image, where k≥1, and k is an integer: receiving a second operation of the user: stopping recording the video in response to the second operation: saving the video, and when the camera collects a $q^{th}$ frame of first image in the n frames of first images, receiving a third operation performed by the user on the snapshot shutter; and performing, in response to the third operation, image quality enhancement on a fourth image by using a latest frame of second image obtained when the electronic device receives the third operation, to obtain a captured image, where the fourth image is one frame of image in the video whose time information is the same as time information of the $q^{th}$ frame of first image.

In another possible implementation of the fifth aspect, the image processing includes image processing in a RAW domain and an image signal processor ISP image processing, the image processing in the RAW domain is image processing performed in RAW color space, the ISP image processing is image processing performed by using an image signal processor ISP of the electronic device, and image quality of the second image is better than image quality of the k frames of first images; or the image processing includes the image processing in the RAW domain, the ISP image processing, and encoding processing, and the image quality of the second image is better than the image quality of the k frames of first images.

In another possible implementation of the fifth aspect, n≥2.

In another possible implementation of the fifth aspect, k≥2.

In another possible implementation of the fifth aspect, when the computer instructions are executed by the processor, the electronic device is enabled to further perform the following steps: periodically running a preset RAW domain image processing algorithm by using the k frames of first images buffered in the first buffer queue as an input to obtain a third image, where the preset RAW domain image processing algorithm has a function of improving the image quality; and processing the third image by using the ISP of the electronic device to obtain the second image.

In another possible implementation of the fifth aspect, the image quality enhancement includes image super-resolution; and resolution of the second image and the captured image is higher than resolution of the $q^{th}$ frame of first image.

According to a sixth aspect, this application provides a computer-readable storage medium. The computer-readable storage medium includes computer instructions. When the computer instructions are run on an electronic device, the electronic device is enabled to perform the method according to any one of the first aspect or the second aspect, and the possible implementations thereof.

According to a seventh aspect, this application provides a computer program product. When the computer program product runs on a computer, the computer is enabled to perform the method according to any one of the first aspect or the second aspect, and the possible implementations. The computer may be the foregoing electronic device.

It can be understood that, for beneficial effects that can be achieved by the electronic device according to any one of the third aspect, the fourth aspect, the fifth aspect, and the possible implementations thereof, the computer storage medium according to the sixth aspect, and the computer program product according to the seventh aspect, reference may be made to the beneficial effects according to any one of the first aspect, the second aspect, and the possible implementations thereof. Details are not described herein again.

DESCRIPTION OF EMBODIMENTS

In the following, the terms "first" and "second" are used for descriptive purposes only, and cannot be construed as indicating or implying relative importance or implicitly indicating a quantity of technical features indicated. Therefore, the features defined with "first" and "second" may explicitly or implicitly include one or more of the features. In the description of embodiments, unless otherwise stated, "a plurality of" means two or more.

Currently, in a video recording process of an electronic device, an image sensor (Sensor) of the electronic device is controlled by exposure, so that images can be continuously output. Each frame of image is processed by using an image signal processor (image signal processor, ISP) or an image signal processing algorithm of the electronic device, and then encoded by using an encoder (ENCODER). In this way, a video file can be obtained. For the electronic device represented by a mobile phone, an original image output by the image sensor of the electronic device is usually an image in a Bayer (Bayer) format. Some image sensors can output images in formats such as RGGB, RGBW, CMYK, RYYB, and CMY. In the embodiments of this application, an example in which the image sensor of the mobile phone outputs the image in a Bayer format is used for description. It should be noted that the image sensor that output the images in formats such as RGGB, RGBW, CMYK, RYYB, and CMY, and another electronic device equipped with the image sensor are also applicable to the technical solution provided in the embodiment of this application.

Figure 1A:
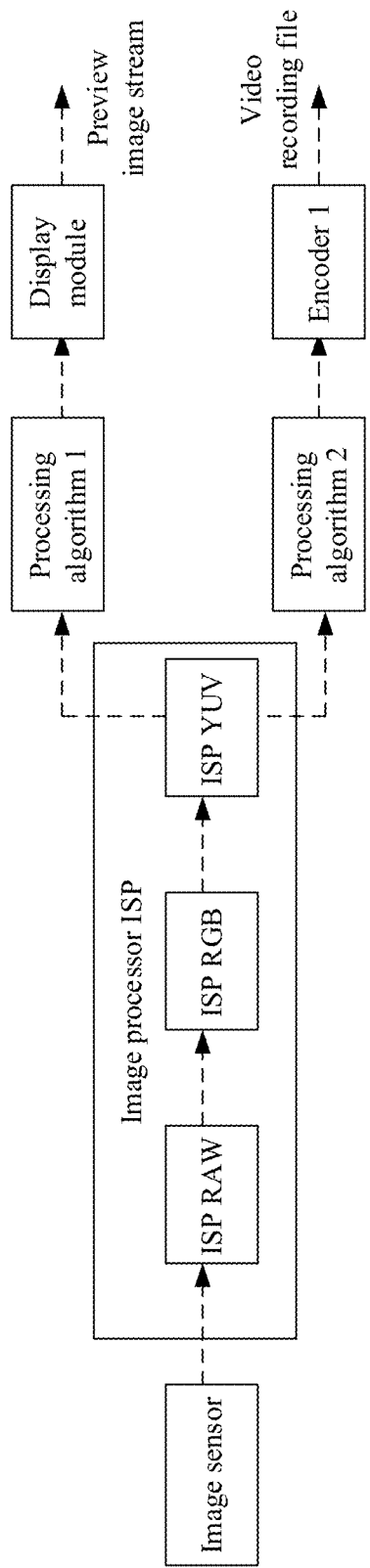
FIG. 1A is a flowchart of image processing in a video recording process of a mobile phone.
Figure 1B:
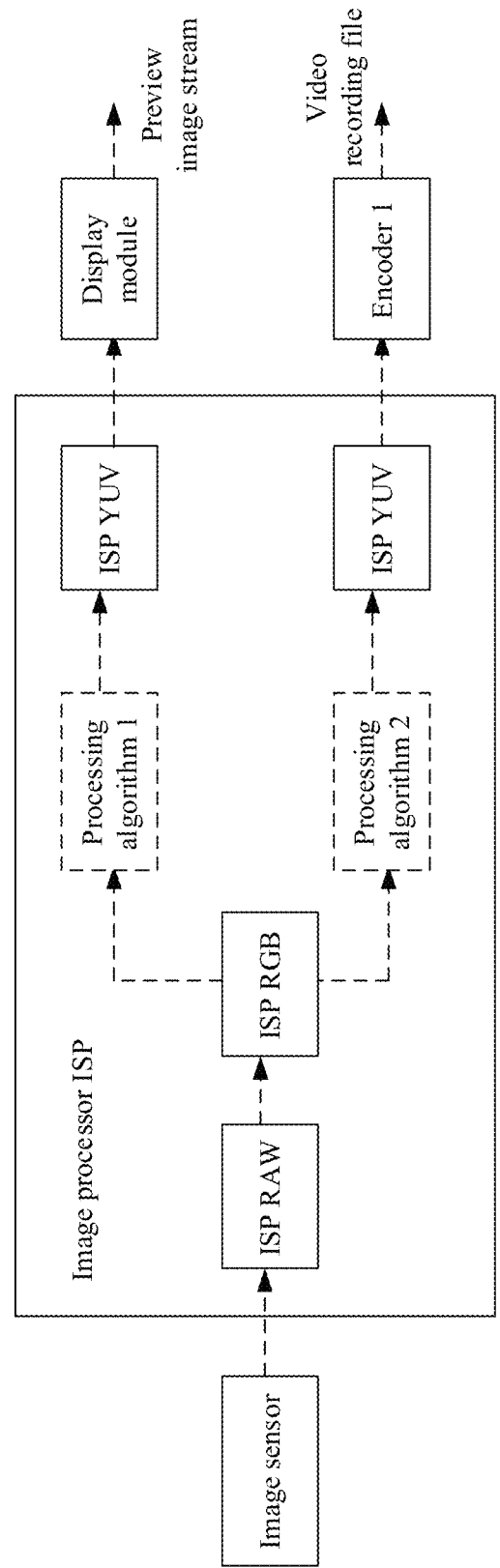
FIG. 1B is a flowchart of another type of image processing in a video recording process of a mobile phone.

RGGB is short for red green green blue, RGBW is short for red green blue white, CMYK is short for cyan magenta yellow black, RYYB is short for red yellow yellow blue, and CMY is short for cyan magenta yellow:

FIG. 1A or FIG. 1B is a processing procedure of a preview image stream and a video recording file in a video recording process of a mobile phone. The preview image stream includes a plurality of frames of preview images that are finally presented on a display to a user in the video recording process of the mobile phone. The video recording file refers to a video stream that is finally used to store, in a format of a video file, in the mobile phone for viewing by the user after video recording stops.

As shown in FIG. 1A or FIG. 1B. ISP image processing of the mobile phone may be classified into processing in three image format domains: image processing in a RAW domain, image processing in an RGB domain, and image processing in a YUV domain.

The image processing in the RAW domain may include processing such as black level correction (black level correction. BLC), linearization (Linearization) correction, lens shading correction (lens shading correction. LSC), defect pixel correction (defect pixel correction. DPC). RAW denoising (Denoise), an automatic white balance (automatic white balance. AWB), green imbalance correction (green imbalance. GIC), and chromatic aberration correction (CAC).

The image processing in the RGB domain may include: demosaicing (Demosiac), color correction CC, dynamic range control (dynamic range control. DRC). Gamma correction, and RGB2YUV (RGB to YUV).

The image processing in the YUV domain may include: UV subsampling, color enhancement CE, spatial domain denoising YUVNF, color management 3DLUT, sharpening sharpness, and a scaling scalar.

It should be noted that classification of the "RAW domain", the "RGB domain", and the "YUV domain" in the ISP includes but is not limited to the foregoing division manner. For example, demosaicing (Demosiac) may be further included in the "RAW domain". This is not limited in this embodiment of this application.

In an implementation, as shown in FIG. 1A, after an image sensor (Sensor) outputs an image, the ISP may perform the image processing in the "RAW domain", the "RGB domain", and the "YUV domain" on the image. After the image processing in the "YUV domain" is performed, the image may be divided into two data streams. One data stream is processed by using a processing algorithm 1 shown in FIG. 1A, and then a display module performs encoding or format conversion to obtain and display a preview image. The other data stream is processed by using a processing algorithm 2 shown in FIG. 1A, and then may be encoded by an encoder 1 to obtain a video recording file.

In an implementation, as shown in FIG. 1B, after the image sensor (Sensor) outputs an image, the ISP may perform the image processing in the "RAW domain" and the "RGB domain" on the image. After the image processing in the "RGB domain" is performed, the image may be divided two data streams. One data stream is processed by using a processing algorithm 1 shown in FIG. 1B, then the ISP performs the image processing in the "YUV domain" on an obtained data stream, and then a display module performs encoding or format conversion on an obtained data stream to obtain and display a preview image. The other data stream is processed by using a processing algorithm 2 shown in FIG. 1B, then the ISP performs the image processing in the "YUV domain", and then encoding may be performed by an encoder 1 to obtain a video recording file.

The image processing based on the processing algorithm 1 and the processing algorithm 2 may be performed in the RGB domain, or may be performed in the YUV domain.

For example, in an example in which the image is processed by using the processing algorithm 1, after the ISP performs the image processing in "RGB domain" on the image, the ISP may process the image by using the processing algorithm 1 before the image is converted from the RGB format to the YUV format. Then, the ISP may convert the image that is processed by using the processing algorithm 1 into the YUV format, and then perform the image processing in "YUV domain" on the image.

For another example, still in the example in which the image is processed by using the processing algorithm 1, after the ISP performs the image processing in the "RGB domain" on the image, the ISP may first convert the image from the RGB format to the YUV format, and then process the image in the YUV format by using the processing algorithm 1. Then, the ISP may perform the image processing in "YUV domain" on an image that is processed by using the processing algorithm 1.

It should be noted that the processing algorithm 1 may also be referred to as a post-processing algorithm of the preview image, and the processing algorithm 2 may also be referred to as a post-processing algorithm of the video recording file. The processing algorithm 1 and the processing algorithm 2 may include processing functions such as anti-jitter processing, denoising processing, blurring processing, color adjustment, and brightness adjustment. The image output by the sensor is the image in a Bayer (Bayer) format (referred to as a Bayer image). In FIG. 1A or FIG. 1B, an input image of the ISP in the "RAW domain" is the image in the Bayer format (namely, the Bayer image), and an output image of the ISP in the "RAW domain" is an image in the RGB format (referred to as an RGB image). In FIG. 1A or FIG. 1B, an input image of the ISP in the "RGB domain" is the image in the RGB format (namely, the RGB image), and an output image of the ISP in the "RGB domain" is an image in the YUV format (referred to as a YUV image). In FIG. 1A or FIG. 1B, an input image of the ISP in the "YUV domain" is the image in the YUV format (namely: the YUV image), and an output image of the ISP in the "YUV domain" may be encoded (ENCODE) to obtain the preview image or the video recording file.

Bayer. RGB, and YUV are three expression formats of an image. For detailed descriptions of the Bayer image, the RGB image, and the YUV image, refer to related content in the conventional technology. Details are not described herein.

It should be noted that the sensor outputs the image, the ISP and the encoder (namely, the ENCODER, for example, an encoder and the encoder 1 of the display module) process the image, which can be used for video recording. Therefore, data streams (such as a data stream of the video recording file and a data stream of the preview image) in a whole process in which the sensor outputs the image and the ISP and the encoder (ENCODER) process the image can be referred to as the video stream.

It should be noted that a manner in which the mobile phone processes the image in the video recording process to obtain the preview image stream and the video recording file includes but is not limited to the manners shown in FIG. 1A and FIG. 1B. Other processing manners are not described in this embodiment of this application again. In the following embodiment, the processing manner shown in FIG. 1A is used as an example to describe a method in the embodiments of this application.

Figure 2:
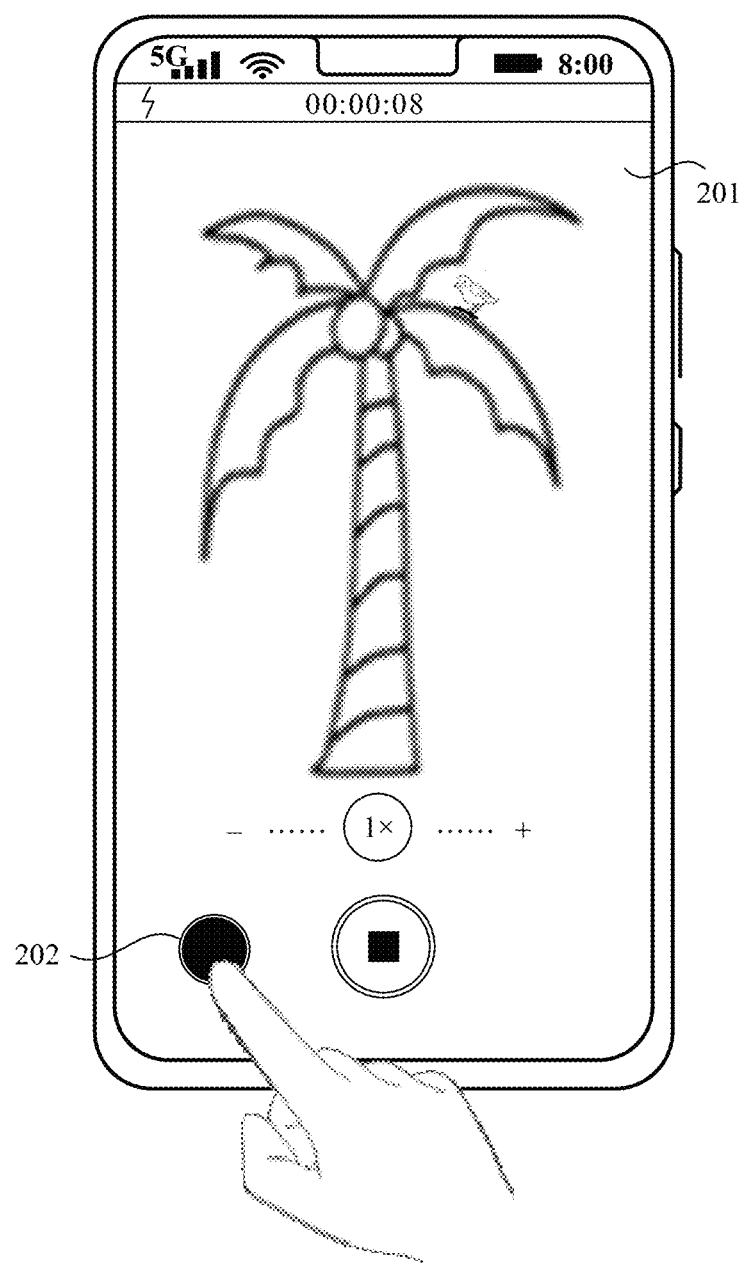
FIG. 2 is a schematic diagram of a viewfinder screen in a video of a mobile phone according to an embodiment of this application.

In the video recording process of the mobile phone, the mobile phone can capture an image in response to an operation of the user. For example, the mobile phone may display a video viewfinder screen 201 shown in FIG. 2. The video viewfinder screen 201 includes a snapshot shutter 202, and the snapshot shutter 202 is configured to trigger the mobile phone to capture an image in the video recording process and save the image as a photo. The mobile phone may capture the image in response to a tap operation performed by the user on the snapshot button 202 shown in FIG. 2. The user expects the mobile phone to capture an image collected by a camera at a moment when the user taps the snapshot shutter 202.

Figure 3:
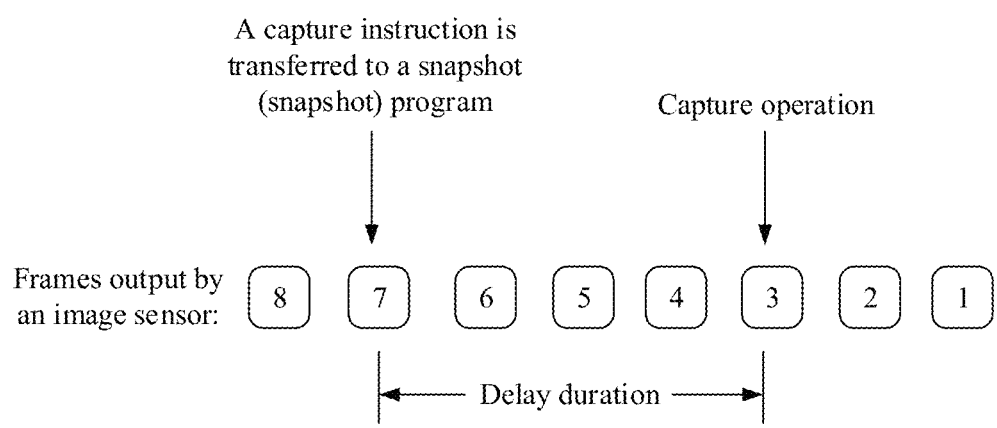
FIG. 3 is a schematic diagram of delay duration from receiving a capture operation by a mobile phone to receiving a capture indication by a sensor according to an embodiment of this application.

To capture the image during video recording of the mobile phone, in some technical solutions, when a snapshot (Snapshot) program of the mobile phone receives a capture instruction, a $1^{st}$ frame of collected image may be used as a captured image (for example, a 7th frame of image shown in FIG. 3). However, after an upper-layer application (a camera application corresponding to the video viewfinder screen 201 shown in FIG. 2) receives a capture operation of the user (for example, the tap operation performed by the user on the snapshot shutter 202), it takes time (for example, delay duration shown in FIG. 3) for the snapshot program to receive the capture instruction. During this period (for example, the delay duration shown in FIG. 3), the sensor continues to output Bayer images. Therefore, from receiving the capture operation of the user by the upper-layer application to receiving the capture instruction by the snapshot program, the sensor may output a plurality of frames of Bayer images.

For example, as shown in FIG. 3, it is assumed that when the image sensor (Sensor) outputs a $3^{rd}$ frame of Bayer image, the upper-layer application receives the capture operation, and when the sensor outputs the 7th frame of Bayer image, the capture instruction is transferred to the snapshot program. In this case, if the solution in the conventional technology is used, because of the delay duration shown in FIG. 3, the 7th frame of image is not the frame of image at the moment when the user taps the snapshot shutter 202. The frame of image that the user really needs cannot be captured by using this solution. It should be noted that, in eight frames of images shown in FIG. 3, a $1^{st}$ frame of image is the earliest frame of image output by the sensor, and an $8^{th}$ frame of image is the latest frame of image output by the sensor. The image sensor (Sensor) may sequentially expose and output the eight frames of images shown in FIG. 3 starting from the $1^{st}$ frame of image.

In some other embodiments, the mobile phone may capture, as the captured image, a frame of image that is in the video streams (such as the data stream of the video recording file and the data stream of the preview image) and that is collected by the user at a capture moment, and save the captured image as a photo for displaying to the user.

However, in the video recording process of the mobile phone, a large quantity of images (for example, 30 frames of images) need to be processed per second. In this case, an operation resource and time that are reserved for each frame of image are limited. Therefore, the mobile phone can usually use a hardware processing module of the ISP to process the video stream in a simple processing manner, instead of using a complex algorithm to improve the image quality (for example, denoising and brightening). Such an image processing effect can only meet a video requirement. However, photographing requires higher image quality. Consequently, capturing the image in the video stream cannot capture an image that the user is satisfied with.

An embodiment of this application provides a method for capturing an image during video recording, so that an image can be captured in a video recording process and image quality of a captured image can be improved.

Figure 4A:
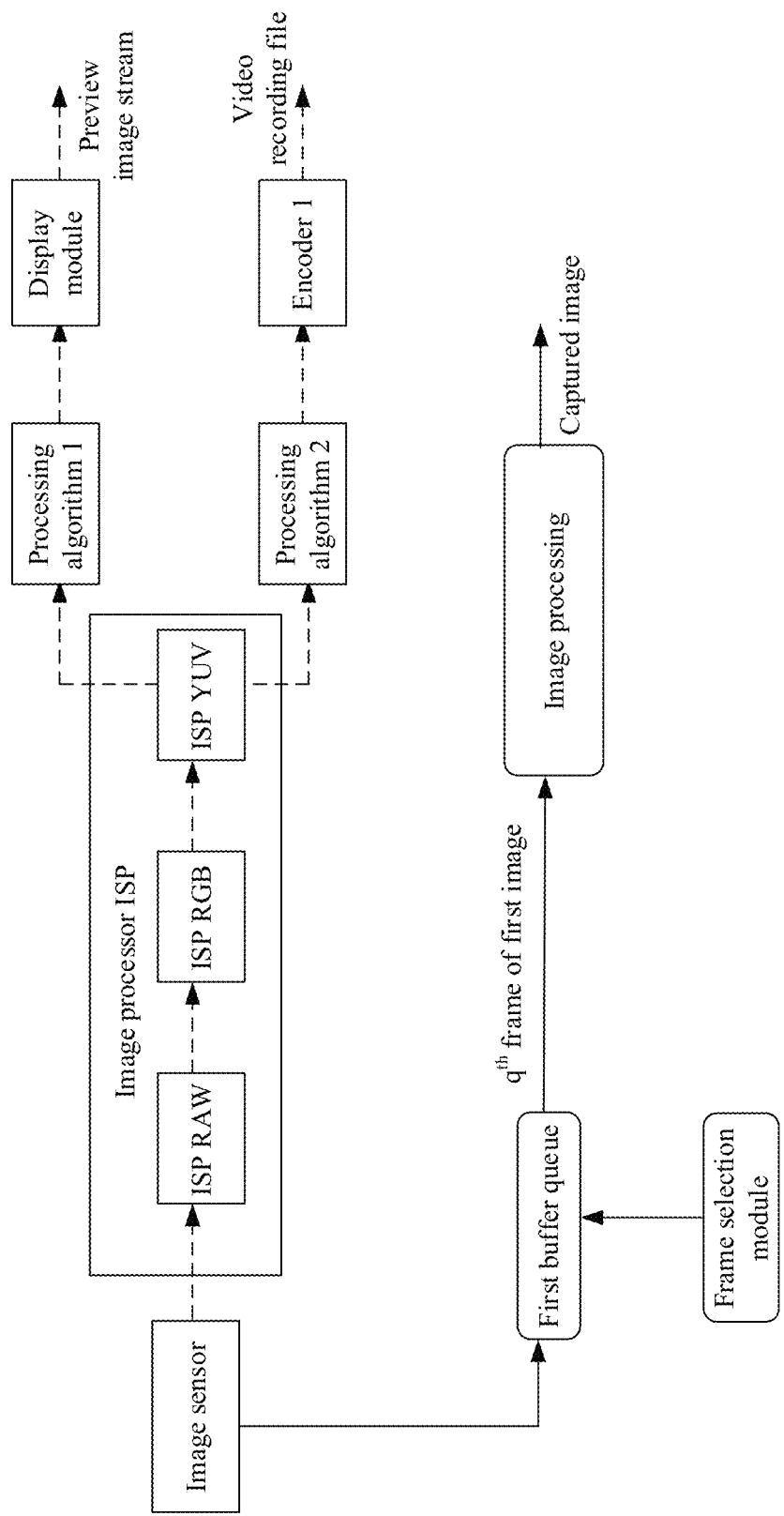
FIG. 4A is a functional block diagram of a method for capturing an image during video recording according to an embodiment of this application.

On the one hand, in this embodiment of this application, as shown in FIG. 4A, an electronic device (for example, a mobile phone) may buffer a Bayer image exposed and output by a sensor in a first buffer queue (Buffer). A plurality of frames of Bayer images may be buffered in the first buffer queue. In this case, even if there is delay duration shown in FIG. 3 from receiving the capture operation of the user to receiving the capture instruction by the snapshot program, when the capture operation of the user is received, the Bayer image output by the sensor can still be buffered in the first buffer queue. As shown in FIG. 4A, a frame selection module of the mobile phone may select a captured frame (namely, a $q^{th}$ frame of first image collected by a camera when the user inputs the capture operation) from the first buffer queue. In this way, the mobile phone can obtain, from the first buffer queue, the image collected by the camera when the user inputs the capture operation.

On the other hand, as shown in FIG. 4A, the electronic device may further perform image processing on the $q^{th}$ frame of first image to obtain the captured image, thereby improving image quality of the captured image.

In conclusion, according to the method in this embodiment of this application, an image that meets a user requirement can be captured in the video recording process, and the image quality of the captured image can be improved.

Figure 4B:
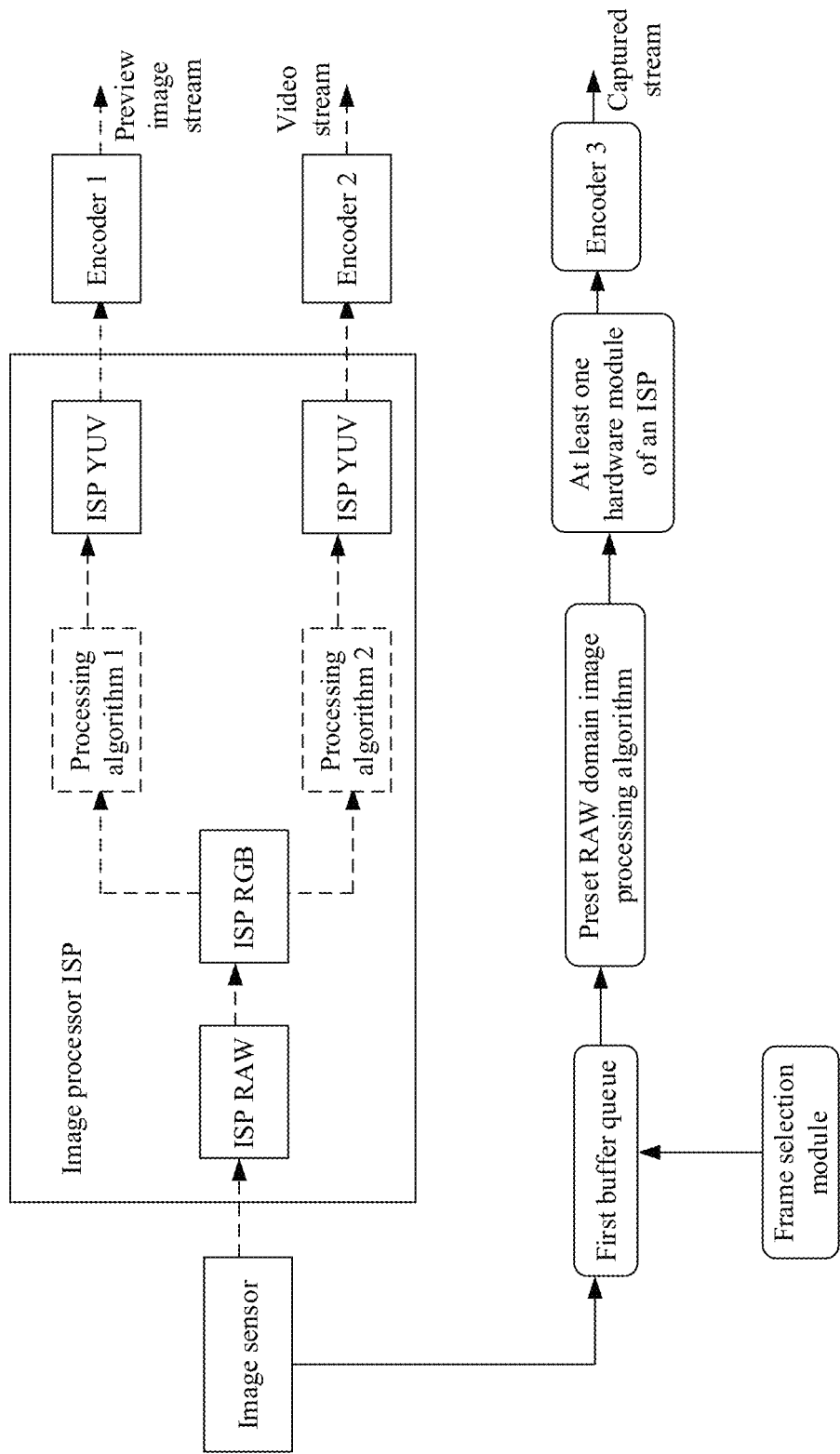
FIG. 4B is a functional block diagram of a method for capturing an image during video recording according to an embodiment of this application.

Further, the image processing may include processing of a preset RAW domain image processing algorithm and ISP image processing. As shown in FIG. 4B, the electronic device may further process, by using the preset RAW domain image processing algorithm and the ISP hardware module, a captured frame selected by a frame selection module to obtain the captured image. In some embodiments, the image processing may further include encoding processing. For example, as shown in FIG. 4B, an image processed by the ISP hardware module may be encoded by an encoder (for example, an encoder 2) to obtain the captured image. In some other embodiments, the encoding processing may be further integrated into the ISP hardware module for implementation. In this embodiment of this application, an example in which the encoding processing is independent of the ISP image processing is used to describe the method in this embodiment of this application.

In this solution, algorithm processing of the preset RAW domain image processing algorithm is added. Compared with image processing in a RAW domain, image processing in an RGB domain, and image processing in a YUV domain in which only the ISP hardware is used, a combination of the preset RAW domain image processing algorithm and the ISP has a better processing effect, which improves image quality of the captured image.

The preset RAW domain image processing algorithm is a deep learning network for image quality enhancement in the RAW domain. The preset RAW domain image processing algorithm may also be referred to as a preset image quality enhancement algorithm, a preset image quality enhancement algorithm model, or a preset RAW domain AI model.

For example, the preset RAW domain image processing algorithm may run in a graphics processing unit (graphics processing unit. GPU) and a neural-network processing unit (neural-network processing unit. NPU) of the electronic device or another processor that has a capability of running a neural network model. Before running the preset RAW domain image processing algorithm, any one of the above processors may load the preset RAW domain image processing algorithm from a memory.

In some embodiments, the preset RAW domain image processing algorithm may be a software image processing algorithm. The preset RAW domain image processing algorithm may be a software algorithm in an algorithm library at a hardware abstraction layer (hardware abstraction layer. HAL) of the mobile phone.

In some other embodiments, the preset RAW domain image processing algorithm may be a hardware image processing algorithm. The preset RAW domain image processing algorithm may be the hardware image processing algorithm implemented by invoking a "RAW domain" image processing algorithm capability in the ISP. Alternatively, the preset RAW domain image processing algorithm may be the hardware image processing algorithm implemented by invoking "RAW domain" and "RGB domain" image processing algorithm capabilities in the ISP. Alternatively, the preset RAW domain image processing algorithm may be the hardware image processing algorithm implemented by invoking "RAW domain". "RGB domain", and "YUV domain" image processing algorithm capabilities in the ISP.

It should be noted that the preset RAW domain image processing algorithm may also be referred to as a preset image processing algorithm. In this embodiment of this application, the reason why the algorithm is referred to as the preset RAW domain image processing algorithm is that an image in the RAW domain is input to the preset RAW domain image processing algorithm. The preset RAW domain image processing algorithm may output an image in the RAW domain, or may output an image in the RGB domain.

The encoder, the encoder 1, and the encoder 2 in the display module shown in FIG. 1A or FIG. 1B may be three different encoders. The mobile phone may perform encoding or format conversion by using the three different encoders to obtain the preview image, the video recording file, and the captured image. Alternatively, the encoder, the encoder 1, and the encoder 2 in the display module may be a same encoder. One encoder may include a plurality of encoding units. The mobile phone may separately perform encoding or format conversion by using three different encoding units in one encoder to obtain the preview image, the video recording file, and the captured image. Alternatively, the encoder and the encoder 1 in the display module may be two different encoding units in a same encoder, and the encoder 2 may be another encoder.

Encoding manners of different encoders may be the same or different. Encoding manners of different encoding units of the same encoder may be the same or different. Therefore, image formats output by the encoder and the encoder 1 in the display module may be the same or different. For example, images output by the encoder and the encoder 1 in the display module may be images in any format, for example, joint photographic experts group (Joint Photographic Experts Group. JPEG) or tag image file format (Tag Image File Format. TIFF).

For example, the electronic device in this embodiment of this application may be a mobile phone, a tablet computer, a smartwatch, a desktop computer, a laptop computer, a handheld computer, a notebook computer, an ultra-mobile personal computer (ultra-mobile personal computer. UMPC), a netbook, a cellular phone, a personal digital assistant (personal digital assistant. PDA), an augmented reality (augmented reality. AR)/virtual reality (virtual reality. VR) device, or the like that includes the camera. A specific form of the electronic device is not specifically limited in this embodiment of this application.

Figure 5A:
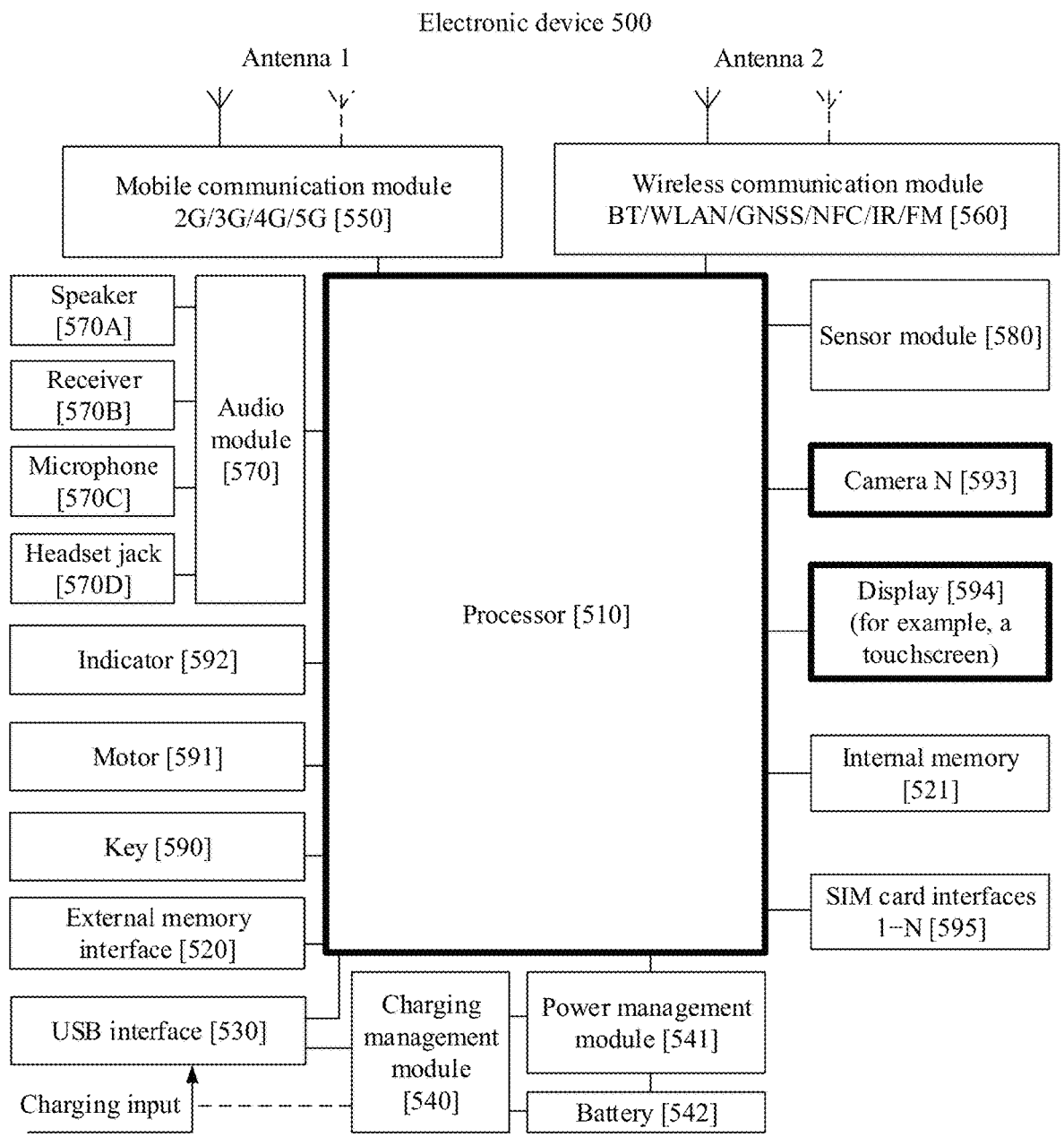
FIG. 5A is a schematic diagram of a hardware structure of a mobile phone according to an embodiment of this application.

The following describes the embodiments of this application in detail with reference to the accompanying drawings. FIG. 5A is a schematic diagram of a structure of an electronic device 500 according to an embodiment of this application. As shown in FIG. 5A, the electronic device 500 may include a processor 510, an external memory interface 520, an internal memory 521, a universal serial bus (universal serial bus, USB) interface 530, a charging management module 540), a power management module 541, a battery 542, an antenna 1, an antenna 2, a mobile communication module 550, a wireless communication module 560, an audio module 570, a speaker 570A, a receiver 570B, a microphone 570C, a headset jack 570D, a sensor module 580), a key 590, a motor 591, an indicator 592, a camera 593, a display 594, a subscriber identification module (subscriber identification module, SIM) card interface 595, and the like.

The sensor module 580 may include sensors such as a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It can be understood that the structure illustrated in this embodiment does not constitute a specific limitation on the electronic device 500. In some other embodiments, the electronic device 500 may include more or fewer components than those shown in the figure, or combine some components, or split some components, or have different component arrangements. The illustrated components may be implemented by using hardware, software, or a combination of software and hardware.

The processor 510 may include one or more processing units. For example, the processor 510 may include an application processor (application processor, AP), a modem processor, a GPU, an image signal processor (image signal processor, ISP), a controller, a memory, a video codec, a digital signal processor (digital signal processor, DSP), a baseband processor, and/or an NPU. Different processing units may be independent devices, or may be integrated into one or more processors.

The controller may be a nerve center and a command center of the electronic device 500. The controller can generate an operation control signal based on instruction operation codes and a timing signal, and complete the control of fetching and executing instructions.

The processor 510 may be further provided with a memory for storing instructions and data. In some embodiments, the memory in the processor 510 is a cache. The memory can store an instruction or data that the processor 510 has just used or used cyclically. If the processor 510 needs to use the instruction or data again, the instruction or data can be directly invoked from the memory: Repeated access is avoided, and a waiting time of the processor 510 is reduced, thereby improving system efficiency.

In some embodiments, the processor 510) may include one or more interfaces. It can be understood that the interface connection relationship between the modules illustrated in the embodiments is merely an example for description, and does not constitute a limitation on the structure of the electronic device 500. In some other embodiments, the electronic device 500 may alternatively use an interface connection mode that is different from those in the foregoing embodiments, or use a combination of a plurality of interface connection modes.

The charging management module 540 is configured to receive a charging input from a charger. When charging the battery 542, the charging management module 540 can further supply power to the electronic device by using the power management module 541.

The power management module 541 is configured to connect the battery 542, the charging management module 540, and the processor 510. The power management module 541 receives an input of the battery 542 and/or an input of the charging management module 540, and supplies power to the processor 510, the internal memory 521, an external memory, the display 594, the camera 593, the wireless communication module 560, and the like.

The wireless communication function of the electronic device 500 may be implemented by using the antenna 1, the antenna 2, the mobile communication module 550, the wireless communication module 560), the modem processor, the baseband processor, and the like.

The antenna 1 and the antenna 2 are configured to transmit and receive electromagnetic wave signals. In some embodiments, the antenna 1 of the electronic device 500 is coupled to the mobile communication module 550), and the antenna 2 is coupled to the wireless communication module 560, so that the electronic device 500) can communicate with a network and another device by using a wireless communication technology.

The electronic device 500 implements a display function by using the GPU, the display 594, the application processor, and the like. The GPU is an image processing microprocessor, which is connected to the display 594 and the application processor. The GPU is configured to perform mathematical and geometric calculations to render graphics. The processor 510 may include one or more GPUs that execute program instructions to generate or change display information.

The display 594 is configured to display an image, a video, and the like. The display 594 includes a display panel. The display panel may be a liquid crystal display (liquid crystal display. LCD), an organic light-emitting diode (organic light-emitting diode. OLED), an active-matrix organic light emitting diode (active-matrix organic light emitting diode. AMOLED), a flex light-emitting diode (flex light-emitting diode. FLED), a mini LED, a micro LED, a micro-OLED, a quantum dot light emitting diode (quantum dot light emitting diodes. QLED), or the like.

The electronic device 500 can implement a photographing function by using the ISP, the camera 593, the video codec, the GPU, the display 594, the application processor, and the like.

The ISP is configured to process data fed back by the camera 593. For example, during photographing, a shutter is pressed, light is transmitted to a photosensitive element of the camera by using a lens, an optical signal is converted into an electrical signal, and the photosensitive element of the camera transfers the electrical signal to the ISP for processing, so that the electrical signal is converted into an image visible to a naked eye. The ISP can further optimize algorithms for noise, brightness, and a skin color of the image. The ISP can further optimize parameters such as exposure and a color temperature in a photographing scenario. In some embodiments, the ISP may be disposed in the camera 593.

The camera 593 is configured to capture a static image or a video. An optical image is generated for an object through the lens and is projected to the photosensitive element. The photosensitive element may be a charge coupled device (charge coupled device. CCD) or a complementary metal-oxide-semiconductor (complementary metal-oxide-semiconductor, CMOS) phototransistor. The photosensitive element converts an optical signal into an electrical signal, and then transfers the electrical signal to the ISP. The ISP converts the electrical signal into a digital image signal. The ISP outputs the digital image signal to the DSP for processing. The DSP converts the digital image signal into an image signal in a standard format of RGB. YUV, or the like. In some embodiments, the electronic device 500 may include N cameras 593, where N is a positive integer greater than 1.

The digital signal processor is configured to process a digital signal. In addition to processing a digital image signal, the digital signal processor can further process another digital signal. For example, when the electronic device 500 selects a frequency, the digital signal processor is configured to perform Fourier transform or the like on energy of the frequency.

The video codec is configured to compress or decompress a digital video. The electronic device 500 may support one or more types of video codecs. Therefore, the electronic device 500 may play or record videos in a plurality of encoding formats, such as moving picture experts group (moving picture experts group. MPEG)1, MPEG2, MPEG3, and MPEG4.

The NPU is a neural-network (neural-network. NN) computing processor that processes input information quickly by referring to a structure of a biological neural network, for example, by referring to a transmission mode between human brain neurons, and can further perform self-learning continuously. The NPU can implement applications such as intelligent cognition of the electronic device 500, for example, image recognition, face recognition, voice recognition, and text understanding.

The external memory interface 520 may be configured to connect to an external memory card, such as a micro SD card, to extend a storage capability of the electronic device 500. The external memory card communicates with the processor 510 by using the external memory interface 520, to implement a data storage function. For example, music, video, and other files are stored in the external memory card.

The internal memory 521 may be configured to store computer executable program code, where the executable program code includes instructions. The processor 510 executes various functional applications and data processing of the electronic device 500 by running the instructions stored in the internal memory 521. For example, in this embodiment of this application, the processor 510 may execute the instructions stored in the internal memory 521, and the internal memory 521 may include a program storage area and a data storage area.

The program storage area may store an operating system, an application required by at least one function (such as a sound play function or an image play function), or the like. The data storage area may store data (such as audio data and a phone book) created during use of the electronic device 500. In addition, the internal memory 521 may include a high-speed random access memory, and may further include a non-volatile memory, such as at least one magnetic disk storage device, a flash memory device, or a universal flash storage (universal flash storage. UFS).

The electronic device 500 can implement audio functions by using the audio module 570, the speaker 570A, the receiver 570B, the microphone 570C, the headset jack 570D, the application processor, and the like. The audio functions are, for example, music playback and sound recording.

The key 590 includes a power-on key: a volume key, and the like. The motor 591 can generate a vibration prompt. The indicator 592 may be an indicator light, which may be configured to indicate a charging state and a power change, or to indicate a message, a missed incoming call, a notification, or the like.

The SIM card interface 595 is configured to connect to a SIM card. The SIM card may be inserted into the SIM card interface 595 or pulled out of the SIM card interface 595, so that the SIM card is in contact with or separated from the electronic device 500. The electronic device 500 can support one or N SIM card interfaces, where N is a positive integer greater than 1. The SIM card interface 595 can support the Nano SIM card, the Micro SIM card, the SIM card, and the like.

Figure 5B:
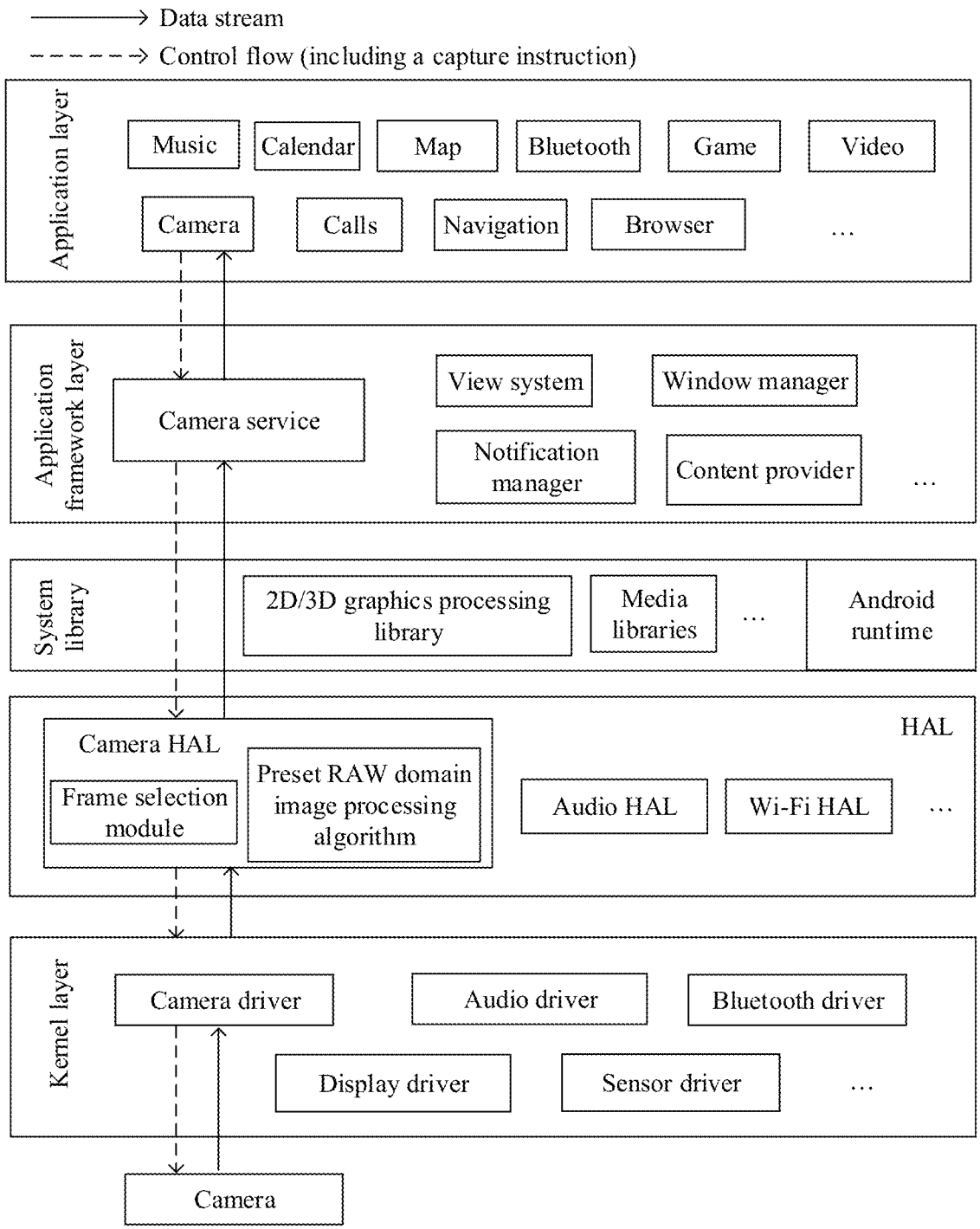
FIG. 5B is a schematic diagram of a software architecture of a mobile phone according to an embodiment of this application.

The method in the following embodiments may be implemented in the electronic device 500 having the foregoing hardware structure. In the following embodiments, an example in which the electronic device 500 is the mobile phone is used to describe the method in the embodiments of this application. FIG. 5B is a block diagram of a software architecture of a mobile phone according to an embodiment of this application.

The hierarchical architecture divides software into layers, and each layer has a clear function and division of labor. The layers communicate with each other by using a software interface. In some embodiments, an Android™ system is divided into five layers: an application layer, an application framework layer, an Android runtime (Android runtime) and a system library, a hardware abstraction layer (hardware abstraction layer. HAL), and a kernel layer from top to bottom. It should be understood that the Android system is used as an example for description in this specification. In another operating system (for example, a Harmony™ system or an IOS™ system), the solutions of this application can be implemented, provided that functions implemented by functional modules are similar to those implemented in the embodiments of this application.

The application layer may include a series of application packages.

As shown in FIG. 5B, applications such as Phone, Memo, Browser, Contacts, Gallery, Calendar, Map, Bluetooth, Music, Video, and SMS may be installed at the application layer.

In this embodiment of this application, an application with a photographing function, for example, a camera application may be installed at the application layer. Certainly, when another application needs to use the photographing function, the camera application may be invoked to implement the photographing function.

The application framework layer provides an application programming interface (application programming interface. API) and a programming framework for applications at the application layer. The application framework layer includes some predefined functions.

For example, the application framework layer may include a window manager, a content provider, a view system, a resource manager, and a notification manager. This is not limited in this embodiment of this application.

For example, the window manager is used to manage a window program. The window manager may obtain a display size, determine whether there is a status bar, lock a screen, take a screenshot, and the like. The content provider is used to store and obtain data, and enables these data to be accessible to an application. The data may include videos, images, audios, calls made and received, browsing histories and bookmarks, phone books, and the like. The view system may be used to construct a display interface of an application. Each display interface may include one or more controls. Generally, the control may include interface elements such as an icon, a button, a menu, a tab, a text box, a dialog box, a status bar, a navigation bar, and a widget (Widget). The resource manager provides various resources for applications, such as localized strings, icons, pictures, layout files, and video files. The notification manager enables the application to display notification information in the status bar, which can be used to convey a notification-type message, and can automatically disappear after a short stay without user interaction. For example, the notification manager is used for notifying download completion or as a message reminder. The notification manager may alternatively be a notification that appears in the status bar at the top of the system in a form of a chart or a scroll bar text, for example, a notification for an application running in the background, or a notification that appears on a screen in a form of a dialog window. For example, a text message is displayed in the status bar, a prompt tone is made, vibration is performed, and an indicator light flashes.

As shown in FIG. 5B, the Android runtime includes a core library and a virtual machine. The Android runtime is responsible for scheduling and management of the Android system.

The core library includes two parts: a function that needs to be invoked in JAVA language and a core library of the Android.

| The application layer and the application framework layer run on the virtual machine. The virtual machine executes java files at the application layer and the application framework layer as binary files. The virtual machine is used to implement functions such as object lifecycle management, stack management, thread management, security and exception management, and garbage collection.

The system library may include a plurality of functional modules, such as a surface manager (surface manager), media libraries (Media Libraries), a 3D graphics processing library (for example, an OpenGL ES), and a 2D graphics engine (for example, an SGL).

The surface manager is used to manage a display subsystem, and provide fusion of 2D and 3D layers for a plurality of applications. The media libraries support a plurality of common audio and video formats for playback and recording, still image files, and the like. The media libraries may support a plurality of audio and video encoding formats, such as MPEG4, H.264, MP3, AAC, AMR, JPG, and PNG. The 3D graphics processing library is used to implement 3D graphics drawing, image rendering, composition, layer processing, and the like. The 2D graphics engine is a drawing engine for 2D graphics.

The kernel layer is located below the HAL, and is a layer between hardware and software. The kernel layer includes at least a display driver, a camera driver, an audio driver, and a sensor driver. This is not limited in this embodiment of this application.

In this embodiment of this application, still as shown in FIG. 5B and using the camera application as an example, a camera service (Camera Service) may be disposed at the application framework layer. The camera application may enable the camera service by invoking a preset API. During running, the camera service can interact with a camera HAL at the hardware abstraction layer (HAL). The camera HAL is responsible for interacting with a hardware device (for example, the camera) that implements a photographing function and that is in the mobile phone. On the one hand, the camera HAL hides implementation details (for example, a specific image processing algorithm) of a related hardware device. In addition, the camera HAL can provide an interface for invoking the related hardware device to the Android system.

For example, during running, the camera application can send, to the camera service, a related control command (for example, a preview: zooming in, photographing, video recording, or capture instruction) delivered by a user. On the one hand, the camera service can send the received control command to the camera HAL, so that the camera HAL can invoke the camera driver at the kernel layer based on the received control command. The camera driver drives hardware devices such as the camera to collect image data in response to the control command. For example, the camera may transmit, at a specific frame rate, the data of each frame of the collected image to the camera HAL by using the camera driver. For a transfer process of the control command in the operating system, refer to a detailed transfer process of a control flow in FIG. 5B.

On the other hand, after receiving the control command, the camera service can determine a photographing policy at this time based on the received control command, and a specific image processing task that needs to be executed on the collected image data is set in the photographing policy. For example, in a preview mode, the camera service may set an image processing task 1 in the photographing policy to implement a face detection function. For another example, if the user enables a facial beautification function in the preview mode, the camera service may further set an image processing task 2 in the photographing policy to implement the facial beautification function. Further, the camera service may send the determined photographing policy to the camera HAL.

After receiving the data of each frame of image collected by the camera, the camera HAL may execute a corresponding image processing task on the image data according to the photographing policy delivered by the camera service, to obtain each frame of photographed image obtained after image processing. For example, the camera HAL may execute the image processing task 1 on the received data of each frame of image according to a photographing policy 1, to obtain each corresponding frame of photographed image. After the photographing policy 1 is updated to a photographing policy 2, the camera HAL may execute the image processing task 2 on the received data of each frame of image according to the photographing policy 2, to obtain each corresponding frame of photographed image.

Subsequently, the camera HAL can report each frame of photographed image obtained after the image processing to the camera application by using the camera service. The camera application can display each frame of photographed image on the display interface, or the camera application saves each frame of photographed image in a form of a photo or a video in the mobile phone. For a transfer process of the photographed image in the operating system, refer to a detailed transfer process of a data stream in FIG. 5B.

With reference to FIG. 5B, this embodiment of this application describes an operating principle for implementing the method in the embodiments of this application at each software layer in the mobile phone. When running in a video recording mode, the camera application may send a capture instruction delivered by the user to the camera service. In the video recording mode, the camera HAL may invoke, based on the previously received video recording instruction, the camera driver at the kernel layer. The camera driver drives the hardware devices such as the camera to collect the image data in response to the video recording instruction. For example, the camera may transmit, at a specific frame rate, the data of each frame of the collected image to the camera HAL by using the camera driver. A data stream that includes each frame of image transmitted by the camera driver based on the video recording instruction to the camera HAL may be the video streams (such as the data stream of the video recording file and the data stream of the preview image) described in the embodiments of this application.

In addition, after receiving the capture instruction, the camera service may determine, based on the received capture instruction, that a photographing policy 3 in this case is to capture an image during video recording. A specific image processing task 3 that needs to be executed on the collected image data is set in the photographing policy, and the image processing task 3 is used to implement a capture function during video recording. Further, the camera service may send the determined photographing policy 3 to the camera HAL.

After receiving the data of each frame of image collected by the camera, the camera HAL may execute the corresponding image processing task 3 on the image data according to the photographing policy 3 delivered by the camera service, to obtain a corresponding captured image.

It should be noted that, in this embodiment of this application, each frame of image that is exposed and output by an image sensor (Sensor) of the camera may be buffered in a first buffer queue (Buffer). In response to the capture instruction, the camera HAL may select a captured frame (namely: an image collected by the camera when the user inputs a capture operation) from the Buffer. In this way, the mobile phone can obtain, from the first buffer queue, the image collected by the camera when the user inputs the capture operation. The first buffer queue (Buffer) may be disposed at any layer of a mobile phone software system. For example, the first buffer queue (Buffer) may be provided in a memory area that is accessed by the camera HAL by using a software interface.

In some embodiments, the HAL may further include a preset RAW domain image processing algorithm. In some embodiments, the camera HAL may include the preset RAW domain image processing algorithm. The camera HAL may invoke the preset RAW domain image processing algorithm to process the captured frame and a frame adjacent to the captured frame, to obtain a processed image frame. The CSI may be a software interface between the Buffer and the preset RAW domain image processing algorithm.

Then, the camera HAL may invoke, based on the previously received capture instruction, the camera driver at the kernel layer. The camera driver drives hardware devices such as an ISP in the camera to perform hardware processing on the processed image frame in response to the capture instruction, to obtain a corresponding frame of captured image. Subsequently, the camera HAL can report the captured image obtained after the image processing to the camera application by using the camera service. The camera application can save the captured image in a form of a photo in the mobile phone.

Figure 6A:
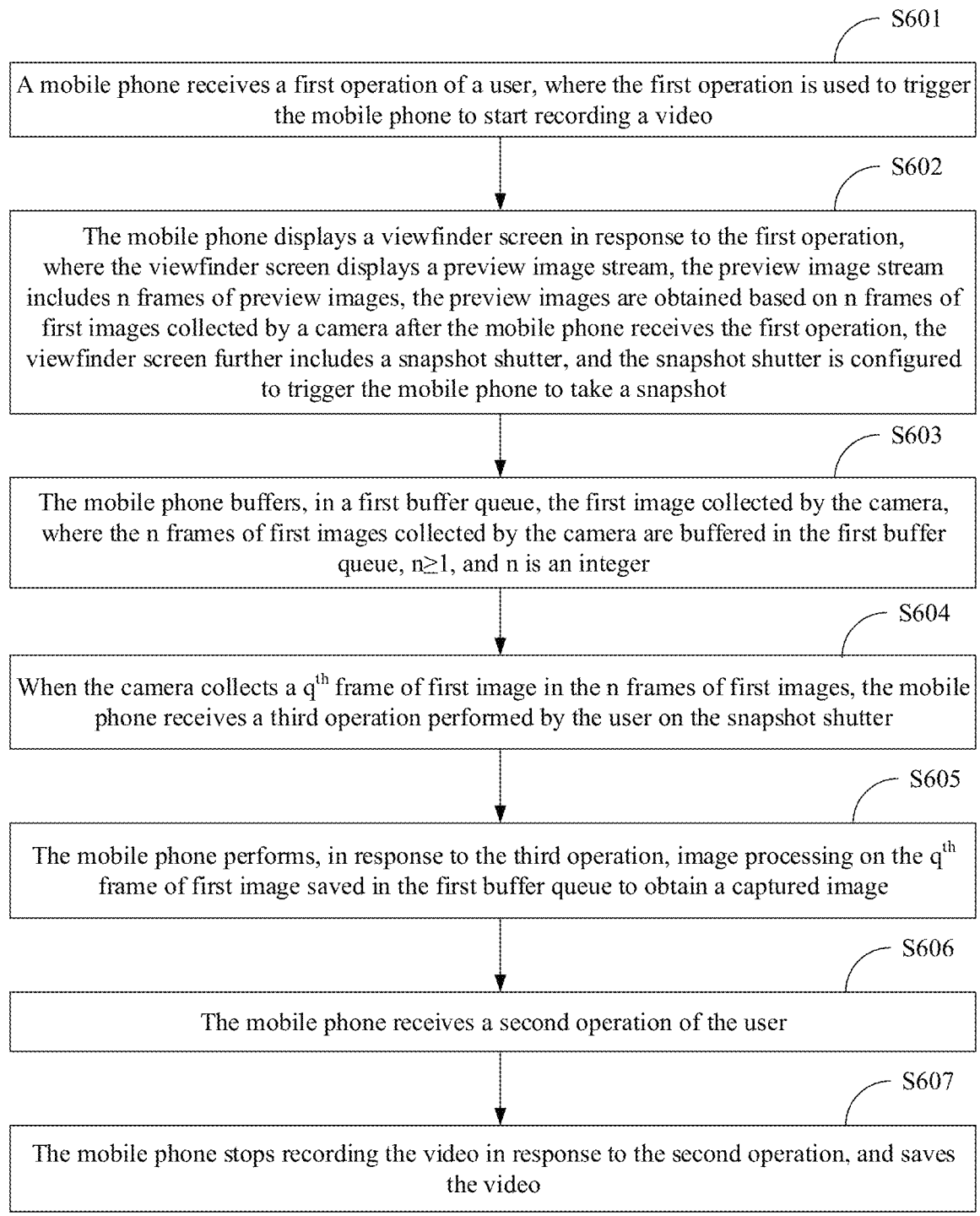
FIG. 6A is a flowchart of a method for capturing an image during video recording according to an embodiment of this application.

An embodiment of this application provides a method for capturing an image during video recording. The method may be applied to a mobile phone, and the mobile phone includes a camera. As shown in FIG. 6A, the method may include S601 to S607.

S601: The mobile phone receives a first operation of a user, where the first operation is used to trigger the mobile phone to start recording a video.

Figure 7A:
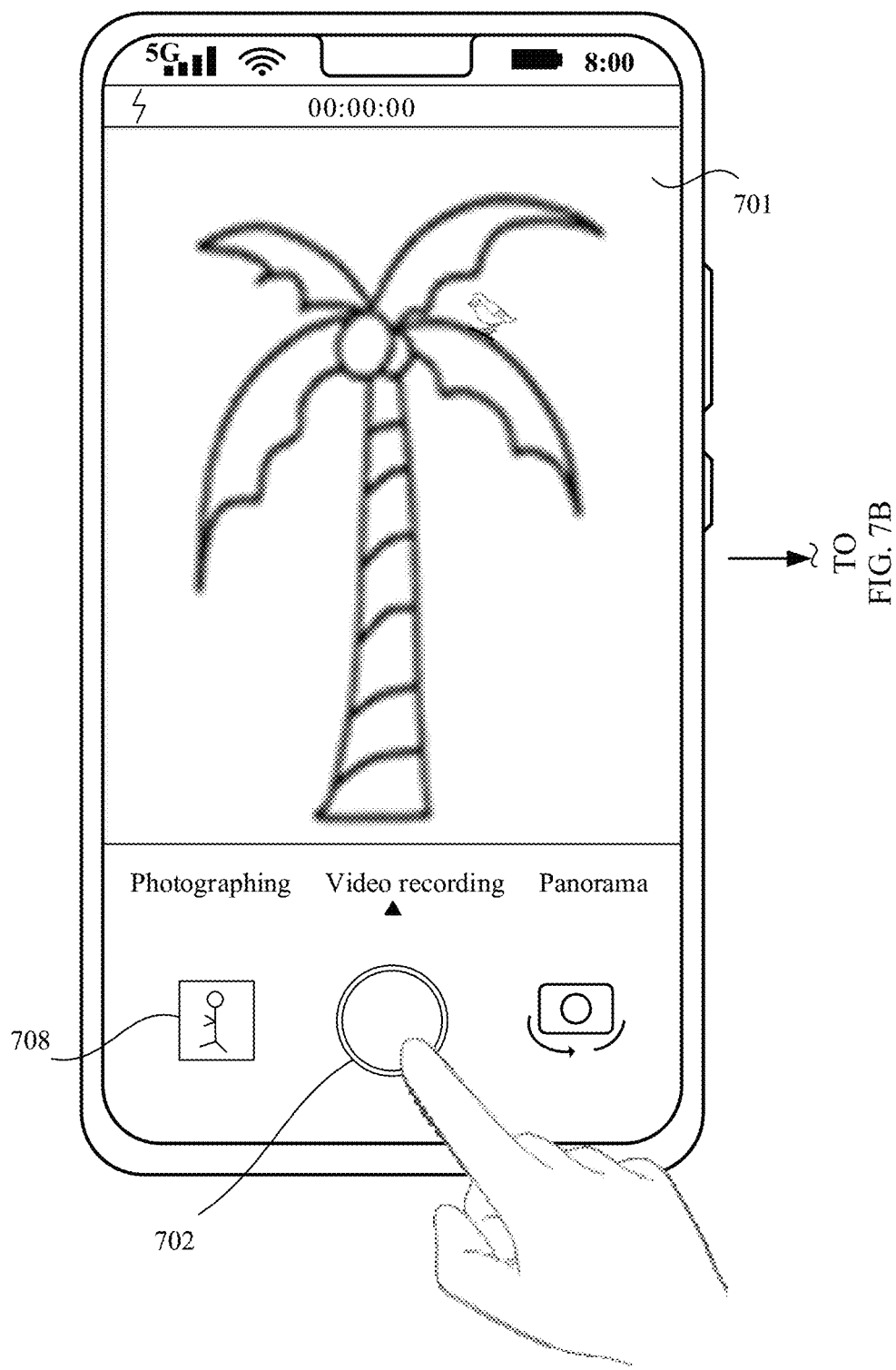
FIG. 7A-FIG. 7B are a schematic diagram of a display interface of a mobile phone during video recording according to an embodiment of this application.
Figure 7B:
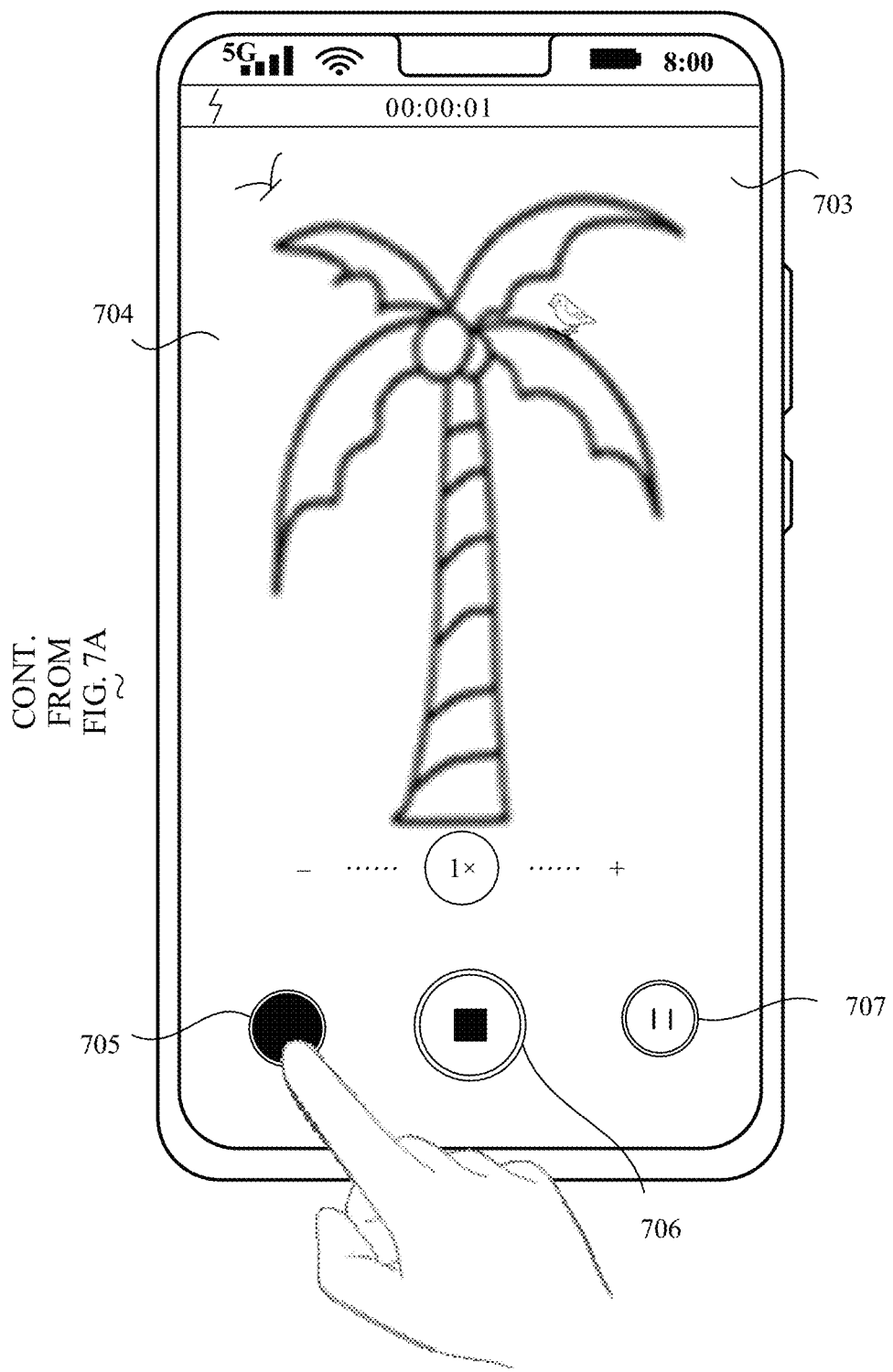

For example, the mobile phone may display a video viewfinder screen 701 shown in FIG. 7A-FIG. 7B. The video view finder screen 701 is a viewfinder screen before the mobile phone starts recording. The video viewfinder screen 701 includes a "start recording" button 702. The first operation may be a tap operation performed by the user on the "start recording" button 702 to trigger the mobile phone to start recording the video.

S602: The mobile phone displays the viewfinder screen in response to the first operation, where the view finder screen displays a preview image stream, the preview image stream includes n frames of preview images, the preview images are obtained based on n frames of first images collected by the camera after the mobile phone receives the first operation, the viewfinder screen further includes a snapshot shutter, and the snapshot shutter is configured to trigger the mobile phone to take a snapshot.

For example, that the first operation is a tap operation performed by the user on the "start recording" button 702 is used as an example. The mobile phone responds to the tap operation performed by the user on the "start recording" button 702, so that a display of the mobile phone may display a viewfinder screen 703 shown in FIG. 7A-FIG. 7B. The viewfinder screen 703 is a viewfinder screen on which the mobile phone is recording the video. The viewfinder screen 703 may display a preview image stream. The preview image stream includes a plurality of frames of preview images that are finally presented on the display to the user in a video recording process of the mobile phone. As shown in FIG. 7A-FIG. 7B, the viewfinder screen 703 includes a preview image 704 obtained based on the first image. The preview image 704 is one frame of preview image in a preview image stream shown in FIG. 8. The preview image 704 is obtained based on the first image collected by the camera after the mobile phone receives the first operation.

Figure 8:
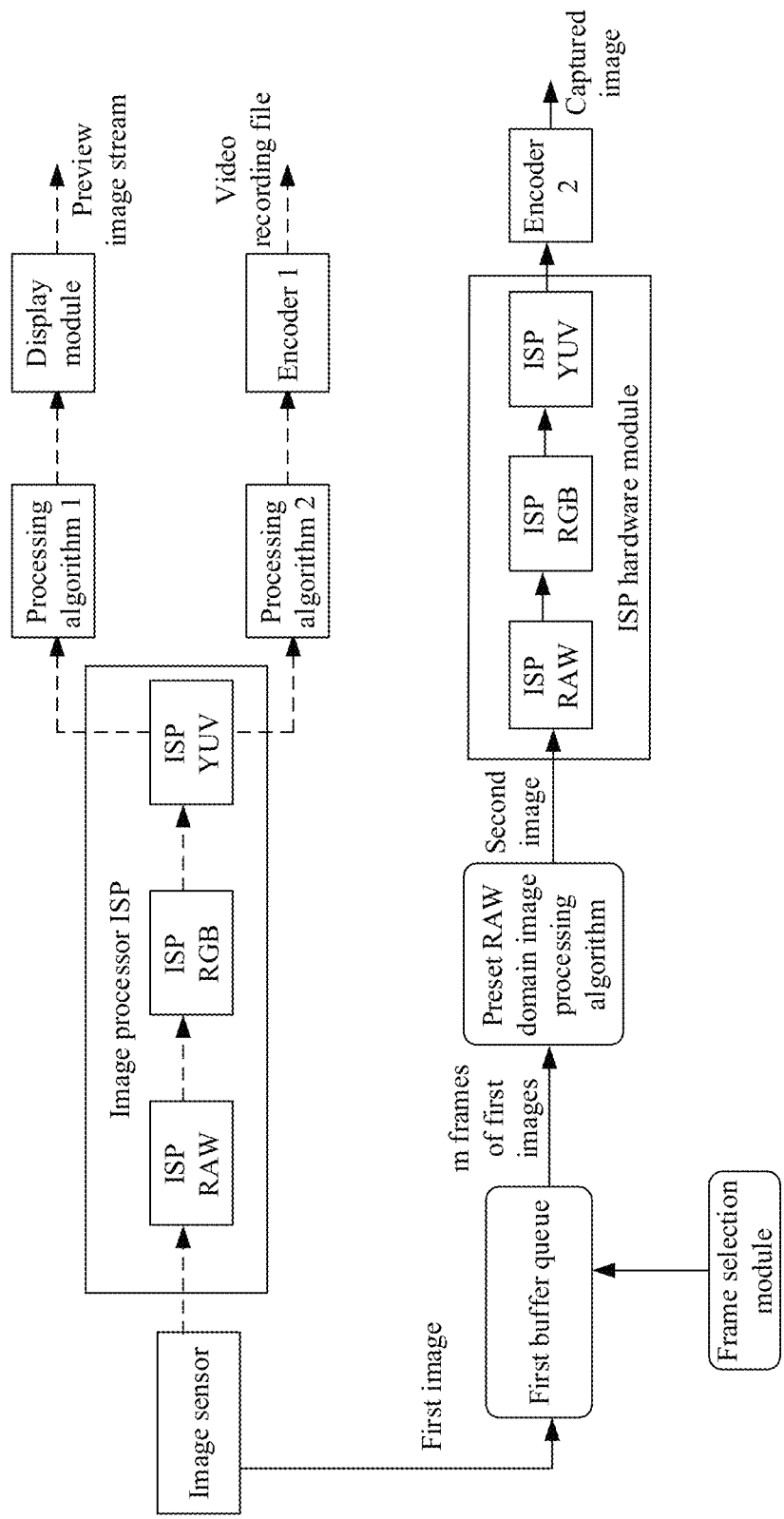
FIG. 8 is a functional block diagram of another method for capturing an image during video recording according to an embodiment of this application.

This embodiment of this application describes a method for obtaining the preview image 704 based on the first image by the mobile phone. Before the mobile phone displays the viewfinder screen, the mobile phone may process the first image to obtain the preview image 704 in a manner of processing the preview image in the preview image stream shown in FIG. 1B. FIG. 4A. FIG. 4B, or FIG. 8. It should be noted that an ISP of the mobile phone may perform image processing in the RAW domain, image processing in an RGB domain, and image processing in a YUV domain on each frame of first image collected by the camera. For the method for obtaining the preview image 704 based on the first image by the mobile phone, refer to a processing method of the "preview image stream" shown in FIG. 4B or FIG. 8.

As shown in FIG. 4B or FIG. 8, an image sensor (Sensor) of the mobile phone is controlled by exposure, so that Bayer images can be continuously output. The ISP of the mobile phone performs the image processing in the RAW domain on each frame of Bayer image to obtain an RGB image, and the ISP performs the image processing in the RGB domain on the RGB image to obtain a YUV image. The YUV image is processed by using a processing algorithm 1, then the ISP performs the image processing in the YUV domain on an obtained YUV image, and then an obtained YUV image is sent to an encoder 1 (ENCODER) for encoding. In this way, the preview image 704 can be obtained. The plurality of frames of preview images 704 processed may form a segment of preview video stream (that is, the preview image stream).

In a processing procedure of the preview image stream, for detailed descriptions of the image processing in the RAW domain, the image processing in the RGB domain, and the image processing in the YUV domain, reference may be made to related descriptions in the foregoing embodiments. Details are not described herein again. For a manner of processing the video recording file in FIG. 4B or FIG. 8, refer to the descriptions of the manner of processing the video recording file in the foregoing embodiments. Details are not described herein again.

It should be emphasized that, as shown in FIG. 7A-FIG. 7B, the viewfinder screen 703 further includes a snapshot shutter 702. The snapshot shutter 702 is configured to trigger the mobile phone to take a snapshot. "The mobile phone takes a snapshot" described in this embodiment of this application means that the mobile phone captures, in the video recording process, a frame of image in the video to obtain a photo. Specifically, the snapshot shutter 702 is configured to trigger the mobile phone to capture, in the video recording process, the image to obtain the photo. It can be figured out that, in a process of recording a video (namely, video recording), the mobile phone may collect some wonderful images. In the video recording process of the mobile phone, the user may expect the mobile phone to capture the wonderful images and save the wonderful images as photos for displaying to the user. In this embodiment of this application, the user taps the snapshot shutter 702 to implement a function of capturing the wonderful images in the video recording process.

To ensure that the mobile phone can capture, in response to a capture operation of the user (for example, the tap operation performed by the user on the snapshot shutter 702), an image that the user actually needs, the mobile phone may buffer the Bayer image exposed and output by the sensor in a first buffer queue (Buffer). In this case, even if there is delay duration shown in FIG. 3 from receiving the capture operation of the user to receiving a capture instruction by a snapshot program, when the capture operation of the user is received, the Bayer image output by the sensor can be further buffered in the first buffer queue. In this way, the mobile phone can obtain the frame of image from the first buffer queue. Specifically, the mobile phone can store the n frames of first images in the first buffer queue (Buffer) of an electronic device. In response to the first operation, the mobile phone may further perform S603.

S603: The mobile phone buffers, in the first buffer queue, the first image collected by the camera, where the n frames of first images collected by the camera are buffered in the first buffer queue, n≥1, and n is an integer.

Figure 9:
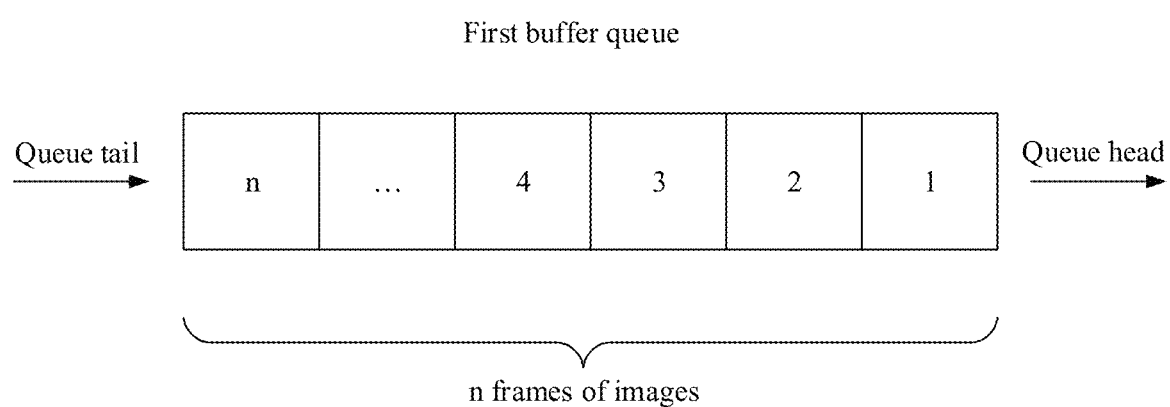
FIG. 9 is a schematic diagram of a first buffer queue Buffer according to an embodiment of this application.

For example, in response to the first operation, the mobile phone may buffer, in the first buffer queue (Buffer) shown in FIG. 4A or FIG. 4B, the first image collected by the camera. For example, the n frames of first images collected by the camera may be buffered in the first buffer queue according to a first in first out rule. As shown in FIG. 9, an enqueuing operation that is used to insert the first image may be performed at a queue tail of the first buffer queue, and a dequeuing operation that is used to delete the first image may be performed at a queue head of the first buffer queue. When the n frames of first images are buffered in the first buffer queue, each time a frame of first image is inserted at the queue tail of the first buffer queue, a frame of first image is deleted at the queue head of the first buffer queue.

S604: When the camera collects a $q^{th}$ frame of first image in the n frames of first images, the mobile phone receives a third operation performed by the user on the snapshot shutter.

For example, the third operation may be a tap operation performed by the user on the snapshot shutter. For example, the third operation may be a tap operation performed by the user on the snapshot shutter shown in FIG. 7A-FIG. 7B. Alternatively, the third operation may be a continuous-tap operation performed by the user on the snapshot shutter. Each tap operation on the snapshot shutter is used to trigger the mobile phone to perform S605 once. That is, the tap operation on the snapshot shutter is used to trigger the mobile phone to capture one photo. The continuous-tap operation on the snapshot shutter is used to trigger the mobile phone to capture a plurality of photos. A method for capturing the plurality of photos by the mobile phone in the video recording process is similar to the method for capturing one photo. Details are not described herein again.

It may be learned from the description of S604 that the $q^{th}$ frame of first image is one frame of first image collected by the camera when the mobile phone receives the third operation. In this way, in the n frames of first images buffered in the first buffer queue, a time at which the image sensor of the camera outputs the $q^{th}$ frame of first image is closest to a time at which the mobile phone receives the third operation, q≤n, and q is a positive integer.

In some other embodiments, the $q^{th}$ frame of first image may alternatively be an image with highest clarity in the n frames of first images. Certainly, reference may also be made to the foregoing two frame selection bases, and different weights are used and weighted to serve as a basis for selecting the $q^{th}$ frame of first image. In the following embodiments, an example in which the time at which the image sensor of the camera outputs the $q^{th}$ frame of first image is closest to the time at which the mobile phone receives the third operation is used to describe the method in the embodiments of this application.

In this embodiment of this application, as shown in FIG. 5B, a camera HAL at an HAL of the mobile phone may include a frame selection module. After receiving a capture instruction from a camera service, the camera HAL may select the $q^{th}$ frame of first image (namely, a captured frame, also referred to as a reference frame) from the n frames of first images buffered in the first buffer queue Buffer.

In some embodiments, each frame of first image corresponds to one piece of time information, and the time information records a time at which the image sensor sensor outputs a corresponding first image. The time information may also be referred to as a timestamp.

The mobile phone may record the time at which the mobile phone receives the third operation (namely, an occurrence time of the first operation). In a possible implementation, a hardware clock (for example, a hardware clock configured to record an occurrence time of a touch event on a touchscreen) of the mobile phone may record the time at which the mobile phone receives the third operation (namely, the capture operation). In this way, if the clock of the mobile phone that records an occurrence time of the third operation is synchronized with a clock of the sensor that records output of the first image, the mobile phone (for example, the frame selection module) may select a first image that is in the first buffer queue Buffer and that has a timestamp closest to the time at which the mobile phone receives the third operation as the $q^{th}$ frame of first image (namely, the captured frame, which is also referred to as the reference frame).

It should be noted that, in some embodiments, the clock of the mobile phone that records the occurrence time of the third operation is synchronized with the clock of the sensor that records output of the first image. In some other embodiments, the clock of the mobile phone that records the occurrence time of the third operation is synchronized with the clock of the sensor that records output of the first image are a same system clock.

In this embodiment of this application, the mobile phone may buffer the Bayer image exposed and output by the sensor in the first buffer queue Buffer. A plurality of frames of Bayer images may be buffered in the first buffer queue. In this case, even if there is delay duration shown in FIG. 3 from receiving the capture operation of the user to receiving the capture instruction by a snapshot program, when the mobile phone receives the capture operation of the user, the Bayer image output by the sensor can be further buffered in the first buffer queue. The frame selection module of the mobile phone may select the captured frame from the Buffer (namely, an image collected by the camera when the user inputs the capture operation). In this way, the mobile phone can obtain, from the first buffer queue, the image collected by the camera when the user inputs the capture operation.

It should be noted that, on some platforms, an exposure end time of the sensor may be used as the timestamp, and on some other platforms, an exposure start time of the sensor may be used as the timestamp. This is not limited in this embodiment of this application.

S605: The mobile phone performs, in response to the third operation, image processing on the $q^{th}$ frame of first image saved in the first buffer queue to obtain a captured image.

In some embodiments, n may be equal to 1. In this case, one frame of first image may be buffered in the first buffer queue. In this case, the mobile phone may perform the image processing on only one frame of first image by performing S605.

In some other embodiments, n may be greater than 1. In this case, a plurality of frames of first images may be buffered in the first buffer queue. In this case, S605 may include: The mobile phone performs the image processing on m frames of first images saved in the first buffer queue to obtain the captured image. The m frames of first images include the $q^{th}$ frame of first image, m≥1, and m is an integer.

In this embodiment, the mobile phone may perform the image processing on one or more frames of first images. When m≥2, the mobile phone may perform the image processing on the plurality of frames of first images. Images in the m frames of first images other than the $q^{th}$ frame of first image may play a role of image quality enhancement on the captured frame (namely, the $q^{th}$ frame of first image, which is also referred to as the reference frame). This makes it easy to obtain information such as noise and a texture, to further improve the image quality of the captured image.

n may be a preset positive integer. Assuming that the sensor can expose a frames of Bayer images per second, and the delay duration shown in FIG. 3 is b seconds, the sensor can expose b/(1/a)–a×b frames of Bayer images within the delay duration b seconds, n may be an integer greater than or equal to a×b.

For example, the image processing described in S605 may include the image processing in the RAW domain and ISP image processing. The image processing in the RAW domain is image processing performed in RAW color space. The ISP image processing is image processing performed by using the ISP of the mobile phone. After the image processing, image quality of the captured image is better than image quality of the $q^{th}$ frame of first image. Alternatively, the image processing may include the image processing in the RAW domain, the ISP image processing, and encoding processing. That is, the encoding processing may be integrated into the ISP image processing, or may be independent of the ISP image processing. In this embodiment of this application, an example in which the encoding processing is independent of the ISP image processing is used to describe the method in this embodiment of this application. The encoding processing specifically refers to encoding an image by using an encoder.

The image processing in the RAW domain may be implemented by using a preset RAW domain image processing algorithm. The ISP image processing may be implemented by using the ISP of the mobile phone.

Figure 6B:
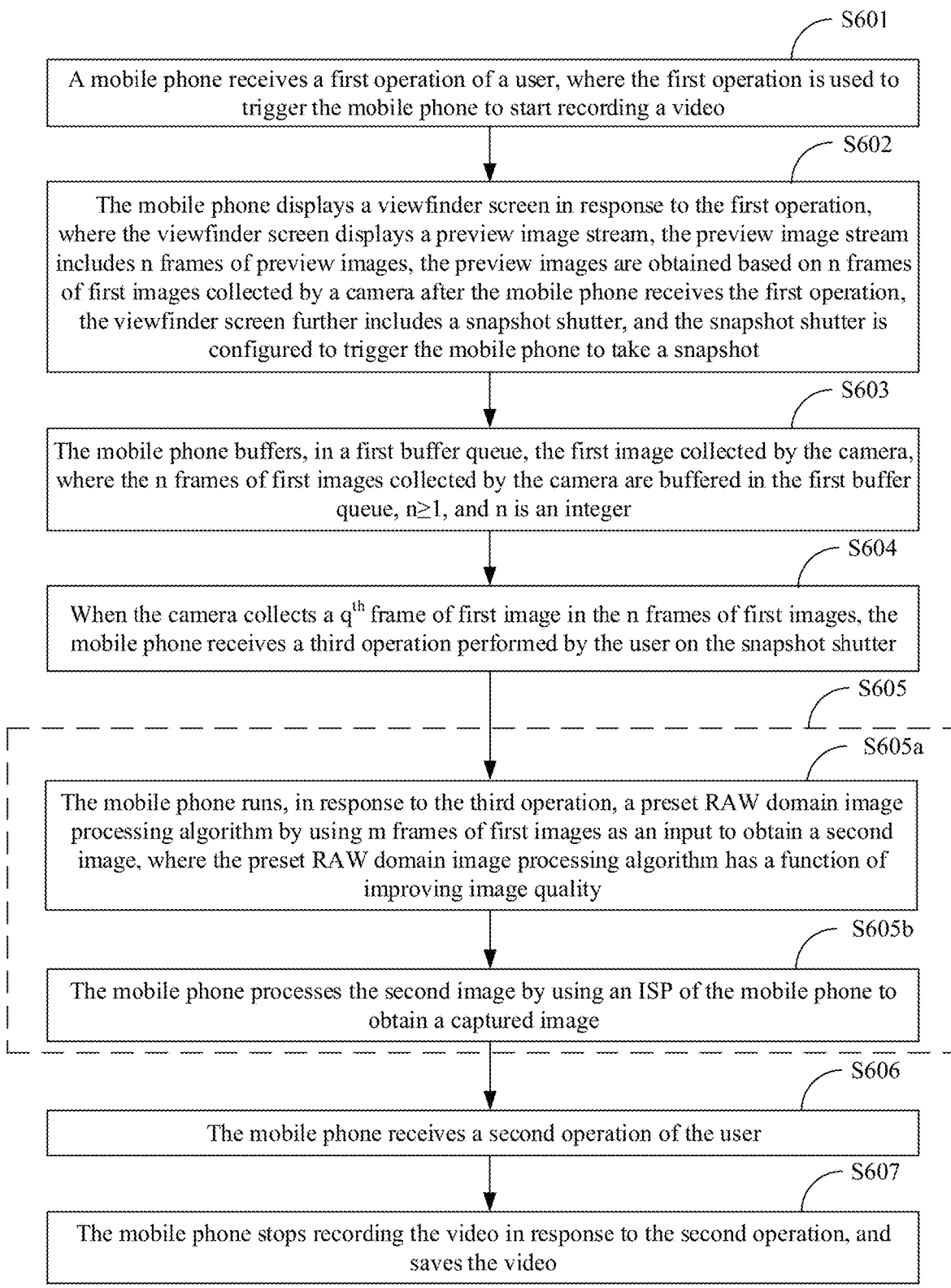
FIG. 6B is a flowchart of another method for capturing an image during video recording according to an embodiment of this application.

In some embodiments, the method for obtaining, by the mobile phone in response to the third operation by, the captured image by performing the image processing on the $q^{th}$ frame of first image by using the preset RAW domain image processing algorithm and the ISP may include S605a and S605b. As shown in FIG. 6B. S605 may include S605a and S605b.

S605a: The mobile phone runs, in response to the third operation, the preset RAW domain image processing algorithm by using the m frames of first images as an input to obtain a second image, where the preset RAW domain image processing algorithm has a function of improving image quality.

The preset RAW domain image processing algorithm has the function of improving the image quality: The preset RAW domain image processing algorithm integrates at least one of image processing functions in the RAW domain, an RGB domain, or a YUV domain, to improve the image quality before the ISP performs the image processing.

In some embodiments, m may be equal to 1. That is, the m frames of first images are the $q^{th}$ frame of first image. In this case, the mobile phone can obtain the second image with high image quality by running the preset RAW domain image processing algorithm by using the $q^{th}$ frame of first image as the input. In this case, the preset RAW domain image processing algorithm is a single-frame input single-frame output image processing algorithm. However, because parameters such as data integrity and a texture of one frame of image are limited, that the frame of image is used as the input to run the preset RAW domain image processing algorithm cannot effectively improve image quality of this frame of image.

Based on this, in some other embodiments, m may be greater than 1. Specifically, the mobile phone may run the preset RAW domain image processing algorithm by using the $q^{th}$ frame of first image and at least one frame of image adjacent to the $q^{th}$ frame of first image as an input. That is, the m frames of first images that are in the n frames of first images and that include the $q^{th}$ frame of first image may be used as the input to run the preset RAW domain image processing algorithm. The preset RAW domain image processing algorithm is a multi-frame input single-frame output image processing algorithm. It should be understood that images in the m frames of first images other than the $q^{th}$ frame of first image may play a role of image quality enhancement on the captured frame (namely, the $q^{th}$ frame of first image, which is also referred to as the reference frame). This makes it easy to obtain information such as noise and a texture, to further improve image quality of the second image.

In some embodiments, the m frames of first images are adjacent m frames of images in the first buffer queue. In some other embodiments, the m frames of first images may alternatively be m frames of images that are in the n frames of first images buffered in the first buffer queue and that are not adjacent to each other but include the $q^{th}$ frame of first image.

That is, the preset RAW domain image processing algorithm described in this embodiment of this application may be a multi-frame input single-frame output neural network model. The preset RAW domain image processing algorithm is a deep learning network for image quality enhancement in the RAW domain. In this solution, algorithm processing of the preset RAW domain image processing algorithm is added. Compared with the image processing in the RAW domain, the image processing in the RGB domain, and the image processing in the YUV domain in which only the ISP hardware is used, a combination of the preset RAW domain image processing algorithm and the ISP has a better effect, which improves image quality of the captured image.

S605b: The mobile phone processes the second image by using the ISP of the mobile phone, and encodes a processed image to obtain the captured image.

It should be noted that, in this embodiment of this application, the mobile phone may process the first image and the second image by using the ISP in a time division multiplexing manner. That is, that the mobile phone processes the second image by using the ISP does not affect that the mobile phone processes the first image by using the ISP. In other words, that the mobile phone obtains the captured image shown in FIG. 4A based on the ISP processing does not affect that the mobile phone processes and obtains the preview image stream and the video recording file shown in FIG. 4A or FIG. 4B. An image processing procedure for obtaining the preview image based on the first image further includes a processing procedure of a processing algorithm 1. In some embodiments, the processing algorithm 1 may be included in an ISP hardware module.

In some other embodiments, the processing algorithm 1 may be included in another processor (for example, any one of a CPU, GPU, or an NPU) of the mobile phone. In this embodiment, the ISP hardware module may invoke the processing algorithm 1 in the another processor to process the first image to obtain the preview image.

For example, the mobile phone may generate and save the captured image in response to a tap operation (that is, a second operation) performed by the user on the snapshot shutter shown in FIG. 7A-FIG. 7B. However, in the video recording process of the mobile phone, the user cannot view the captured image. After video recording stops, the user can view the captured image in an album. Specifically, after S605, the method in this embodiment of this application further includes S606 and S607

S606: The mobile phone receives the second operation of the user.

S607: The mobile phone stops recording the video in response to the second operation, and saves the video.

Figure 10A:
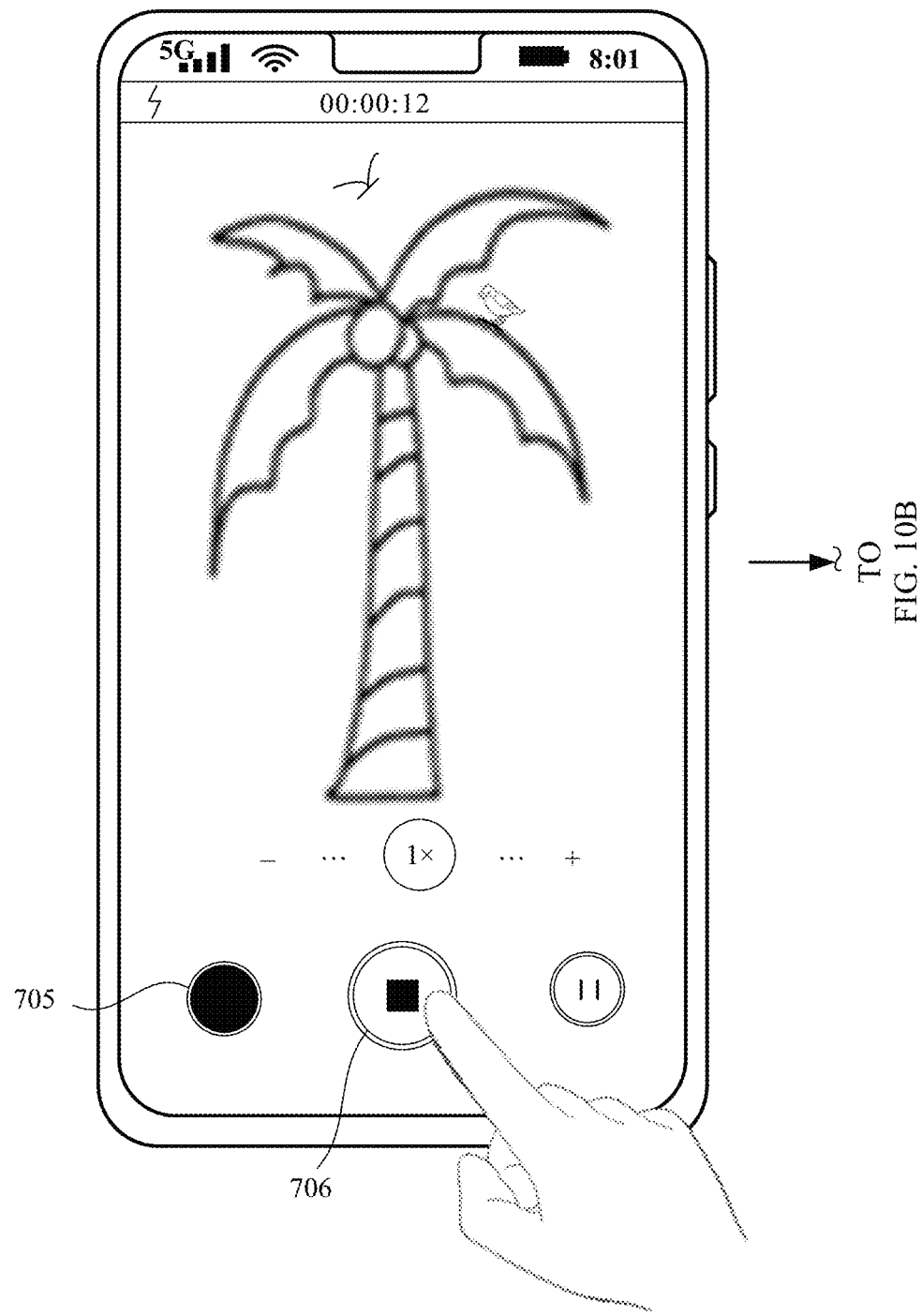
FIG. 10A-FIG. 10B are a schematic diagram of another display interface of a mobile phone during video recording according to an embodiment of this application.
Figure 10B:
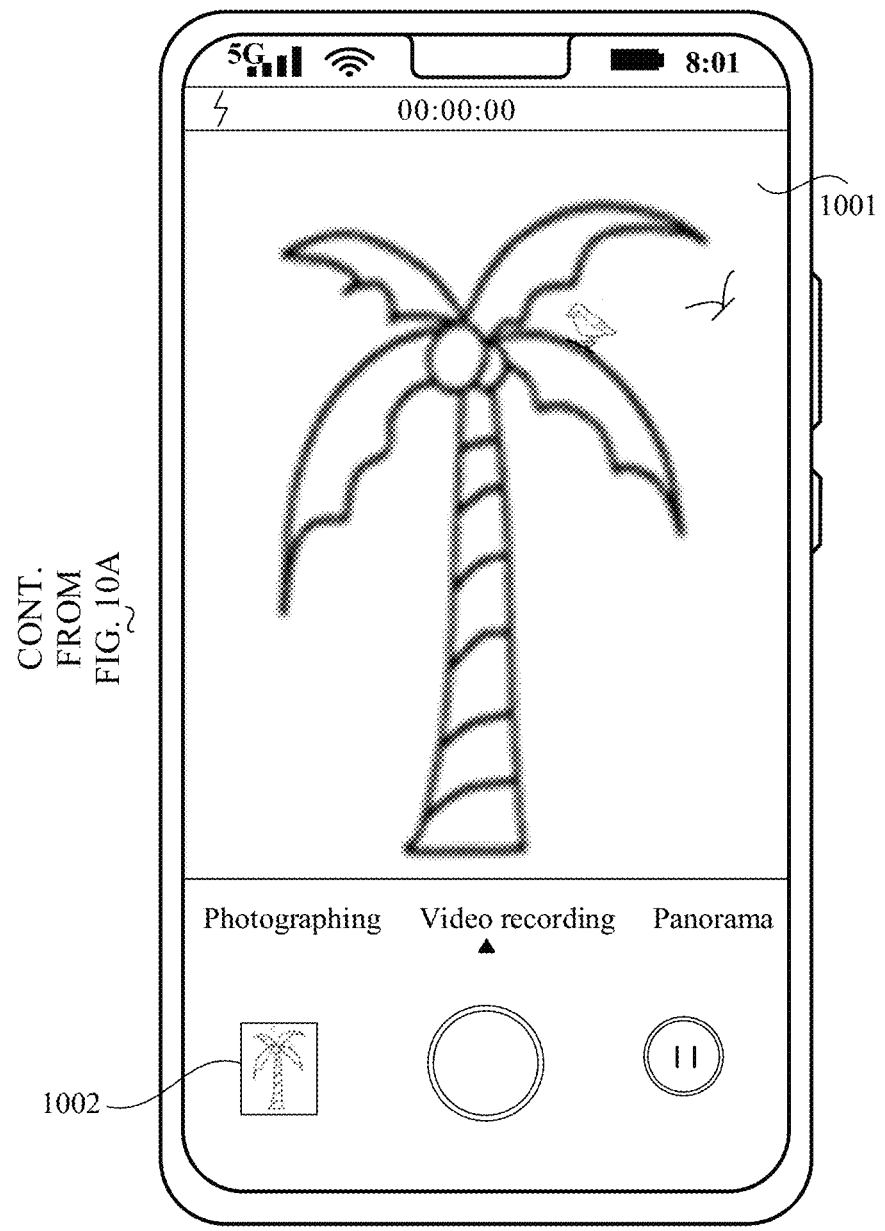
Figure 11:
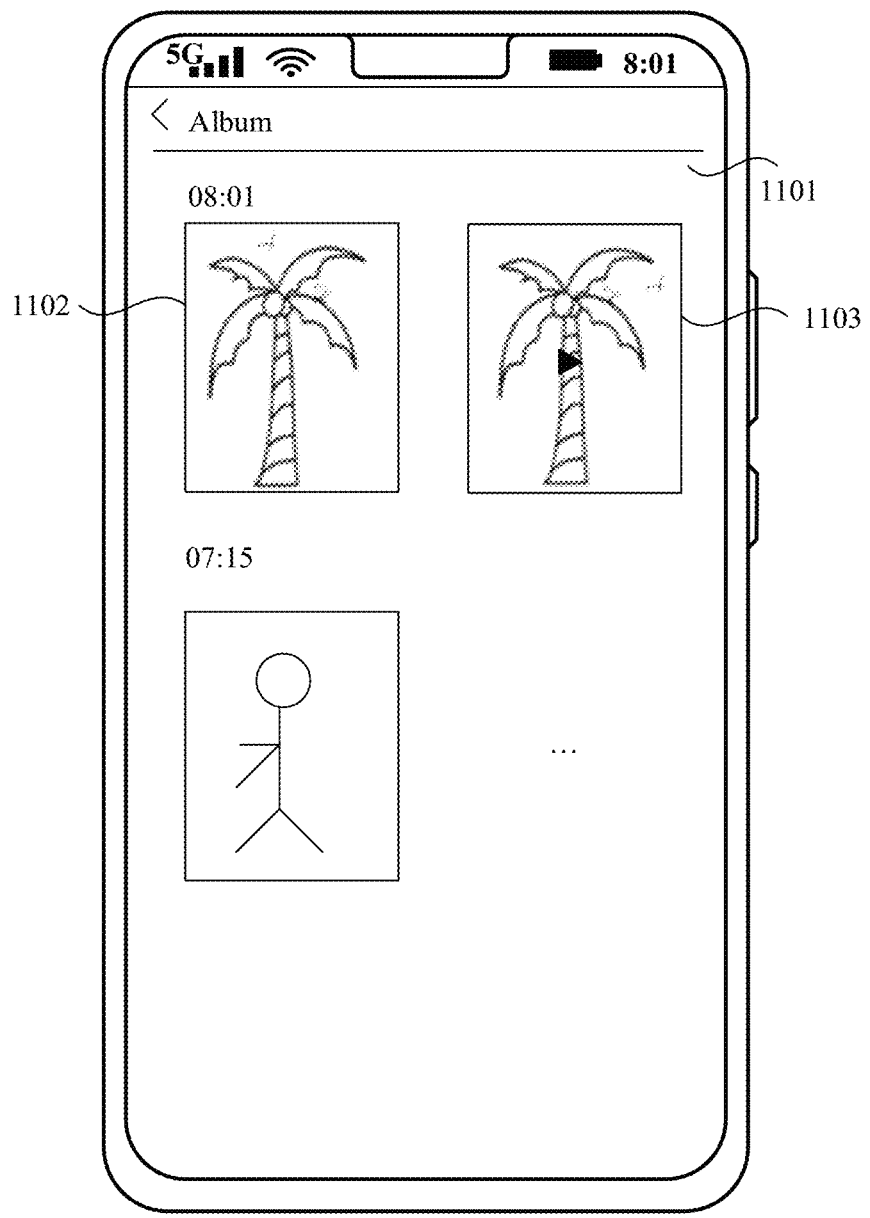
FIG. 11 is a schematic diagram of another display interface of a mobile phone during video recording according to an embodiment of this application.

For example, the mobile phone may receive a tap operation (that is, the second operation) performed by the user on a "stop recording" button 706 shown in FIG. 10A-FIG. 10B. In response to the tap operation performed by the user on the "stop recording" button 706 shown in FIG. 10A-FIG. 10B, video recording may be stopped, and a video viewfinder screen 1001 shown in FIG. 10A-FIG. 10B is displayed. The video viewfinder screen 1001 is a viewfinder screen before the mobile phone starts recording. In comparison with the video viewfinder screen 701 shown in FIG. 7A-FIG. 7B, a photo in a photo option on the viewfinder screen of the mobile phone is updated from 708 shown in FIG. 7A-FIG. 7B to 1002 shown in FIG. 10A-FIG. 10B. The mobile phone may display an album list screen 1101 shown in FIG. 11 in response to a start operation performed by the user on an album application. The album list screen 1101 includes a plurality of photos and videos stored in the mobile phone. For example, as shown in FIG. 7A-FIG. 7B, the album list screen 1101 includes a video 1103 recorded by the mobile phone and a photo 1102 captured by the mobile phone in a process of recording the video 1103. That is, after the mobile phone records the video, a recorded video (for example, the video 1103) is saved.

In this embodiment of this application, the mobile phone may buffer the Bayer image exposed and output by the sensor in the first buffer queue Buffer. A plurality of frames of Bayer images may be buffered in the first buffer queue. In this case, even if there is delay duration from receiving the capture operation of the user to receiving the capture instruction by the snapshot program, when the capture operation of the user is received, the Bayer image output by the sensor can be further buffered in the first buffer queue. The frame selection module of the mobile phone may select the captured frame from the first buffer queue (namely, the image collected by the camera when the user inputs the capture operation). In this way: the mobile phone can obtain, from the first buffer queue, the image collected by the camera when the user inputs the capture operation.

In addition, the mobile phone can further process, by using the preset RAW domain image processing algorithm and the ISP hardware module, the captured frame selected by the frame selection module. Finally, an encoder 2 encodes a processing result to obtain the captured image. The preset RAW domain image processing algorithm is a deep learning network for image quality enhancement in the RAW domain. In this solution, algorithm processing of the preset RAW domain image processing algorithm is added. Compared with the image processing in the RAW domain, the image processing in the RGB domain, and the image processing in the YUV domain in which only the ISP hardware is used, the combination of the preset RAW domain image processing algorithm and the ISP has a better processing effect, which improves the image quality of the captured image.

In conclusion, according to the method in this embodiment of this application, an image that meets a user requirement can be captured in the video recording process, and the image quality of the captured image can be improved.

Figure 12:
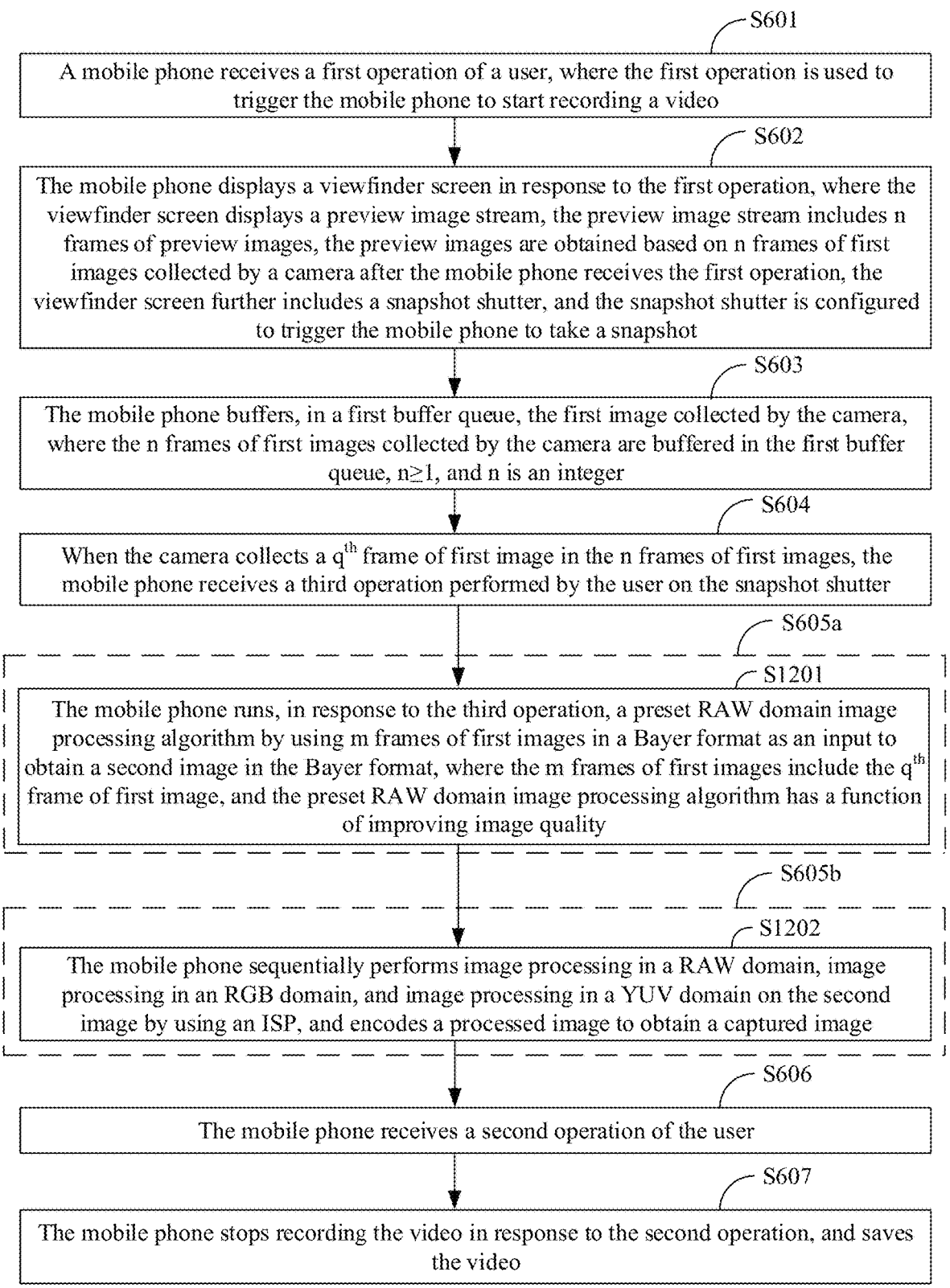
FIG. 12 is a method flowchart corresponding to the functional block diagram shown in FIG. 8.

In some embodiments, as shown in FIG. 8, formats of both an input image and an output image of the preset RAW domain image processing algorithm are Bayer. In this embodiment, the preset RAW domain image processing algorithm integrates at least some of the image processing functions in at least one of the RAW domain, the RGB domain, or the YUV domain, to improve the image quality before the ISP performs the image processing. As shown in FIG. 8, in this embodiment, the ISP may sequentially perform the image processing in the RAW domain, the image processing in the RGB domain, and the image processing in the YUV domain on the Bayer image output by the preset RAW domain image processing algorithm. Specifically, as shown in FIG. 12. S605a may be replaced with S1201, and S605b may be replaced with S1202.

S1201: The mobile phone runs, in response to the third operation, the preset RAW domain image processing algorithm by using the m frames of first images in the Bayer format as an input to obtain a second image in the Bayer format, where the m frames of first images include the $q^{th}$ frame of first image, and the preset RAW domain image processing algorithm has a function of improving image quality.

S1202: The mobile phone sequentially performs the image processing in the RAW domain, the image processing in the RGB domain, and the image processing in the YUV domain on the second image by using the ISP, and encodes a processed image to obtain the captured image.

In this embodiment, the preset RAW domain image processing algorithm integrates some of the image processing functions in at least one of the RAW domain, the RGB domain, or the YUV domain, to improve the image quality before the ISP performs the image processing.

For example, it is assumed that the image processing functions in the RAW domain of the ISP include A. B, and C, the image processing functions in the RGB domain of the ISP include D and E, and the image processing functions in the YUV domain of the ISP include F and G. For specific image processing functions in the RAW domain, the RGB domain, and the YUV domain of the ISP, refer to related descriptions in the foregoing embodiments. Details are not described herein again.

In an implementation, the preset RAW domain image processing algorithm may integrate the image processing functions A and C in the RAW domain. In this case, when performing S1201, the mobile phone can run the preset RAW domain image processing algorithm to complete the image processing functions A and C in the RAW domain. When performing S1202, the mobile phone sequentially completes the image processing function B in the RAW domain, the image processing functions D and E in the RGB domain, and the image processing functions F and G in the YUV domain for the second image by using the ISP.

In another implementation, the preset RAW domain image processing algorithm may integrate the image processing function A in the RAW domain and the image processing function D in the RGB domain. In this case, when performing S1201, the mobile phone can run the preset RAW domain image processing algorithm to complete the image processing function A in the RAW domain and the image processing function D in the RGB domain. When performing S1202, the mobile phone sequentially completes the image processing functions B and C in the RAW domain, the image processing function E in the RGB domain, and the image processing functions F and G in the YUV domain for the second image by using the ISP.

In another implementation, the preset RAW domain image processing algorithm may integrate the image processing function A in the RAW domain and the image processing function F in the YUV domain. In this case, when performing S1201, the mobile phone can run the preset RAW domain image processing algorithm to complete the image processing function A in the RAW domain and the image processing function F in the YUV domain. When performing S1202, the mobile phone sequentially completes the image processing functions B and C in the RAW domain, the image processing functions D and E in the RGB domain, and the image processing function G in the YUV domain for the second image by using the ISP.

In another implementation, the preset RAW domain image processing algorithm may integrate the image processing function D in the RGB domain and the image processing function F in the YUV domain. In this case, when performing S1201, the mobile phone can run the preset RAW domain image processing algorithm to complete the image processing function D in the RGB domain and the image processing function F in the YUV domain. When performing S1202, the mobile phone sequentially completes the image processing functions A. B, and C in the RAW domain, the image processing function E in the RGB domain, and the image processing function G in the YUV domain for the second image by using the ISP.

Figure 13:
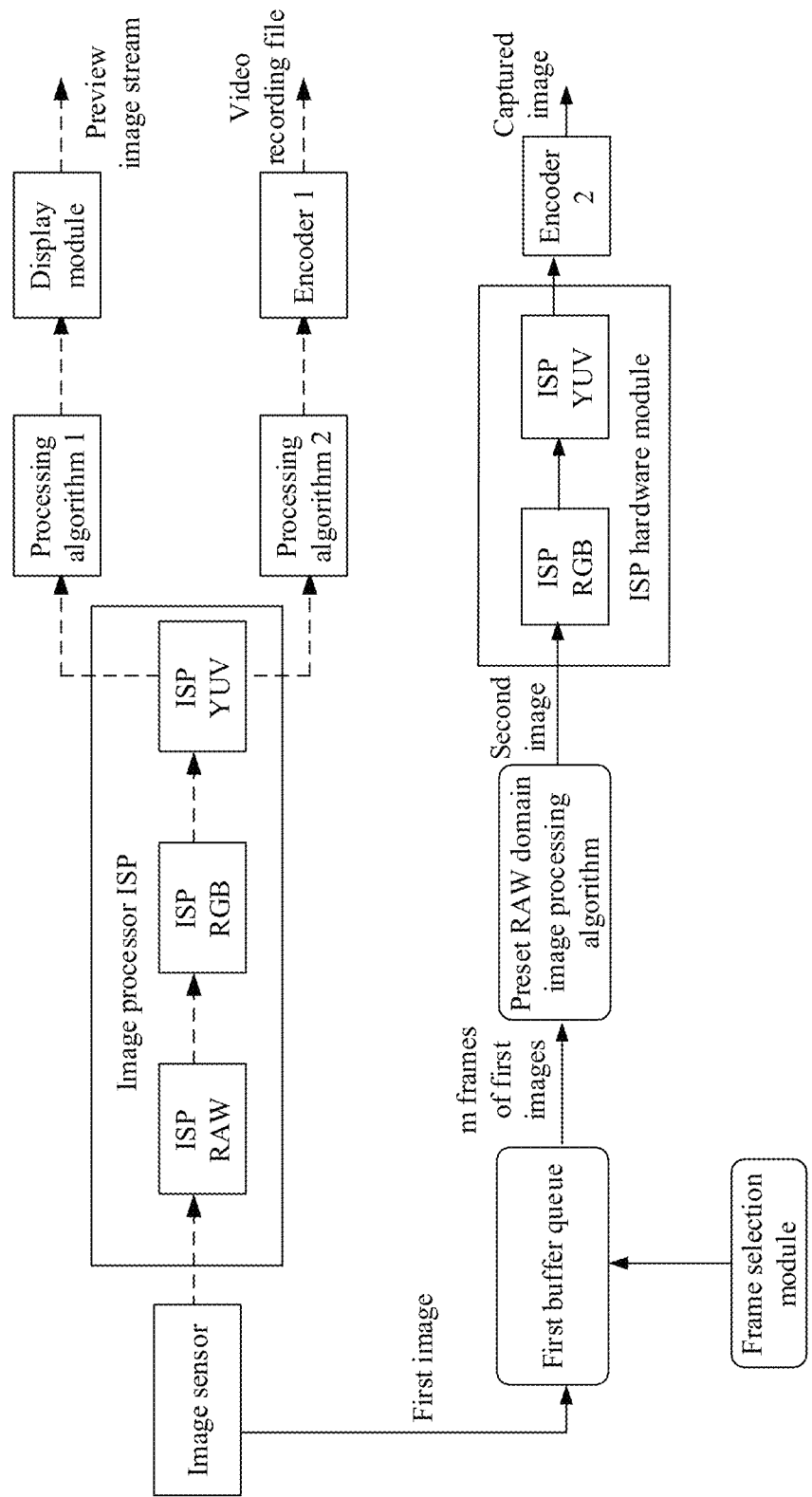
FIG. 13 is a functional block diagram of another method for capturing an image during video recording according to an embodiment of this application.
Figure 14A:
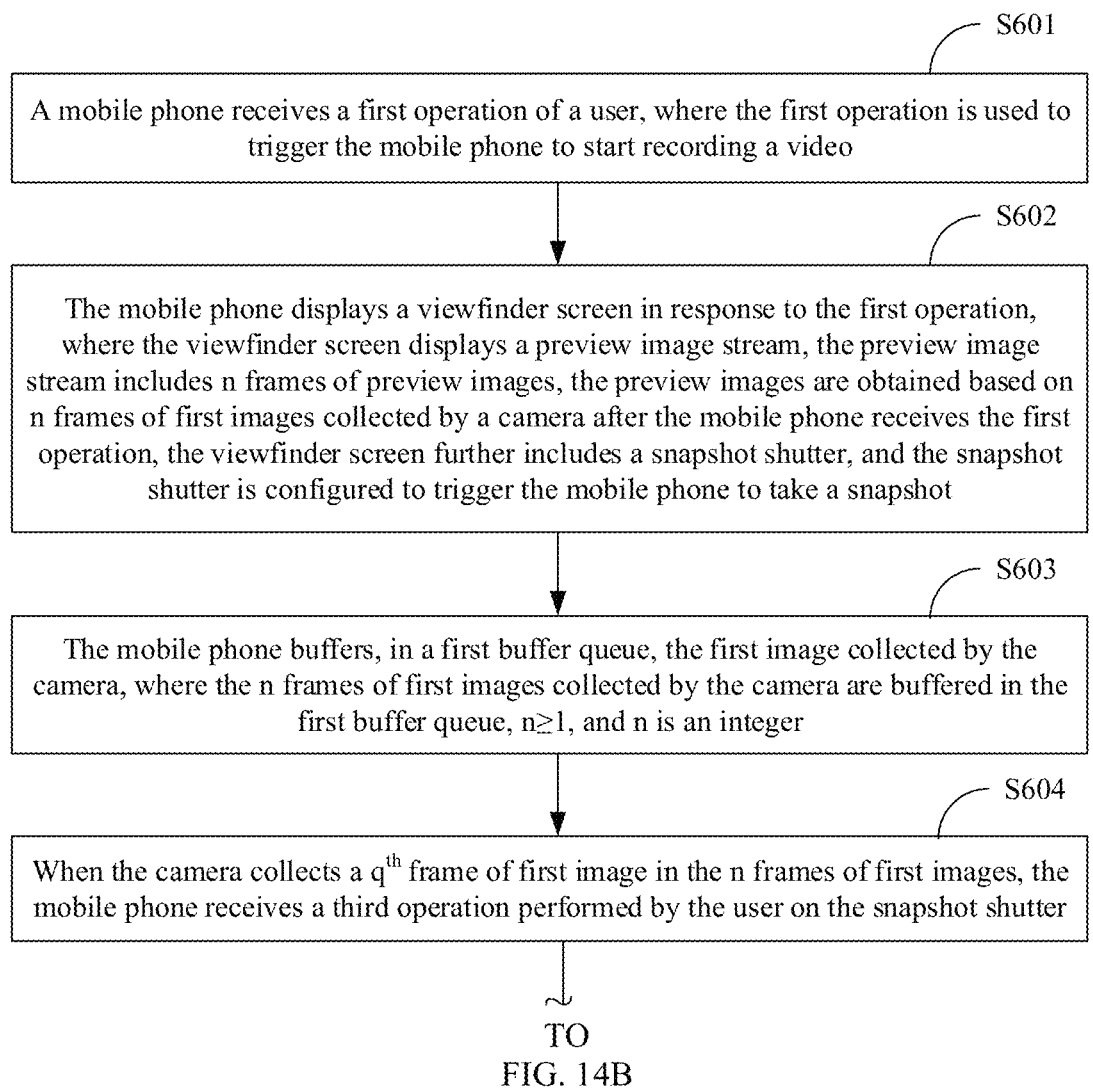
FIG. 14A-FIG. 14B are a method flowchart corresponding to the functional block diagram shown in FIG. 13.
Figure 14B:
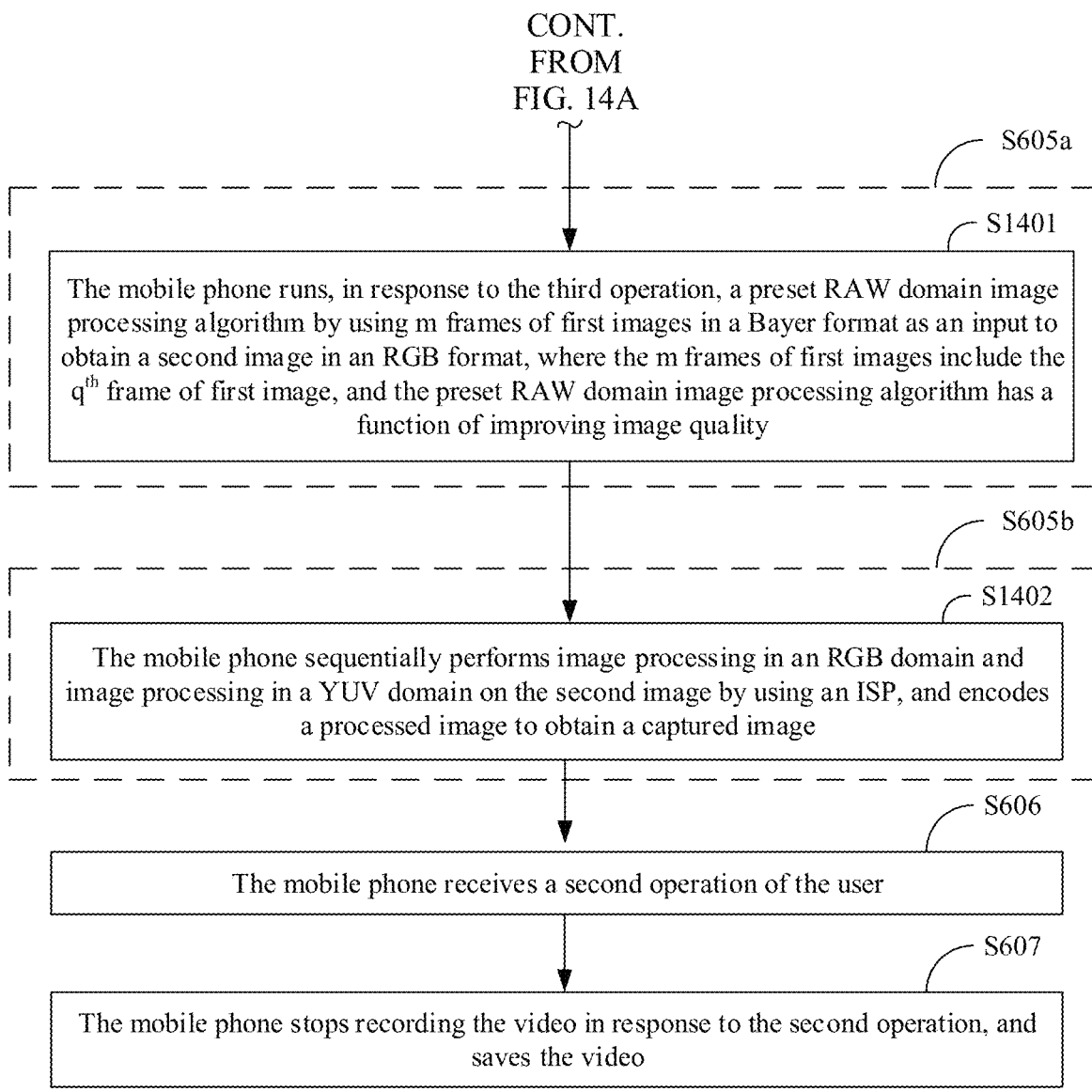

In some other embodiments, as shown in FIG. 13, a format of an input image of the preset RAW domain image processing algorithm is Bayer, and a format of an input image of the preset RAW domain image processing algorithm is RGB. In this embodiment, the preset RAW domain image processing algorithm integrates image processing functions in the RAW domain, to improve the image quality before the ISP performs the image processing in the RGB domain and the image processing in the YUV domain on the image. As shown in FIG. 13, in this embodiment, the ISP may sequentially perform the image processing in the RGB domain and the image processing in the YUV domain on the RGB image output by the preset RAW domain image processing algorithm. Specifically, as shown in FIG. 14A-FIG. 14B. S605a may be replaced with S1401, and S605b may be replaced with S1402.

S1401: The mobile phone runs, in response to the third operation, the preset RAW domain image processing algorithm by using the m frames of first images in the Bayer format as an input to obtain a second image in the RGB format, where the m frames of first images include the $q^{th}$ frame of first image, and the preset RAW domain image processing algorithm has a function of improving image quality.

S1402: The mobile phone sequentially performs the image processing in the RGB domain and the image processing in the YUV domain on the second image by using the ISP, and encodes a processed image to obtain the captured image.

In this embodiment, the preset RAW domain image processing algorithm integrates the image processing functions in the RAW domain, to improve the image quality before the ISP performs the image processing in the RGB domain and the image processing in the YUV domain on the image.

For example, it is assumed that the image processing functions in the RAW domain of the ISP include a, b, and c, the image processing functions in the RGB domain of the ISP include d and e, and the image processing functions in the YUV domain of the ISP include f and g.

That is, the preset RAW domain image processing algorithm integrates the image processing functions a, b, and c in the RAW domain. In this case, when performing S1401, the mobile phone can run the preset RAW domain image processing algorithm to complete the image processing functions a, b, and c in the RAW domain. When performing S1402, the mobile phone sequentially completes the image processing functions d and e in the RGB domain and the image processing functions f and g in the YUV domain for the second image by using the ISP. For specific image processing functions in the RAW domain, the RGB domain, and the YUV domain of the ISP, refer to related descriptions in the foregoing embodiments. Details are not described herein again.

In some other embodiments, the preset RAW domain image processing algorithm integrates not only image processing functions in the RAW domain, but also some of the image processing functions in at least one of the RGB domain or the YUV domain, to improve the image quality before the ISP performs the image processing in the RGB domain. For example, it is assumed that the image processing functions in the RAW domain of the ISP include a, b, and c, the image processing functions in the RGB domain of the ISP include d and e, and the image processing functions in the YUV domain of the ISP include f and g.

In an implementation, the preset RAW domain image processing algorithm integrates the image processing functions a, b, and c in the RAW domain and the image processing function d in the RGB domain. In this case, when performing S1401, the mobile phone can run the preset RAW domain image processing algorithm to complete the image processing functions a, b, and c in the RAW domain and the image processing function d in the RGB domain. When performing S1402, the mobile phone sequentially completes the image processing function e in the RGB domain and the image processing functions f and g in the YUV domain for the second image by using the ISP.

In another implementation, the preset RAW domain image processing algorithm integrates the image processing functions a, b, and c in the RAW domain and the image processing function f in the YUV domain. In this case, when performing S1401, the mobile phone can run the preset RAW domain image processing algorithm to complete the image processing functions a, b, and c in the RAW domain and the image processing function f in the YUV domain. When performing S1402, the mobile phone sequentially completes the image processing functions d and e in the RGB domain and the image processing function g in the YUV domain for the second image by using the ISP.

In another implementation, the preset RAW domain image processing algorithm integrates the image processing functions a, b, and c in the RAW domain, the image processing function d in the RGB domain, and the image processing function f in the YUV domain. In this case, when performing S1401, the mobile phone can run the preset RAW domain image processing algorithm to complete the image processing functions a, b, and c in the RAW domain, the image processing function d in the RGB domain, and the image processing function f in the YUV domain. When performing S1402, the mobile phone sequentially completes the image processing function e in the RGB domain and the image processing function g in the YUV domain for the second image by using the ISP.

Figure 15:
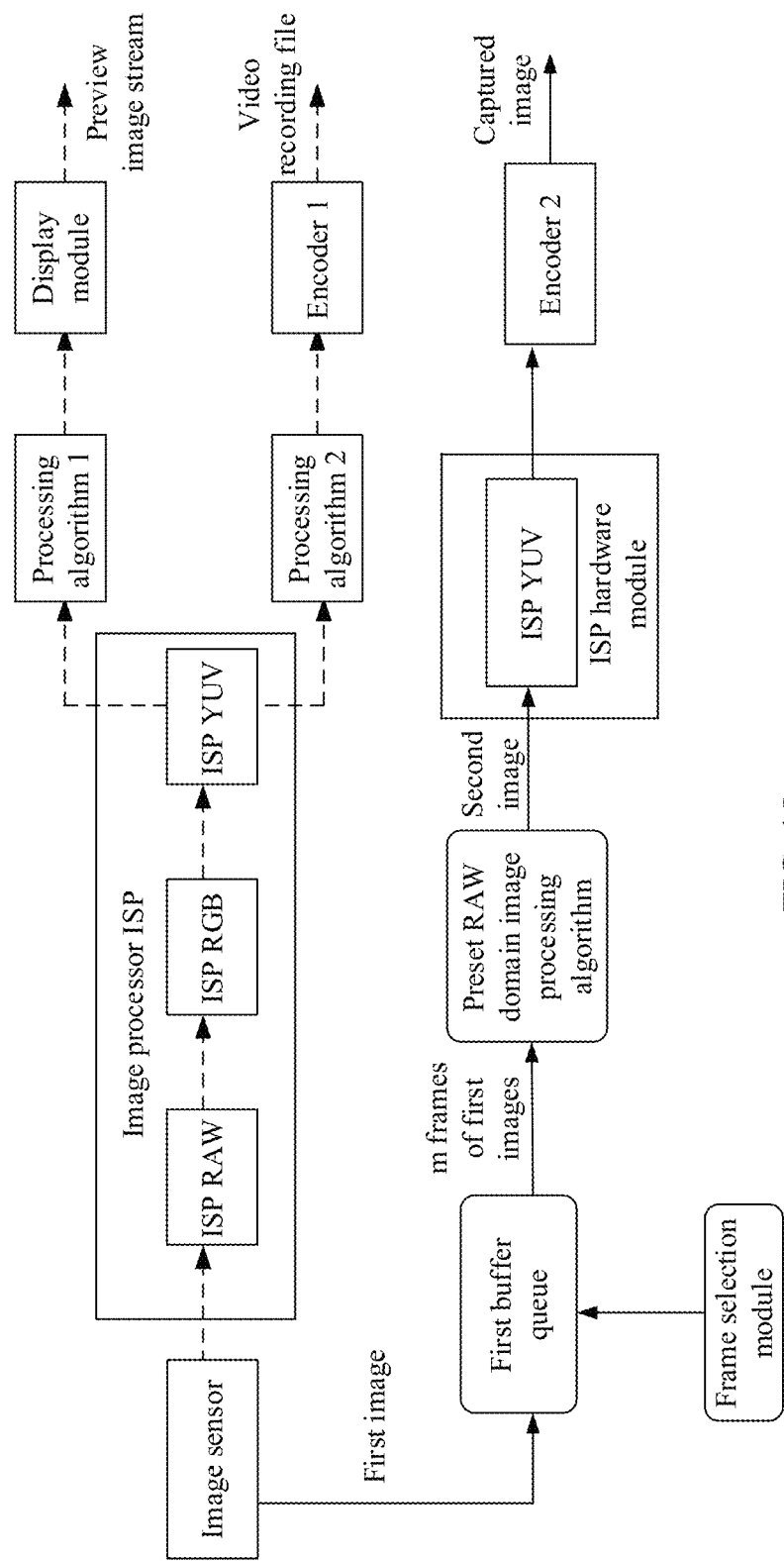
FIG. 15 is a functional block diagram of another method for capturing an image during video recording according to an embodiment of this application.
Figure 16A:
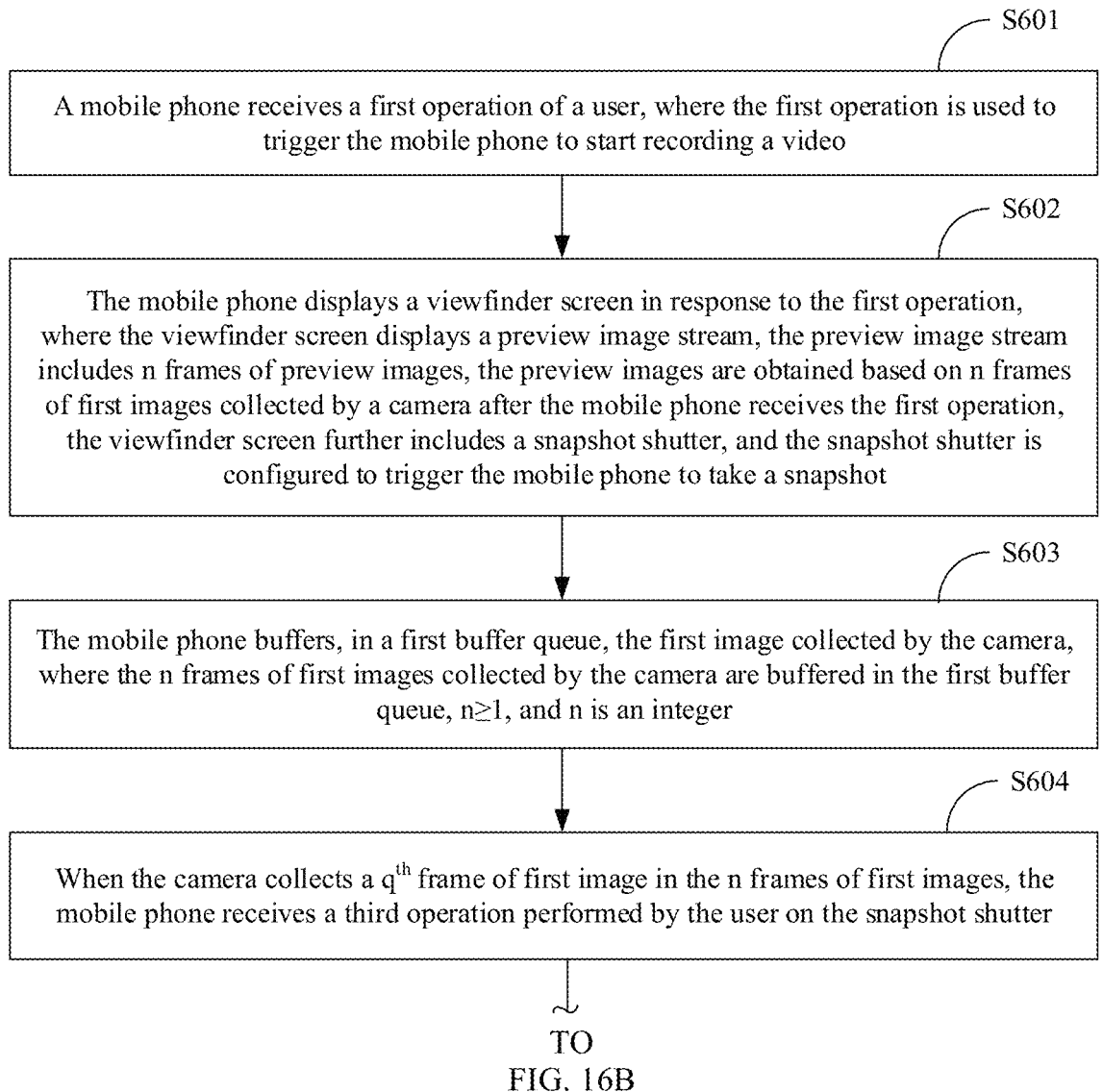
FIG. 16A-FIG. 16B are a method flowchart corresponding to the functional block diagram shown in FIG. 15.
Figure 16B:
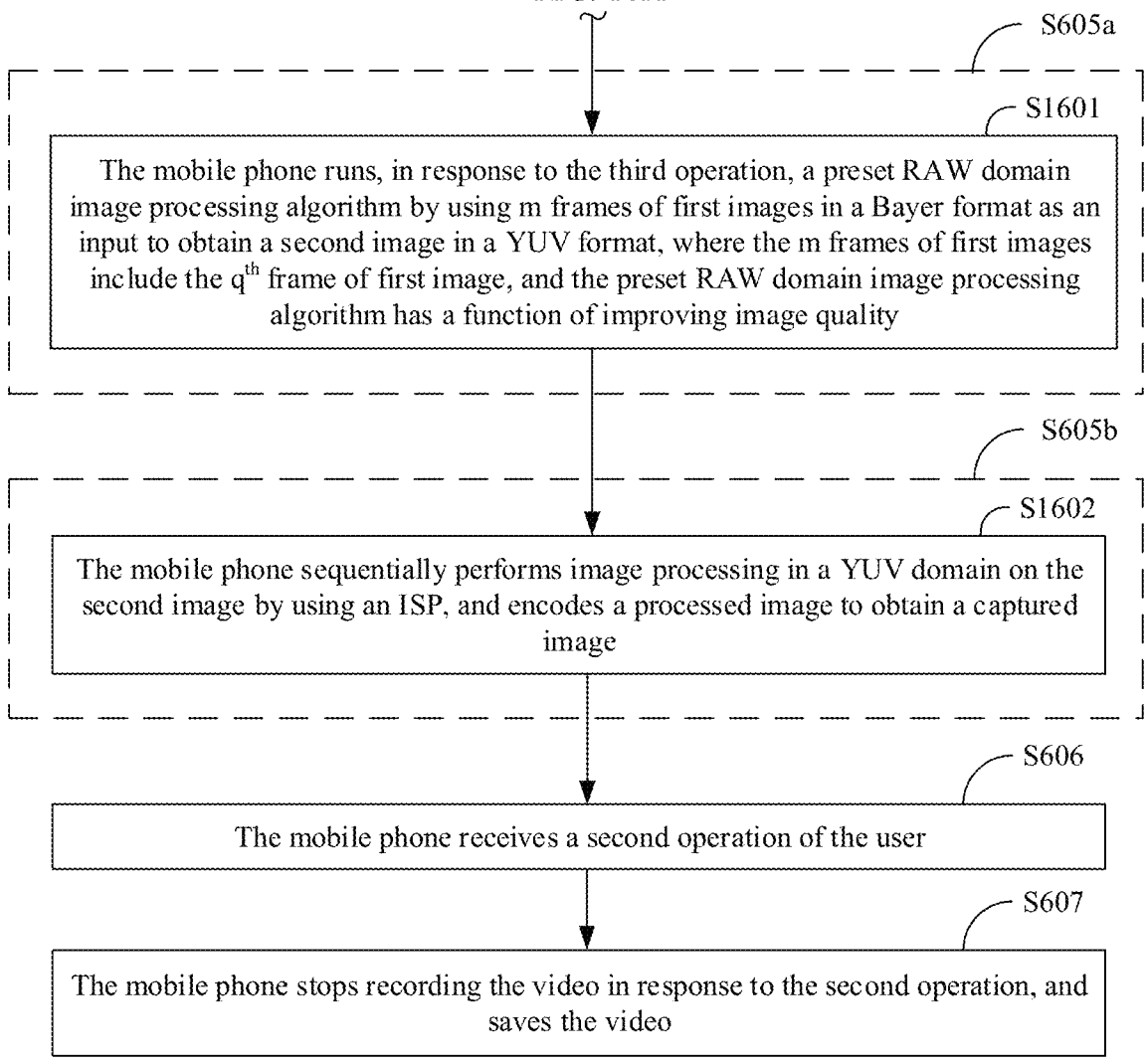

In some other embodiments, as shown in FIG. 15, a format of an input image of the preset RAW domain image processing algorithm is Bayer, and a format of an input image of the preset RAW domain image processing algorithm is YUV. In this embodiment, the preset RAW domain image processing algorithm integrates image processing functions in the RAW domain and image processing functions in the RGB domain, to improve the image quality before the ISP performs the image processing in the YUV domain on the image. As shown in FIG. 15, in this embodiment, the ISP may sequentially perform the image processing in the YUV domain on the RGB image output by the preset RAW domain image processing algorithm. Specifically, as shown in FIG. 16A-FIG. 16B. S605a may be replaced with S1601, and S605b may be replaced with S1602.

S1601: The mobile phone runs, in response to the third operation, the preset RAW domain image processing algorithm by using the m frames of first images in the Bayer format as an input to obtain a second image in the YUV format, where the m frames of first images include the $q^{th}$ frame of first image, and the preset RAW domain image processing algorithm has a function of improving image quality.

S1602: The mobile phone sequentially performs the image processing in the YUV domain on the second image by using the ISP, and encodes a processed image to obtain the captured image.

In this embodiment, the preset RAW domain image processing algorithm integrates the image processing functions in the RAW domain and the image processing functions in the RGB domain, to improve the image quality before the ISP performs the image processing in the YUV domain on the image.

For example, it is assumed that the image processing functions in the RAW domain of the ISP include I, II, and III, the image processing functions in the RGB domain of the ISP include IV and V, and the image processing functions in the YUV domain of the ISP include VI and VII.

That is, the preset RAW domain image processing algorithm integrates the image processing functions I, II, and III in the RAW domain and the image processing functions IV and V in the RGB domain. In this case, when performing S1601, the mobile phone can run the preset RAW domain image processing algorithm to complete the image processing functions I, II, and III in the RAW domain and the image processing functions IV and V in the RGB domain. When performing S1602, the mobile phone sequentially completes the image processing functions VI and VII in the YUV domain for the second image by using the ISP. For specific image processing functions in the RAW domain, the RGB domain, and the YUV domain of the ISP, refer to related descriptions in the foregoing embodiments. Details are not described herein again.

In some other embodiments, the preset RAW domain image processing algorithm integrates not only image processing functions in the RAW domain and the RGB domain, but also some of the image processing functions in the YUV domain, to improve the image quality before the ISP performs the image processing in the YUV domain.

For example, it is assumed that the image processing functions in the RAW domain of the ISP include I, II, and III, the image processing functions in the RGB domain of the ISP include IV and V, and the image processing functions in the YUV domain of the ISP include VI and VII. The preset RAW domain image processing algorithm integrates the image processing functions I. II, and III in the RAW domain, the image processing functions IV and V in the RGB domain, and the image processing function VI in the YUV domain. In this case, when performing S1601, the mobile phone can run the preset RAW domain image processing algorithm to complete the image processing functions I, II, and III in the RAW domain, the image processing functions IV and V in the RGB domain, and the image processing function VI in the YUV domain. When performing S1602, the mobile phone sequentially completes the image processing function VII in the YUV domain for the second image by using the ISP.

In this embodiment of this application, the preset RAW domain image processing algorithm may integrate some of the image processing functions in at least one image processing function in at least one of the RAW domain of the ISP, the RGB domain of the ISP, or the YUV domain of the ISP, to improve the image quality before the ISP performs the image processing.

Figure 17:
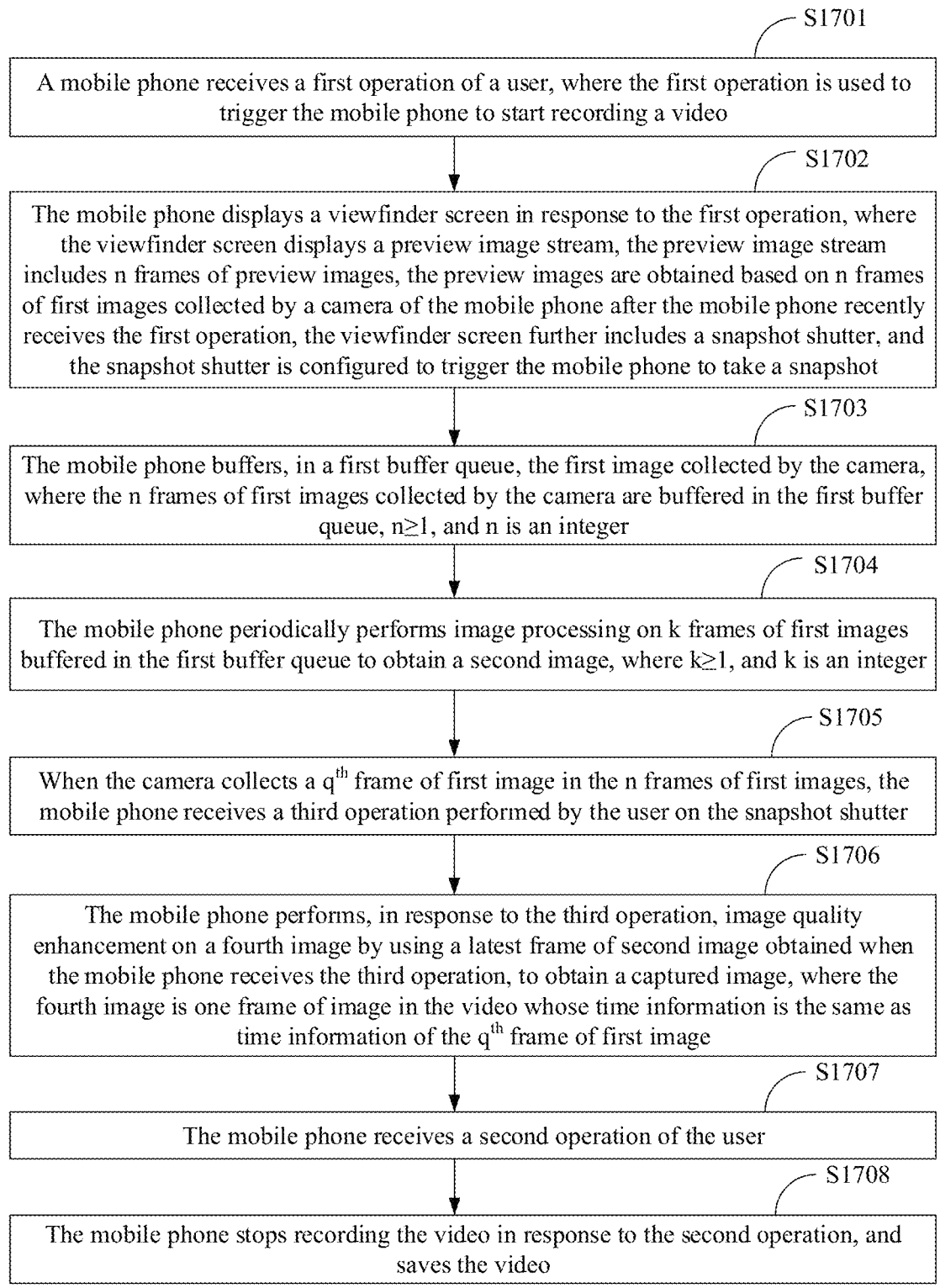
FIG. 17 is a flowchart of another method for capturing an image during video recording according to an embodiment of this application.

An embodiment of this application provides a method for capturing an image during video recording. The method may be applied to a mobile phone, and the mobile phone includes a camera. As shown in FIG. 17, the method may include S1701 to S1708.

S1701: The mobile phone receives a first operation of a user, where the first operation is used to trigger the mobile phone to start recording a video.

S1702: The mobile phone displays a viewfinder screen in response to the first operation, where the viewfinder screen displays a preview image stream, the preview image stream includes n frames of preview images, the preview images are obtained based on n frames of first images collected by the camera of the mobile phone after the mobile phone recently receives the first operation, the viewfinder screen further includes a snapshot shutter, and the snapshot shutter is configured to trigger the mobile phone to take a snapshot.

For a first preview image, refer to the detailed description of the preview image 704 in the foregoing embodiment. Details are not described herein again in this embodiment of this application.

S1703: The mobile phone buffers, in a first buffer queue, the first image collected by the camera, where the n frames of first images collected by the camera are buffered in the first buffer queue, n≥1, and n is an integer.

For a detailed implementation process of S1701 to S1703, refer to the descriptions of S601 to S603 in the foregoing embodiment. Details are not described herein again in this embodiment of this application. In the foregoing embodiment, in response to the third operation performed by the user on the snapshot shutter, the mobile phone selects the captured frame (which is also referred to as the reference frame) from the first buffer queue, and runs the preset RAW domain image processing algorithm by using the reference frame and the frame adjacent to the reference frame as the input, to obtain the captured image. In this embodiment of this application, the preset RAW domain image processing algorithm may be periodically used to process k frames of first images buffered in the first buffer queue. Specifically, after S1703, the method in this embodiment of this application may further include S1704.

S1704: The mobile phone periodically performs image processing on the k frames of first images buffered in the first buffer queue to obtain a second image, where k≥1, and k is an integer.

k may be equal to n, or k may be less than n.

Figure 18:
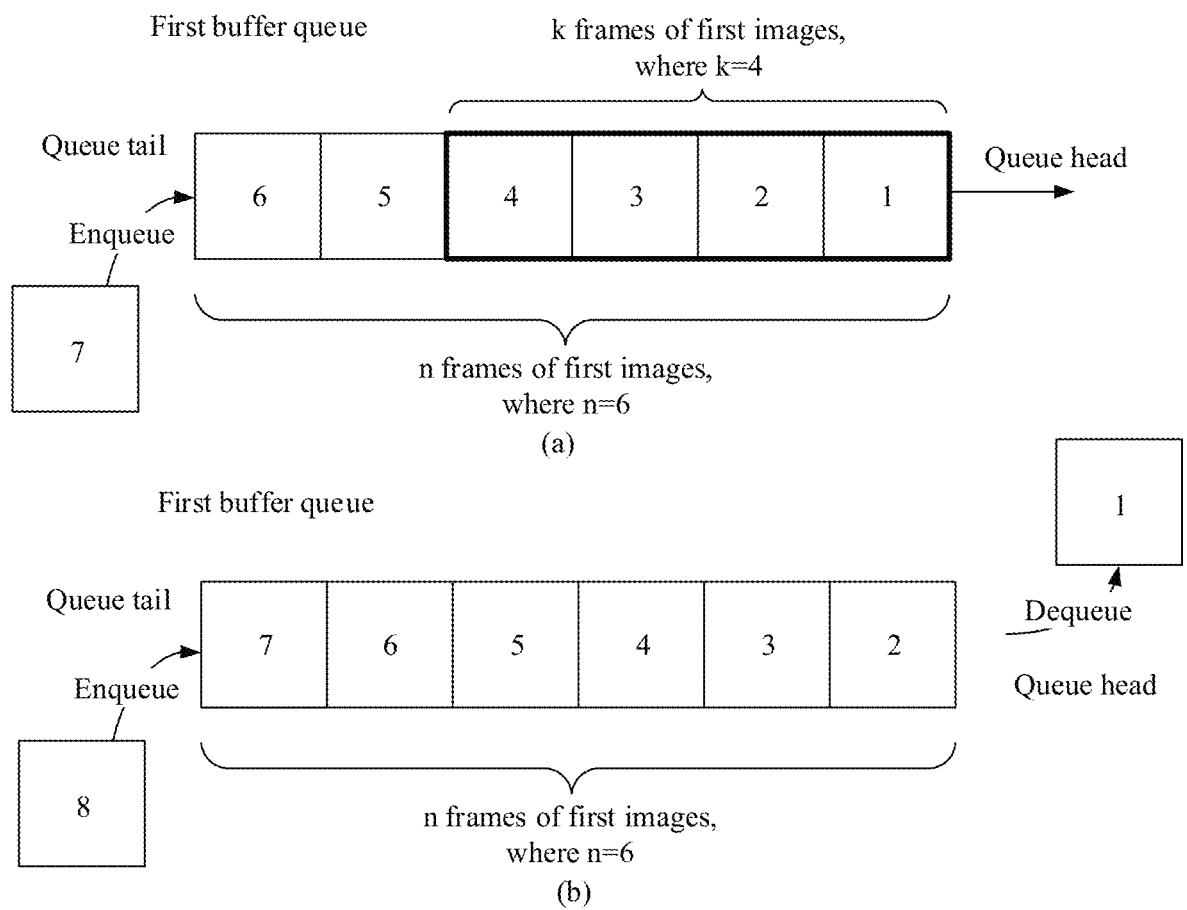
FIG. 18 is a schematic diagram of a principle of buffering a first image in a first buffer queue according to an embodiment of this application.

For example, n=6 and k=4 are used as an example. The mobile phone may periodically perform the image processing on every 4 frames of first images to obtain the second image. For example, four frames of first images shown in (a) in FIG. 18, that is, a $1^{st}$ frame of first image, a $2^{nd}$ frame of first frame, a $3^{rd}$ frame of first frame, and a $4^{th}$ frame of first frame, may be used as a group of images to perform the image processing once. As shown in (b) in FIG. 18, as a new frame of first image (for example, a $7^{th}$ frame of first image) exposed and generated by a sensor enters the queue at a queue tail of the Buffer, a frame of image (for example, the $1^{st}$ frame of first image) at a queue head of the Buffer may leave the queue from the queue head of the Buffer.

Figure 19A:
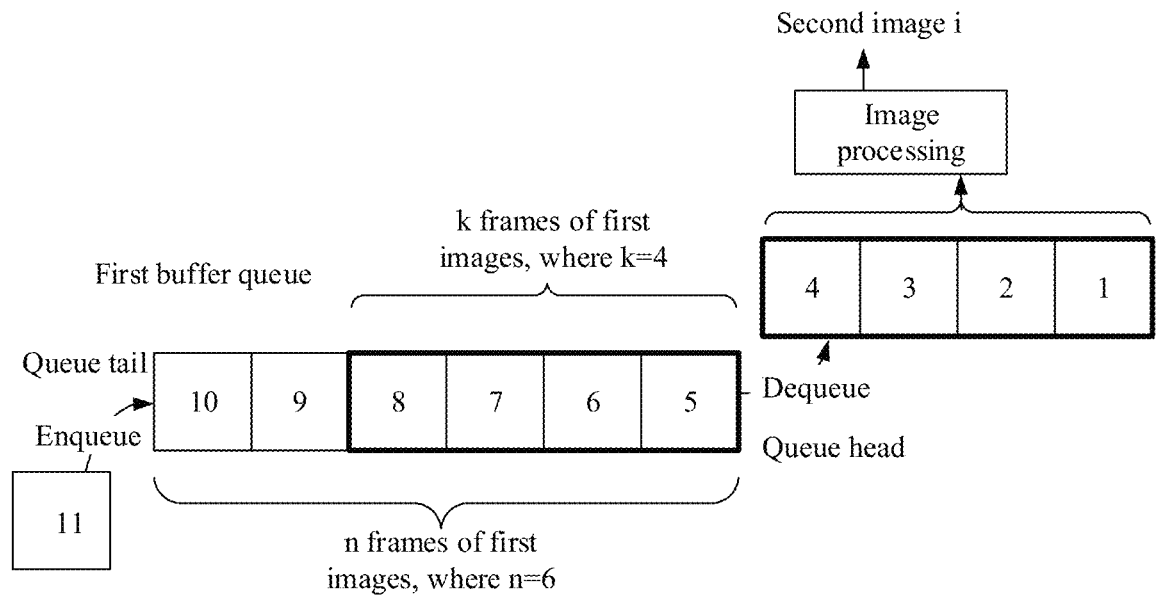
FIG. 19A(a)-FIG. 19A(c) are a schematic diagram of a principle of buffering a first image in a first buffer queue and performing image processing on the first image to obtain a second image according to an embodiment of this application.
Figure 19A:
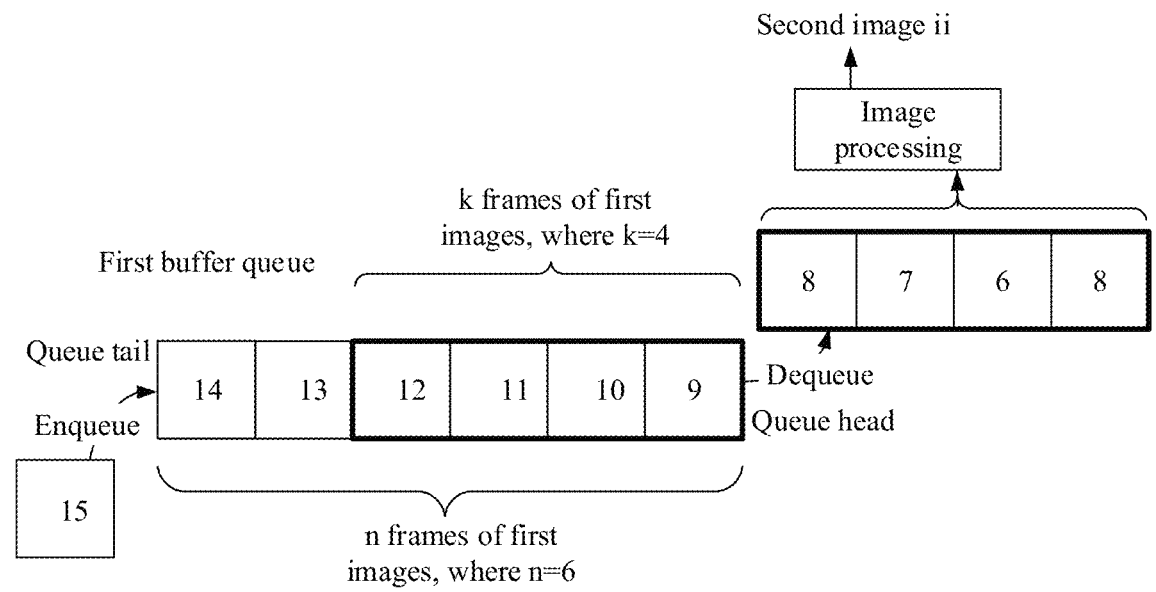
Figure 19A:
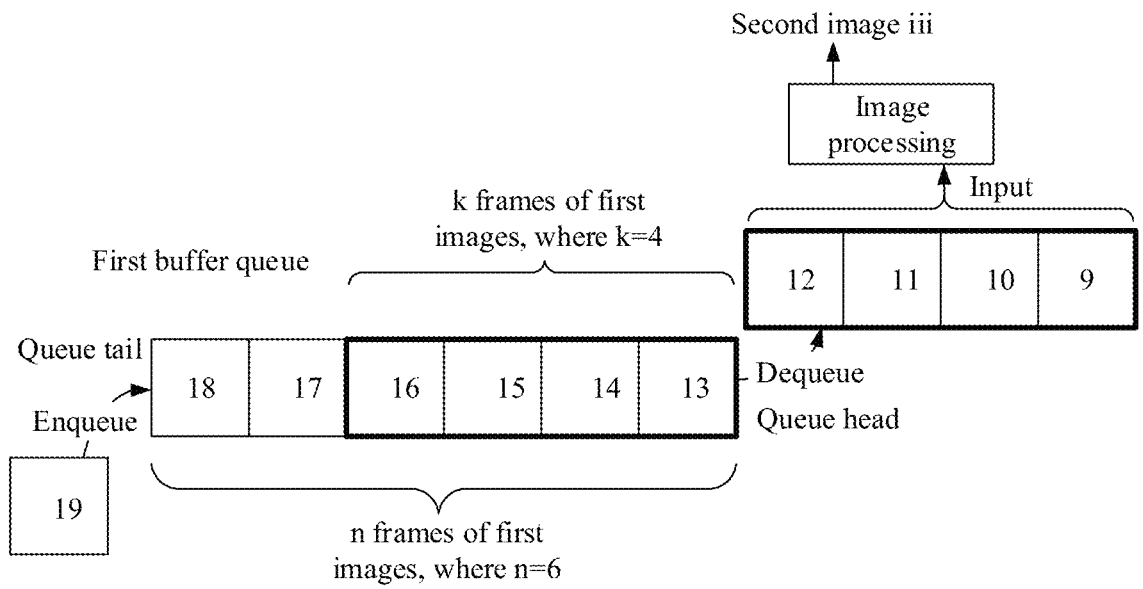

The mobile phone may periodically read the k frames of first images leaving the queue from the queue head of the Buffer, and perform the image processing on the k frames of first images to obtain the second image. For example, as shown in FIG. 19A(a), the mobile phone may perform the image processing on the four frames of first images, that is, the $1^{st}$ frame of first image, the $2^{nd}$ frame of first frame, the $3^{rd}$ frame of first frame, and the $4^{th}$ frame of first frame, after the $4^{th}$ frame of first image leaves the queue to obtain a second image i. As shown in FIG. 19A(b), the mobile phone may perform the image processing on four frames of first images, that is, a $5^{th}$ frame of first image, a $6^{th}$ frame of first image, a $7^{th}$ frame of first image, and an $8^{th}$ frame of first image, after the $8^{th}$ frame of first image leaves the queue to obtain a second image ii. As shown in FIG. 19A(c), the mobile phone may perform the image processing on four frames of first images, that is, a $9^{th}$ frame of first image, a $10^{th}$ frame of first image, an $11^{th}$ frame of first image, and a $12^{th}$ frame of first image, after the $12^{th}$ frame of first image leaves the queue to obtain a second image iii.

For example, the image processing described in the S1704 may include image processing in a RAW domain and ISP image processing. The image processing in the RAW domain is image processing performed in RAW color space. The ISP image processing is image processing performed by using an ISP of the mobile phone. After the image processing, image quality of the captured image is better than image quality of a $q^{th}$ frame of first image. Alternatively, the image processing may include the image processing in the RAW domain, the ISP image processing, and encoding processing. That is, the encoding processing may be integrated into the ISP image processing, or may be independent of the ISP image processing. In this embodiment of this application, an example in which the encoding processing is independent of the ISP image processing is used to describe the method in this embodiment of this application. For a detailed description of the encoding processing, refer to related content in the foregoing embodiments. Details are not described herein again.

The image processing in the RAW domain may be implemented by using a preset RAW domain image processing algorithm. The ISP image processing may be implemented by using the ISP of the mobile phone. S1704 may include S1704*a* and S1704*b*.

S1704*a*: The mobile phone periodically runs the preset RAW domain image processing algorithm by using the k frames of first images buffered in the first buffer queue as an input to obtain a third image, where the preset RAW domain image processing algorithm has a function of improving image quality.

The preset RAW domain image processing algorithm integrates at least one of image processing functions in the RAW domain, an RGB domain, or a YUV domain, to improve the image quality before the ISP performs the image processing.

S1704*b*: The mobile phone processes the third image by using the ISP of the mobile phone to obtain the second image.

Figure 19B:
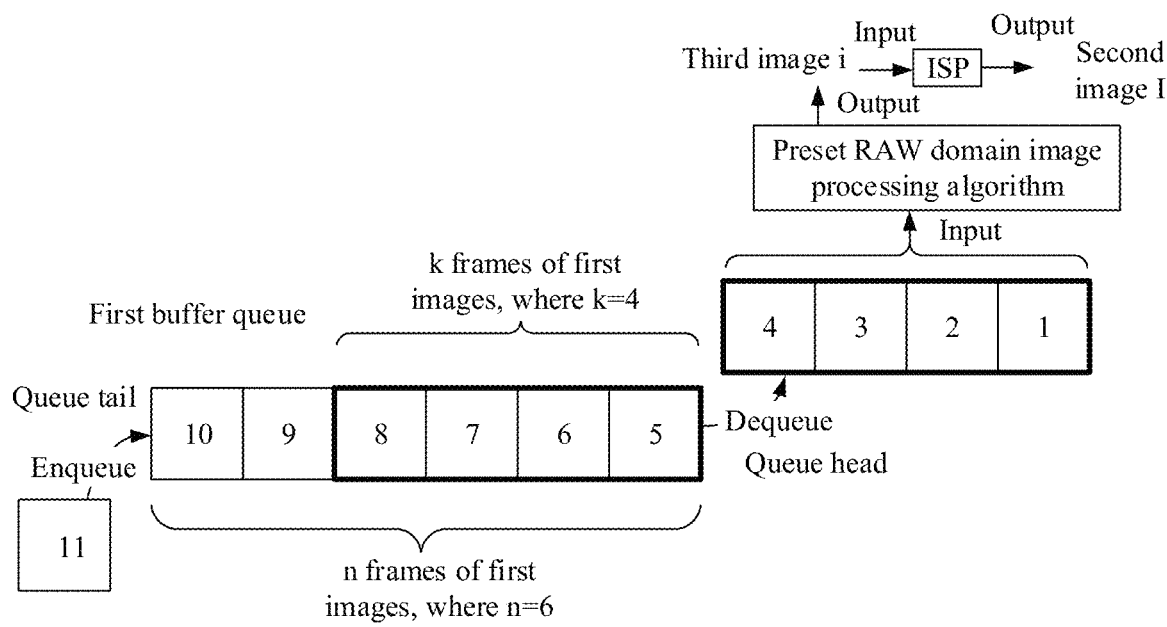
FIG. 19B(a)-FIG. 19B(c) are a schematic diagram of a principle of buffering a first image in a first buffer queue and performing image processing on the first image to obtain a second image according to an embodiment of this application.
Figure 19B:
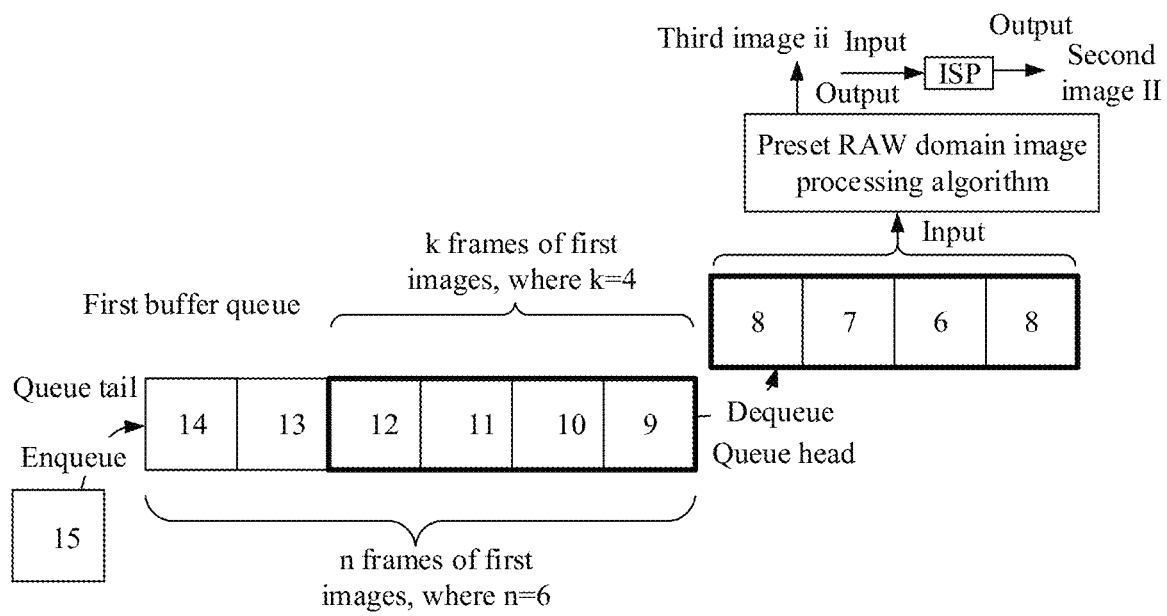
Figure 19B:
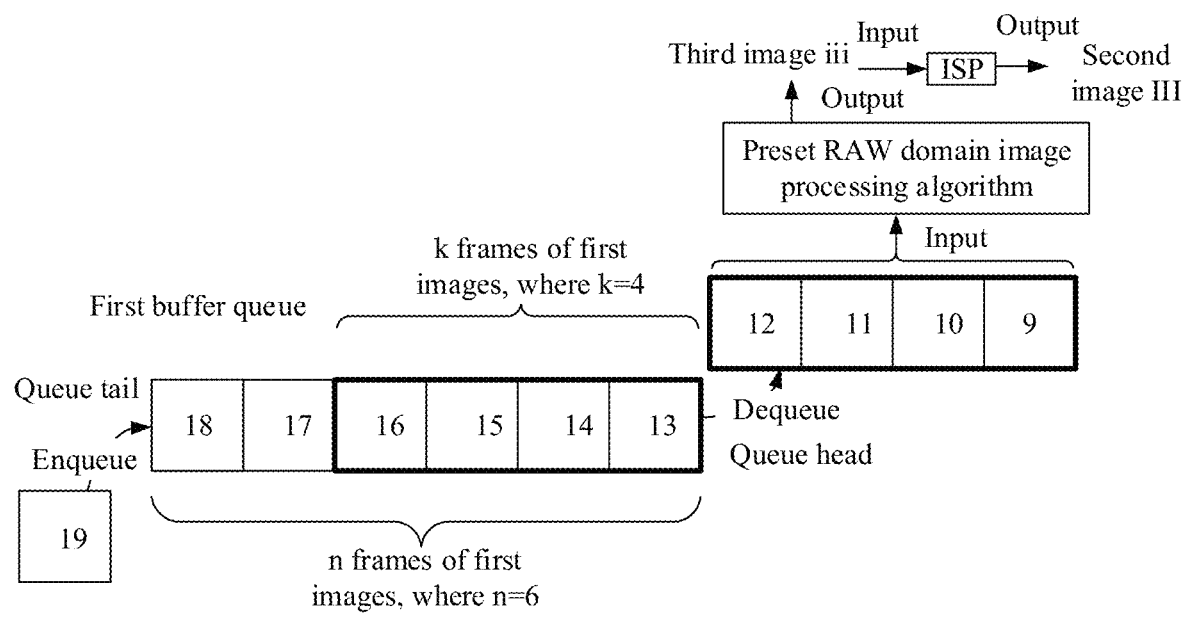

For example, n=6 and k=4 are still used as an example. As shown in FIG. 19B(a), the mobile phone may run the preset RAW domain image processing algorithm by using the four frames of first images, that is, the $1^{st}$ frame of first image, the $2^{nd}$ frame of first frame, the $3^{rd}$ frame of first frame, and the $4^{th}$ frame of first frame, as an input after the $4^{th}$ frame of first image leaves the queue to obtain a third image i. Then, as shown in FIG. 19B(a), the ISP of the mobile phone may process the third image i to obtain a second image I.

As shown in FIG. 19B(b), the mobile phone may run the preset RAW domain image processing algorithm by using the four frames of first images, that is, the $5^{th}$ frame of first image, the $6^{th}$ frame of first image, the $7^{th}$ frame of first image, and the $8^{th}$ frame of first image, as an input after the $8^{th}$ frame of first image leaves the queue to obtain a third image ii. Then, as shown in FIG. 19B(b), the ISP of the mobile phone may process the third image ii to obtain a second image II.

As shown in FIG. 19B(c), the mobile phone may run the preset RAW domain image processing algorithm by using the four frames of first images, that is, the $9^{th}$ frame of first image, the $10^{th}$ frame of first image, the $11^{th}$ frame of first image, and the $12^{th}$ frame of first image, as an input after the $12^{th}$ frame of first image leaves the queue to obtain a third image iii. Then, as shown in FIG. 19B(c), the ISP of the mobile phone may process the third image iii to obtain a second image III.

It should be noted that, for a specific method in which the mobile phone performs the image processing on the k frames of first images to obtain the second image in S1704, reference may be made to the method in which the mobile phone performs the image processing on the m frames of first images saved in the first buffer queue to obtain the captured image in the foregoing embodiment. This is not described herein again in this embodiment of this application.

In some embodiments, the mobile phone (for example, a frame selection module of the mobile phone) may select one frame of first image with best image quality in the k frames of first images as the reference frame. The mobile phone may record time information of the reference frame. The time information of the reference frame may be used as time information of the third image and time information of the second image. Then, the time information of the second image may be used to select a second image that is used to perform image quality enhancement when the mobile phone performs S1705. It should be understood that a closer time indicated by time information of two frames of images indicates a higher possibility of similar textures of the two frames of images. Images with similar textures are more easily fused, which facilitates image enhancement, and further improves image quality of a processed image.

Figure 20:
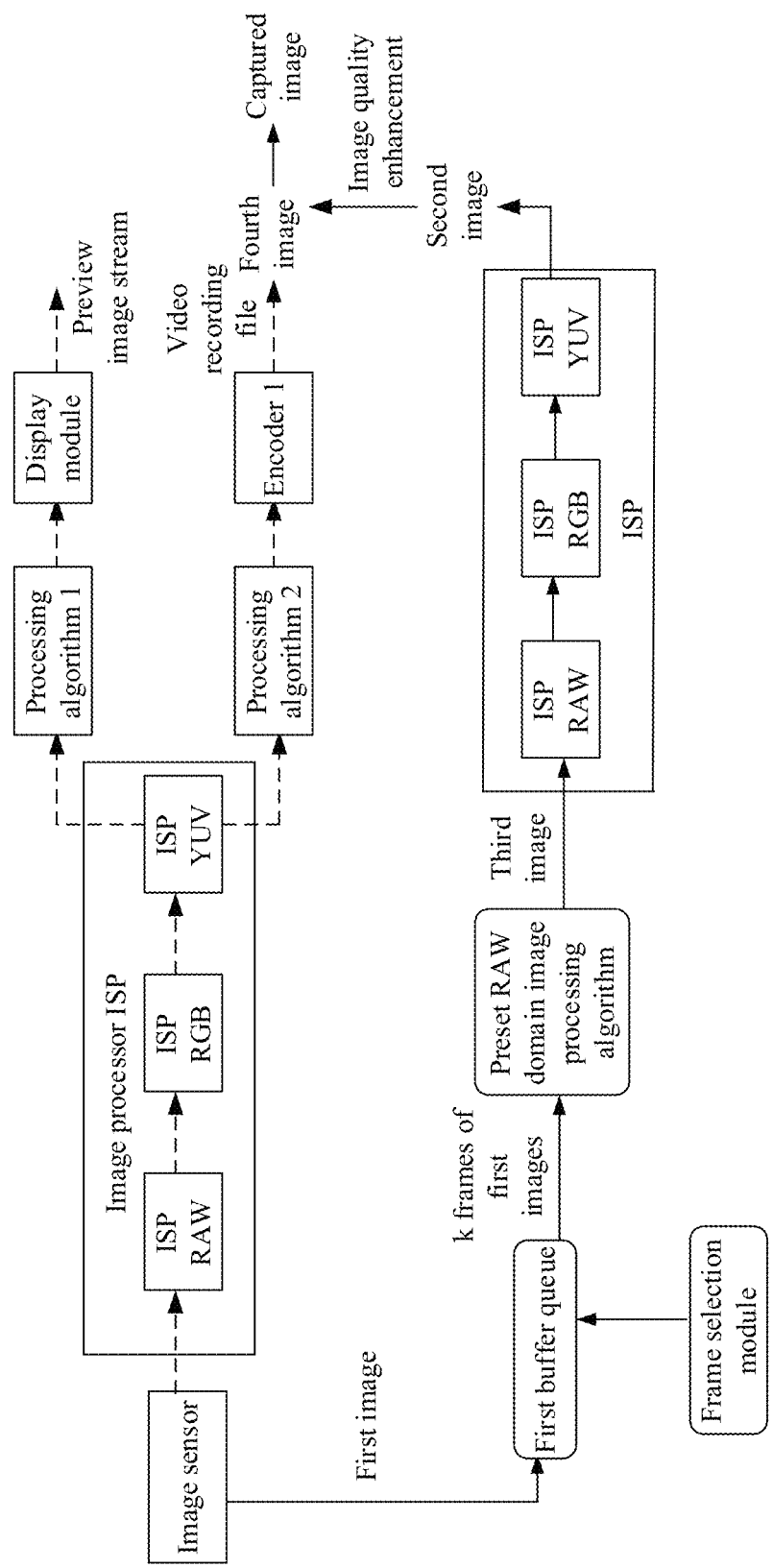
FIG. 20 is a functional block diagram of another method for capturing an image during video recording according to an embodiment of this application.

In some embodiments, as shown in FIG. 20, formats of both an input image and an input image of the preset RAW domain image processing algorithm are Bayer. In this embodiment, the preset RAW domain image processing algorithm integrates some of the image processing functions in at least one of the RAW domain, the RGB domain, or the YUV domain, to improve the image quality before the ISP performs the image processing. As shown in FIG. 20, in this embodiment, the ISP may sequentially perform the image processing in the RAW domain, the image processing in the RGB domain, and the image processing in the YUV domain on the Bayer image output by the preset RAW domain image processing algorithm. Specifically. S1704a may include: The mobile phone runs the preset RAW domain image processing algorithm by using the k frames of first images in the Bayer format as the input to obtain the third image in the Bayer format. S1704b may include: The mobile phone sequentially performs the image processing in the RAW domain, the image processing in the RGB domain, and the image processing in the YUV domain on the third image by using the ISP to obtain the second image.

Figure 21:
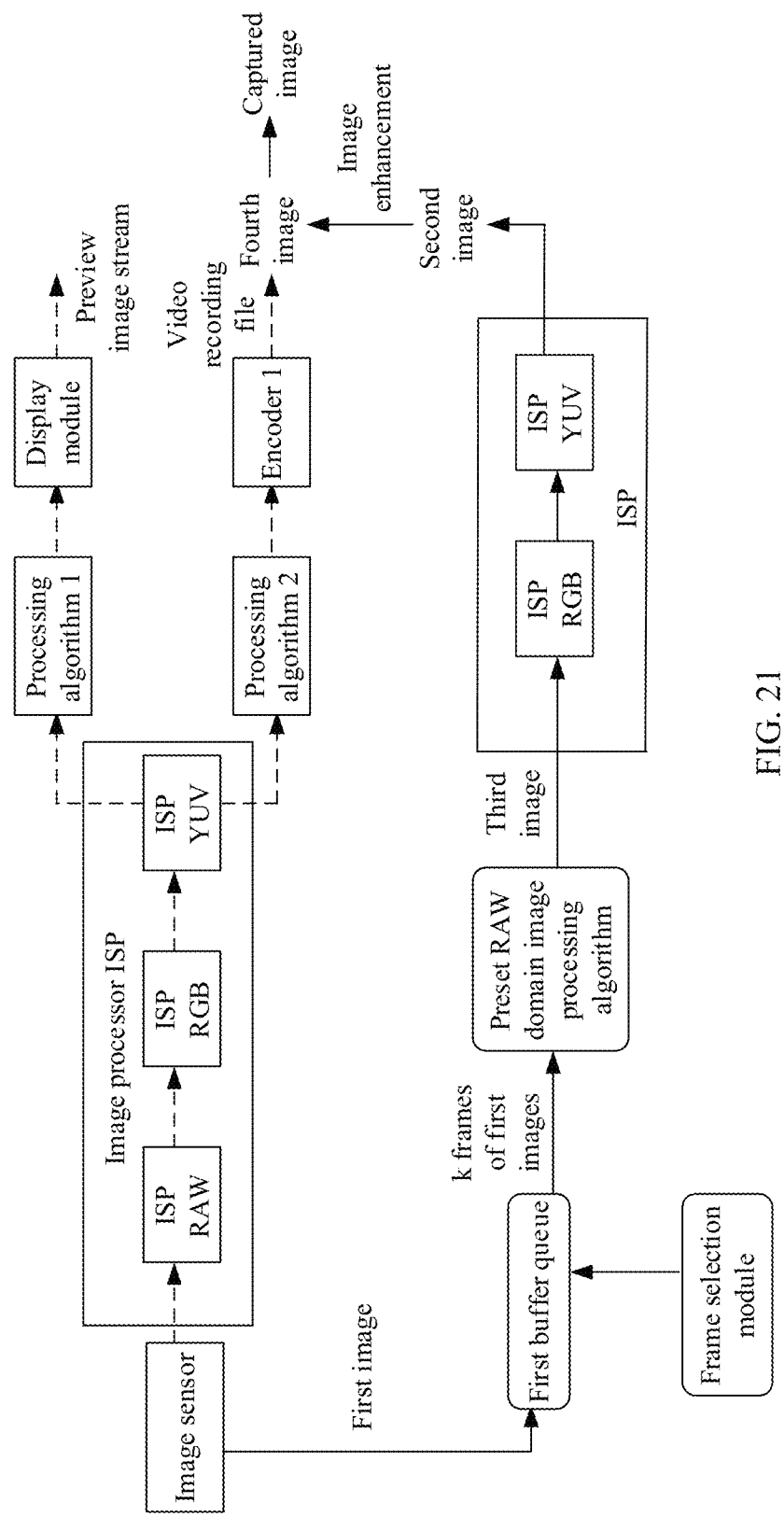
FIG. 21 is a functional block diagram of another method for capturing an image during video recording according to an embodiment of this application.

In some other embodiments, as shown in FIG. 21, a format of an input image of the preset RAW domain image processing algorithm is Bayer, and a format of an output image of the preset RAW domain image processing algorithm is RGB. In this embodiment, the preset RAW domain image processing algorithm integrates the image processing functions in the RAW domain, to improve the image quality before the ISP performs the image processing in the RGB domain and the image processing in the YUV domain on the image. As shown in FIG. 21, in this embodiment, the ISP may sequentially perform the image processing in the RGB domain and the image processing in the YUV domain on the RGB image output by the preset RAW domain image processing algorithm. Specifically. S1704a may include: The mobile phone runs the preset RAW domain image processing algorithm by using the k frames of first images in the Bayer format as the input to obtain the third image in the RGB format. S1704b may include: The mobile phone sequentially performs the image processing in the RGB domain and the image processing in the YUV domain on the third image by using the ISP to obtain the second image.

Figure 22:
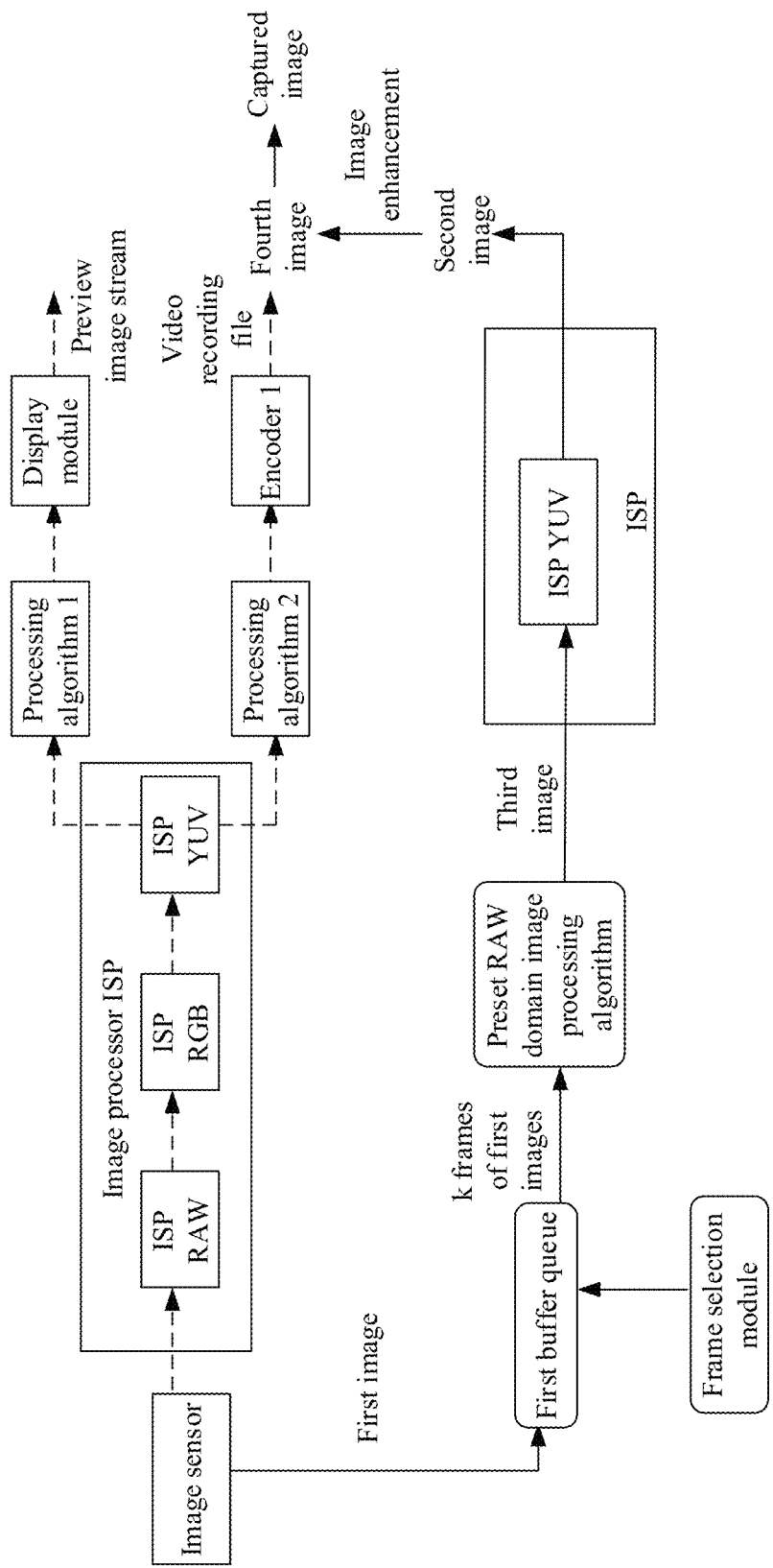
FIG. 22 is a functional block diagram of another method for capturing an image during video recording according to an embodiment of this application.

In some other embodiments, as shown in FIG. 22, a format of an input image of the preset RAW domain image processing algorithm is Bayer, and a format of an input image of the preset RAW domain image processing algorithm is YUV. In this embodiment, the preset RAW domain image processing algorithm integrates image processing functions in the RAW domain and image processing functions in the RGB domain, to improve the image quality before the ISP performs the image processing in the YUV domain on the image. As shown in FIG. 22, in this embodiment, the ISP may sequentially perform the image processing in the YUV domain on the RGB image output by the preset RAW domain image processing algorithm. Specifically. S1704a may include: The mobile phone runs the preset RAW domain image processing algorithm by using the k frames of first images in the Bayer format as the input to obtain the third image in the YUV format. S1704b may include: The mobile phone sequentially performs the image processing in the YUV domain on the third image by using the ISP to obtain the second image.

S1705: When the camera collects a $q^{th}$ frame of first image in the n frames of first images, the mobile phone receives the third operation performed by the user on the snapshot shutter.

For a detailed implementation process of S1706, refer to the description of the S604 in the foregoing embodiment. Details are not described herein again in this embodiment of this application.

S1706: The mobile phone performs, in response to the third operation, image quality enhancement on a fourth image by using a latest frame of second image obtained when the mobile phone receives the third operation, to obtain a captured image, where the fourth image is one frame of image in the video whose time information is the same as time information of the $q^{th}$ frame of first image.

In a video recording process of the mobile phone, the third operation performed by the user on the snapshot shutter may be received at any time. The mobile phone performs S1704 to periodically process the k frames of first images to obtain the second image. Therefore, in the video recording process of the mobile phone, when the third operation performed by the user on the snapshot shutter is received at different moments, latest frames of second images obtained by the mobile phone are different.

Figure 23:
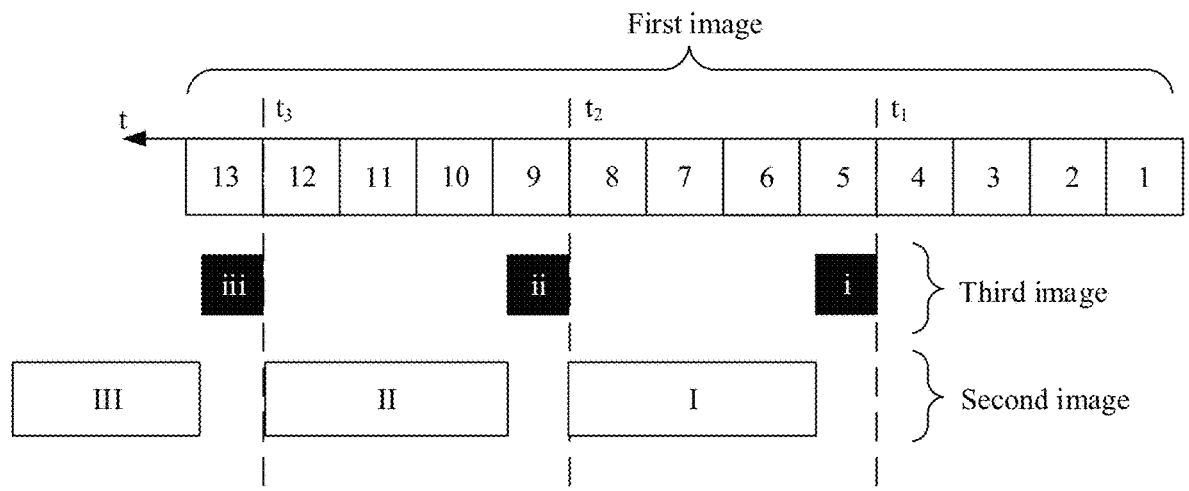
FIG. 23 is a schematic diagram of a principle of generating a second image according to an embodiment of this application.

At a moment $t_1$ shown in FIG. 23, the $4^{th}$ frame of first image leaves the first buffer queue Buffer, the mobile phone performs S1704a to obtain the third image i, and the mobile phone performs S1704b to obtain the second image I based on the third image i. At a moment $t_2$ shown in FIG. 23, the $8^{th}$ frame of first image leaves the first buffer queue Buffer, the mobile phone performs S1704a to obtain the third image ii, and the mobile phone performs S1704b to obtain the second image II based on the third image ii. At a moment $t_3$ shown in FIG. 23, the $12^{th}$ frame of first image leaves the first buffer queue Buffer, the mobile phone performs S1704a to obtain the third image iii, and the mobile phone performs S1704b to obtain the second image III based on the third image iii.

It can be seen that during a period from the moment $t_1$ to the moment $t_2$, the mobile phone can obtain only the second image I, but cannot obtain the second image II and the second image III. Therefore, when the sensor of the mobile phone exposes and outputs the $5^{th}$ frame of first image, the mobile phone receives the third operation, and the latest frame of second image in the mobile phone is the second image I, In this case, the second mobile phone may perform image quality enhancement on the $5^{th}$ frame of first image by using the second image I to obtain the captured image.

When the sensor of the mobile phone exposes and outputs the $6^{th}$ frame of first image, the mobile phone receives the third operation, and the latest frame of second image in the mobile phone is the second image I, In this case, the second mobile phone may perform image quality enhancement on the $6^{th}$ frame of first image by using the second image I to obtain the captured image.

When the sensor of the mobile phone exposes and outputs the $7^{th}$ frame of first image, the mobile phone receives the third operation, and the latest frame of second image in the mobile phone is still the second image I, In this case, the second mobile phone may perform image quality enhancement on the $7^{th}$ frame of first image by using the second image I to obtain the captured image.

When the sensor of the mobile phone exposes and outputs the $8^{th}$ frame of first image, the mobile phone receives the third operation, and the latest frame of second image in the mobile phone is still the second image I, In this case, the second mobile phone may perform image quality enhancement on the $8^{th}$ frame of first image by using the second image I to obtain the captured image.

During a period from the moment $t_2$ to the moment $t_3$, the latest frame of second image obtained by the mobile phone is the second image II, but the mobile phone cannot obtain the second image III. Therefore, when the sensor of the mobile phone exposes and outputs the $9^{th}$ frame of first image, the mobile phone receives the third operation, and the latest frame of second image in the mobile phone is the second image II, In this case, the second mobile phone may perform image quality enhancement on the $9^{th}$ frame of first image by using the second image II to obtain the captured image.

When the sensor of the mobile phone exposes and outputs the $10^{th}$ frame of first image, the mobile phone receives the third operation, and the latest frame of second image in the mobile phone is the second image I, In this case, the second mobile phone may perform image quality enhancement on the $10^{th}$ frame of first image by using the second image II to obtain the captured image.

When the sensor of the mobile phone exposes and outputs the $11^{th}$ frame of first image, the mobile phone receives the third operation, and the latest frame of second image in the mobile phone is still the second image II, In this case, the second mobile phone may perform image quality enhancement on the $11^{th}$ frame of first image by using the second image II to obtain the captured image.

When the sensor of the mobile phone exposes and outputs the $12^{th}$ frame of first image, the mobile phone receives the third operation, and the latest frame of second image in the mobile phone is still the second image II, In this case, the second mobile phone may perform image quality enhancement on the $12^{th}$ frame of first image by using the second image II to obtain the captured image.

When the sensor of the mobile phone exposes and outputs the $13^{th}$ frame of first image, the mobile phone receives the third operation, and the latest frame of second image in the mobile phone is the second image III, In this case, the second mobile phone may perform image quality enhancement on the $13^{th}$ frame of first image by using the second image III to obtain the captured image.

In some embodiments, the mobile phone may buffer the second image in a second buffer queue (Buffer'). One or more frames of images may be buffered in the second buffer queue. In this case, after the mobile phone generates a frame of second image, the newly generated frame of image can enter the Buffer', and a frame of second image previously buffered in the Buffer' can leave the queue. For example, after the ISP of the mobile phone outputs the second image I shown in FIG. 19A(a), the second image I can be buffered in the Buffer', that is, the second image I enters the Buffer'. Then, after the ISP of the mobile phone outputs the second image II shown in FIG. 19A(b), the second image I buffered in the Buffer' can leave the Buffer', and the second image II can be buffered in the Buffer', that is, the second image II enters the Buffer'. Then, after the ISP of the mobile phone outputs the second image III shown in FIG. 19A(c), the third image II buffered in the Buffer' can leave the Buffer', and the second image III can be buffered in the Buffer', that is, the second image III enters the Buffer'. In this way, one frame of second image is always buffered in the Buffer'. The frame of second image buffered in the Buffer' is the latest frame of second image obtained when the mobile phone receives the third operation. In some embodiments, the mobile phone may select, from the second image buffered in the Buffer', a frame of second image whose time information is closest to the time information of the fourth image as a guided image, which is used to perform image quality enhancement on the fourth image. It should be noted that the fourth image in S1707 may be the $q^{th}$ frame of first image that is in a video recording file and that is processed by the ISP. The time information of the fourth image is the same as the time information of the $q^{th}$ frame of first image.

For example, the mobile phone may perform image quality enhancement on the fourth image by using the latest frame of second image through a fusion network (which is also referred to as an image fusion network). For a method in which the mobile phone performs image enhancement through the fusion network, refer to a related method in a conventional technology. Details are not described herein again in this embodiment of this application.

In some embodiments, before performing S1706, the mobile phone may perform registration on the latest frame of second image and the fourth image. Then, the mobile phone may perform image quality enhancement on a registered fourth image by using a registered second image. Before performing fusion (Fusion) on the latest frame of second image and the fourth image, the mobile phone performs registration on the latest frame of second image and the fourth image. This can improve a success rate and an effect of performing image quality enhancement by the mobile phone.

Generally, registration may include two manners: global registration and local registration.

Feature point detection and matching are usually used for global registration. For example, the mobile phone performs registration on the fourth image and the third image. The mobile phone may detect matched feature points (such as pixels) in the fourth image and the third image. Then, the mobile phone may filter for the matched feature points. If a quantity of good feature points in the matched feature points is greater than a preset threshold 1, the mobile phone may consider that global registration has a good effect, and fusion may be performed.

An optical flow method is usually used for local registration. For example, the mobile phone performs registration on the fourth image and the second image. The mobile phone may first calculate optical flows for the fourth image and the second image. Then, the mobile phone may make a difference between a second image transformed by optical flow registration and a fourth image transformed by optical flow registration. If the difference is less than a preset threshold 2, the mobile phone may consider that local registration has a good effect, and fusion may be performed.

In some other embodiments, before registering the fourth image and the second image, the mobile phone may first compare a texture similarity between the fourth image and the third image. If the texture similarity between the fourth image and the second image is greater than a preset similarity threshold, it indicates that the texture similarity between the fourth image and the second image is high. In this case, a success rate of registering the fourth image and the third image by the mobile phone is high. By using this solution, the success rate of registering by the mobile phone can be improved.

If the texture similarity between the fourth image and the second image is less than or equal to the preset similarity threshold, it indicates that the texture similarity between the fourth image and the second image is low: In this case, the mobile phone does not register the fourth image and the second image. In this way, power consumption of the mobile phone caused by invalid registration is reduced. In this case, the mobile phone can directly use the fourth image as the captured image.

In some embodiments, image quality enhancement above can implement functions such as denoising, definition improvement, change or expansion of a dynamic range (Dynamic Range), and image super-resolution. This embodiment of this application describes the image super-resolution function.

Generally, considering factors such as power consumption and storage space, resolution selected for video recording (namely, recording a video) is lower than resolution of an image output by the sensor. Therefore, an image output by the ISP to the sensor is subsampled in the video recording process. Subsampled (subsampled) may also be referred to as down sampled (down sampled). Subsampling of the image can reduce resolution of the image. In this case, as shown in any one of the accompanying drawing FIG. 20 to FIG. 22, the fourth image in the video recording file is a low resolution (low resolution. LR) image. However, a captured image that the user needs to obtain in the video recording process is a high resolution image. Based on this, image quality enhancement in this embodiment may include the image super-resolution. The second image shown in any one of the accompanying drawings FIG. 20 to FIG. 22 is a high resolution (high resolution. HR) image that is not sub-sampled. The mobile phone may perform image quality enhancement (including the image super-resolution) on the fourth image by using the latest frame of second image as the guided image, to improve resolution of the fourth image.

For example, it is assumed that the resolution of the fourth image is 1080p, and resolution of the latest frame of second image is 4k. When performing S1706, the mobile phone may perform image quality enhancement on the fourth image whose resolution is 1080p by using the second image whose resolution is 4k as the guided image. Resolution of a fourth image obtained after image quality enhancement (that is, the captured image) may be 4k.

It should be understood that the fourth image obtained based on the first image collected by the camera when the mobile phone receives the third operation is the image that the user needs to capture. The latest frame of second image obtained when the mobile phone receives the third operation is an image that has high image quality and that is obtained by the mobile phone by performing image quality enhancement by using the preset RAW domain image processing algorithm and the ISP. Therefore, image quality enhancement performed on the fourth image by using the latest frame of second image can improve the image quality of the captured image finally obtained. In this way, not only the image that the user needs to capture in the video recording process can be obtained, but also the image quality of the captured image can be improved. S1707: The mobile phone receives a second operation of the user.

S1708: The mobile phone stops recording the video in response to the second operation, and saves the video.

For a detailed implementation process of S1707 to S1708, refer to the descriptions of the S606 to S607 in the foregoing embodiment. Details are not described herein again in this embodiment of this application.

Compared with the solution of S601 to S607, the solution of S1701 to S1708 can reduce a quantity of image frames buffered in the first buffer queue. Specifically, it is assumed that the delay duration shown in FIG. 3 is 330 milliseconds (ms), and the sensor of the mobile phone exposes one frame of first image every 30 milliseconds (ms). In the solution of S601 to S606, to ensure that the frame selection module of the mobile phone can select, from the first buffer queue, the first image exposed by the sensor at the moment at which the mobile phone receives the third operation, at least 10 frames of images need to be buffered in the first buffer queue. In the solution of S1701 to S1707, the second image is only used to enhance the fourth image that the user needs to capture. Therefore, there is no need to buffer many image frames to generate the second image.

Some other embodiments of this application provide an electronic device, and the electronic device may include the display, the camera, the memory, and the one or more processors above. The display, the camera, and the memory are coupled to the processor. The memory is configured to store computer program code, and the computer program code includes computer instructions. When the processor executes the computer instructions, the electronic device can perform the functions or steps performed by the mobile phone in the foregoing method embodiments. For a structure of the electronic device, refer to the structure of the mobile phone shown in FIG. 5A.

Figure 24:
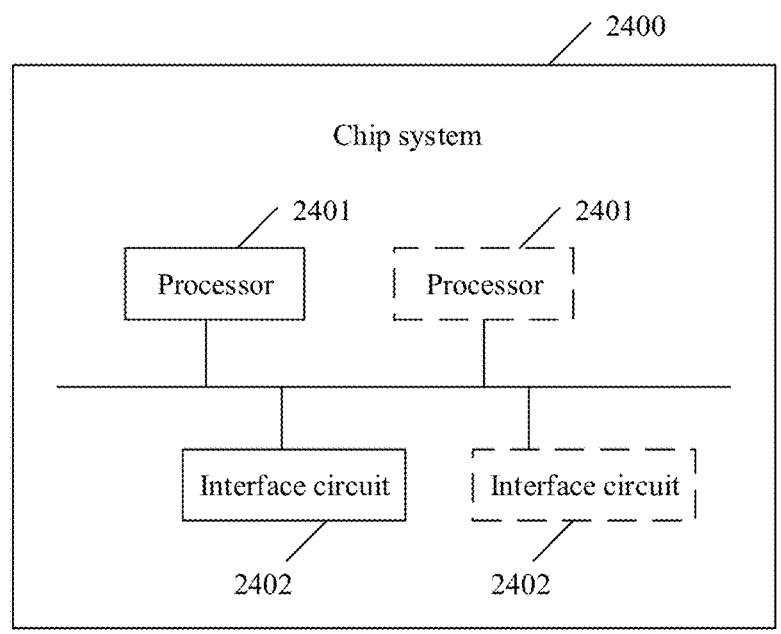
FIG. 24 is a schematic diagram of a structure of a chip system according to an embodiment of this application.

An embodiment of this application further provides a chip system. As shown in FIG. 24, the chip system 2400 includes at least one processor 2401 and at least one interface circuit 2402. The processor 2401 and the interface circuit 2402 may be connected to each other through a line. For example, the interface circuit 2402 may be configured to receive a signal from another apparatus (for example, a memory of an electronic device). For another example, the interface circuit 2402 may be configured to send a signal to another apparatus (for example, the processor 2401). For example, the interface circuit 2402 may read instructions stored in a memory, and send the instructions to the processor 2401. When the instructions are executed by the processor 2401, the electronic device can be enabled to perform the steps in the foregoing embodiments. Certainly, the chip system may further include another discrete device. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or steps performed by the mobile phone in the foregoing method embodiments.

An embodiment of this application further provides a computer program product. When the computer program product runs on a computer, the computer is enabled to perform the functions or steps performed by the mobile phone in the foregoing method embodiments.

The foregoing descriptions about implementations allow a person skilled in the art to clearly understand that, for the purpose of convenient and brief description, division of the foregoing functional modules is used only as an example for illustration. In actual application, the foregoing functions can be allocated to different functional modules and implemented according to needs, that is, an internal structure of an apparatus is divided into different functional modules to implement all or some of the functions described above.

In embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one physical unit or a plurality of physical units, that is, may be located in one place, or may be distributed in a plurality of different places. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or a part of the technical solutions may be implemented in a form of a software product. The software product is stored in a storage medium and includes several instructions for instructing a device (which may be a single-chip computer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, or an optical disc.

The foregoing content is merely specific implementations of this application, but is not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A method for capturing an image during video recording, applied to an electronic device, wherein the electronic device comprises a camera, and the method comprises:
receiving, by the electronic device, a first operation of a user, wherein the first operation is used to trigger the electronic device to start recording a video;
displaying, by the electronic device, a viewfinder screen in response to the first operation, wherein the viewfinder screen displays a preview image stream, the preview image stream comprises n frames of preview images, the preview images are obtained based on n frames of first images collected by the camera of the electronic device after the electronic device receives the first operation, the viewfinder screen further comprises a snapshot shutter, the snapshot shutter is configured to trigger the electronic device to take a snapshot, the n frames of the first images are stored in a first buffer queue of the electronic device, n≥1, and n is an integer;
receiving, by the electronic device, a second operation of the user;
stopping, by the electronic device, recording the video in response to the second operation;
saving, by the electronic device, the video;
when the camera collects a $q^{th}$ frame of a first image in the n frames of first images, receiving a third operation performed by the user on the snapshot shutter; and
performing, by the electronic device in response to the third operation, image processing on the $q^{th}$ frame of the first image saved in the first buffer queue to obtain a captured image, wherein performing the image processing on the $q^{th}$ frame of the first image comprises performing image processing on m frames of the first images to obtain the captured image, wherein the m frames of the first images comprise the $q^{th}$ frame of the first image, m≥1, and m is an integer,
wherein, the image processing on the m frames of the first images to obtain the captured image comprises image processing in a RAW domain and image signal processor (ISP) image processing, the image processing in the RAW domain is image processing performed in RAW color space, the ISP image processing is image processing performed by using an ISP of the electronic device, and image quality of the captured image is better than image quality of the $q^{th}$ frame of the first image,
or wherein the image processing on the m frames of the first images to obtain the captured image comprises the image processing in the RAW domain, the ISP image processing, and encoding processing, and the image quality of the captured image is better than the image quality of the $q^{th}$ frame of the first image.

2. The method according to claim 1, wherein the performing, by the electronic device, image processing on the m frames of the first images to obtain the captured image comprises:

running, by the electronic device, a preset RAW domain image processing algorithm by using the m frames of the first images as an input to obtain a second image, wherein the preset RAW domain image processing algorithm has a function of improving the image quality, and the preset RAW domain image processing algorithm integrates image processing functions in at least one of the RAW domain, an RGB domain, or a YUV domain, to improve the image quality before the ISP performs the image processing; and processing, by the electronic device, the second image by using the ISP, and encoding a processed image to obtain the captured image.

3. The method according to claim 2, wherein the running, by the electronic device, a preset RAW domain image processing algorithm by using the m frames of the first images as the input to obtain the second image comprises:

running, by the electronic device, the preset RAW domain image processing algorithm by using the m frames of the first images in a Bayer format as the input to obtain the second image in the Bayer format, wherein the preset RAW domain image processing algorithm integrates some of the image processing functions in at least one of the RAW domain, the RGB domain, or the YUV domain, to improve the image quality before the ISP performs the image processing; and the processing, by the electronic device, the second image by using the ISP, and encoding a processed image to obtain the captured image comprises:

sequentially performing, by the electronic device, the image processing in the RAW domain, the image processing in the RGB domain, and the image processing in the YUV domain on the second image by using the ISP, and encoding the processed image to obtain the captured image.

4. The method according to claim 2, wherein the running, by the electronic device, a preset RAW domain image processing algorithm by using the m frames of the first images as the input to obtain the second image comprises:

running, by the electronic device, the preset RAW domain image processing algorithm by using the m frames of the first images in a Bayer format as the input to obtain the second image in an RGB format, wherein the preset RAW domain image processing algorithm integrates the image processing functions in the RAW domain, to improve the image quality before the ISP performs the image processing in the RGB domain and the image processing in the YUV domain on the image; and the processing, by the electronic device, the second image by using the ISP, and encoding a processed image to obtain the captured image comprises:

sequentially performing, by the electronic device, the image processing in the RGB domain and the image processing in the YUV domain on the second image by using the ISP, and encoding the processed image to obtain the captured image.

5. The method according to claim 2, wherein the running, by the electronic device, a preset RAW domain image processing algorithm by using the m frames of the first images as the input to obtain the second image comprises:

running, by the electronic device, the preset RAW domain image processing algorithm by using the m frames of the first images in a Bayer format as the input to obtain the second image in a YUV format, wherein the preset RAW domain image processing algorithm integrates the image processing functions in the RAW domain and the image processing functions in the RGB domain, to improve the image quality before the ISP performs image processing in the YUV domain on the image; and the processing, by the electronic device, the second image by using the ISP, and encoding a processed image to obtain the captured image comprises:

performing, by the electronic device, the image processing in the YUV domain on the second image by using the ISP, and encoding the processed image to obtain the captured image.

6. The method according to claim 1, wherein the method further comprises:

processing, by the electronic device, the first image and the second image by using the ISP in a time division multiplexing manner.

7. The method according to claim 1, wherein the method further comprises:

periodically performing, by the electronic device, image processing on k frames of the first images buffered in the first buffer queue to obtain a second image, wherein k≥1, and k is an integer;

wherein the performing, by the electronic device in response to the third operation, image processing on the $q^{th}$ frame of a first image saved in the first buffer queue to obtain the captured image comprises:

performing, by the electronic device in response to the third operation, image quality enhancement on a fourth image by using a latest frame of second image obtained when the electronic device receives the third operation, to obtain the captured image, wherein the fourth image is one frame of image in the video whose time information is the same as time information of the $q^{th}$ frame of the first image;

wherein the image quality enhancement comprises image super-resolution; and resolution of the second image and the captured image is higher than resolution of the $q^{th}$ frame of the first image.

8. The method according to claim 7, wherein the periodically performing, by the electronic device, image processing on k frames of the first images buffered in the first buffer queue to obtain a second image comprises:

periodically running, by the electronic device, a preset RAW domain image processing algorithm by using the k frames of the first images buffered in the first buffer queue as an input to obtain a third image, wherein the preset RAW domain image processing algorithm has a function of improving the image quality; and processing, by the electronic device, the third image by using the ISP of the electronic device to obtain the second image.

9. An electronic device, comprising a touchscreen, a memory that is non-transitory, a camera, a display, and one or more processors, wherein the touchscreen, the memory, the camera, and the display are coupled to the processor, the memory stores computer program code, the computer program code comprises computer instructions, and when the computer instructions are executed by the processor, the electronic device performs operations comprising:

receiving a first operation of a user, wherein the first operation is used to trigger the electronic device to start recording a video;

displaying a viewfinder screen in response to the first operation, wherein the viewfinder screen displays a preview image stream, the preview image stream comprises n frames of preview images, the preview images are obtained based on n frames of first images collected by the camera of the electronic device after the electronic device receives the first operation, the viewfinder screen further comprises a snapshot shutter, the snapshot shutter is configured to trigger the electronic device to take a snapshot, the n frames of the first images are stored in a first buffer queue of the electronic device, n≥1, and n is an integer;
receiving a second operation of the user;
stopping recording the video in response to the second operation;
saving the video;
when the camera collects a $q^{th}$ frame of a first image in the n frames of the first images, receiving a third operation performed by the user on the snapshot shutter; and
performing, in response to the third operation, image processing on the $q^{th}$ frame of the first image saved in the first buffer queue to obtain a captured image;
periodically performing image processing on k frames of the first images buffered in the first buffer queue to obtain a second image, wherein k≥1, and k is an integer;
wherein the performing, in response to the third operation, image processing on the $q^{th}$ frame of the first image saved in the first buffer queue to obtain the captured image comprises:
performing, in response to the third operation, image quality enhancement on a fourth image by using a latest frame of second image obtained when the electronic device receives the third operation, to obtain the captured image, wherein the fourth image is one frame of image in the video whose time information is the same as time information of the $q^{th}$ frame of the first image;
wherein the image quality enhancement comprises image super-resolution; and
resolution of the second image and the captured image is higher than resolution of the $q^{th}$ frame of the first image.

10. The electronic device according to claim 9, wherein the performing image processing on the $q^{th}$ frame of the first image saved in the first buffer queue to obtain the captured image comprises:
performing image processing on an m frames of the first images to obtain the captured image, wherein the m frames of the first images comprise the $q^{th}$ frame of the first image, m≥1, and m is an integer;
wherein, the image processing comprises image processing in a RAW domain and image signal processor (ISP) image processing, the image processing in the RAW domain is image processing performed in RAW color space, the ISP image processing is image processing performed by using an ISP of the electronic device, and image quality of the captured image is better than image quality of the $q^{th}$ frame of the first image; or
the image processing comprises the image processing in the RAW domain, the ISP image processing, and encoding processing, and the image quality of the captured image is better than the image quality of the $q^{th}$ frame of the first image.

11. The electronic device according to claim 10, wherein the performing image processing on the m frames of the first images to obtain the captured image comprises:
running a preset RAW domain image processing algorithm by using the m frames of the first images as an input to obtain a second image, wherein the preset RAW domain image processing algorithm has a function of improving the image quality, and the preset RAW domain image processing algorithm integrates image processing functions in at least one of the RAW domain, an RGB domain, or a YUV domain, to improve the image quality before an ISP performs the image processing; and
processing the second image by using the ISP, and encoding a processed image to obtain the captured image.

12. The electronic device according to claim 11, wherein the running a preset RAW domain image processing algorithm by using the m frames of the first images as the input to obtain the second image comprises:
running the preset RAW domain image processing algorithm by using the m frames of the first images in a Bayer format as the input to obtain the second image in the Bayer format, wherein the preset RAW domain image processing algorithm integrates some of the image processing functions in at least one of the RAW domain, the RGB domain, or the YUV domain, to improve the image quality before the ISP performs the image processing; and
the processing the second image by using the ISP, and encoding a processed image to obtain the captured image comprises:
sequentially performing the image processing in the RAW domain, the image processing in the RGB domain, and the image processing in the YUV domain on the second image by using the ISP, and encoding the processed image to obtain the captured image.

13. The electronic device according to claim 11, wherein the running a preset RAW domain image processing algorithm by using the m frames of the first images as the input to obtain the second image comprises:
running the preset RAW domain image processing algorithm by using the m frames of the first images in a Bayer format as the input to obtain the second image in an RGB format, wherein the preset RAW domain image processing algorithm integrates the image processing functions in the RAW domain, to improve the image quality before the ISP performs the image processing in the RGB domain and the image processing in the YUV domain on the image; and
the processing the second image by using the ISP, and encoding a processed image to obtain the captured image comprises:
sequentially performing the image processing in the RGB domain and the image processing in the YUV domain on the second image by using the ISP, and encoding the processed image to obtain the captured image.

14. The electronic device according to claim 11, wherein the running a preset RAW domain image processing algorithm by using the m frames of the first images as the input to obtain the second image comprises:
running the preset RAW domain image processing algorithm by using the m frames of the first images in a Bayer format as the input to obtain the second image in a YUV format, wherein the preset RAW domain image processing algorithm integrates the image processing functions in the RAW domain and the image processing functions in the RGB domain, to improve the image quality before the ISP performs image processing in the YUV domain on the image; and
the processing the second image by using the ISP, and encoding a processed image to obtain the captured image comprises:
performing the image processing in the YUV domain on the second image by using the ISP, and encoding the processed image to obtain the captured image.

15. The electronic device according to claim 10, wherein the operations further comprise:

processing the first image and the second image by using the ISP in a time division multiplexing manner.

16. The electronic device according to claim 9, wherein the periodically performing image processing on k frames of the first images buffered in the first buffer queue to obtain a second image comprises:

periodically running a preset RAW domain image processing algorithm by using the k frames of the first images buffered in the first buffer queue as an input to obtain a third image, wherein the preset RAW domain image processing algorithm has a function of improving the image quality; and processing the third image by using the ISP of the electronic device to obtain the second image.

17. A non-transitory computer-readable storage medium, comprising computer instructions, wherein when the computer instructions are run on an electronic device, the electronic device performs operations comprising:

receiving a first operation of a user, wherein the first operation is used to trigger the electronic device to start recording a video;

displaying a viewfinder screen in response to the first operation, wherein the viewfinder screen displays a preview image stream, the preview image stream comprises n frames of preview images, the preview images are obtained based on n frames of first images collected by a camera of the electronic device after the electronic device receives the first operation, the viewfinder screen further comprises a snapshot shutter, the snapshot shutter is configured to trigger the electronic device to take a snapshot, the n frames of the first images are stored in a first buffer queue of the electronic device, $n \geq 1$, and n is an integer;

receiving a second operation of the user;

stopping recording the video in response to the second operation;

saving the video;

when the camera collects a $q^{th}$ frame of a first image in the n frames of the first images, receiving a third operation performed by the user on the snapshot shutter; and performing, in response to the third operation, image processing on the $q^{th}$ frame of the first image saved in the first buffer queue to obtain a captured image, wherein performing the image processing on the $q^{th}$ frame of the first image comprises performing image processing on m frames of the first images to obtain the captured image, wherein the m frames of the first images comprise the $q^{th}$ frame of first image, $m \geq 1$, and m is an integer, wherein, the image processing on the m frames of the first images to obtain the captured image comprises image processing in a RAW domain and image signal processor (ISP) image processing, the image processing in the RAW domain is image processing performed in RAW color space, the ISP image processing is image processing performed by using an ISP of the electronic device, and image quality of the captured image is better than image quality of the $q^{th}$ frame of the first image, or wherein the image processing on the m frames of the first images to obtain the captured image comprises the image processing in the RAW domain, the ISP image processing, and encoding processing, and the image quality of the captured image is better than the image quality of the $q^{th}$ frame of the first image.

* * * * *